(12) United States Patent
Kuroi et al.

(10) Patent No.: US 6,734,986 B1
(45) Date of Patent: May 11, 2004

(54) PRINT CONTROL APPARATUS, PRINT DATA GENERATING APPARATUS, PRINT CONTROL METHOD, PRINT DATA GENERATING METHOD, AND STORAGE MEDIUM

(75) Inventors: Yoshinobu Kuroi, Machida (JP); Satoshi Nishikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/244,475

(22) Filed: Feb. 4, 1999

(30) Foreign Application Priority Data

| Feb. 5, 1998 | (JP) | ............................................. 10-024881 |
| Mar. 12, 1998 | (JP) | ............................................. 10-061653 |
| Jan. 26, 1999 | (JP) | ............................................. 11-017654 |

(51) Int. Cl.[7] ............................ G06F 15/00; G06F 9/46; B41J 29/377; B41J 29/38; G06T 15/16
(52) U.S. Cl. ..................... 358/1.16; 358/1.16; 358/1.9; 347/19; 347/20; 709/329; 400/54; 345/502; 345/520
(58) Field of Search ........................ 358/1.9, 1.1, 1.18, 358/1.14, 1.15, 1.12; 400/54; 347/19, 40; 709/329; 345/502, 520

(56) References Cited

U.S. PATENT DOCUMENTS

| 5,502,804 A | | 3/1996 | Butterfield et al. ......... 394/147 |
| 5,633,992 A | * | 5/1997 | Gyllenskog ................. 358/1.15 |
| 5,699,495 A | * | 12/1997 | Snipp ........................ 358/1.15 |
| 5,774,720 A | * | 6/1998 | Borgendale et al. ........ 709/329 |
| 5,803,623 A | * | 9/1998 | Iwasaki ....................... 400/54 |
| 6,039,426 A | * | 3/2000 | Dobbs ......................... 347/19 |
| 6,061,142 A | * | 5/2000 | Shim .......................... 358/1.14 |

FOREIGN PATENT DOCUMENTS

| EP | 0820 004 | 1/1998 | ............. G06F/3/12 |

* cited by examiner

Primary Examiner—Kimberly Williams
Assistant Examiner—Saeid Ebrahimi
(74) Attorney, Agent, or Firm—Fitzpatrick, Cella, Harper & Scinto

(57) ABSTRACT

A print control apparatus for processing print information, which is connected to a printer, selects the optimal print mode for a set condition. The apparatus controls a printer driver to generate print data in the selected print mode in accordance with a print instruction generated by a graphics engine, thereby increasing the print throughput of the printer and allowing proper printing.

18 Claims, 47 Drawing Sheets

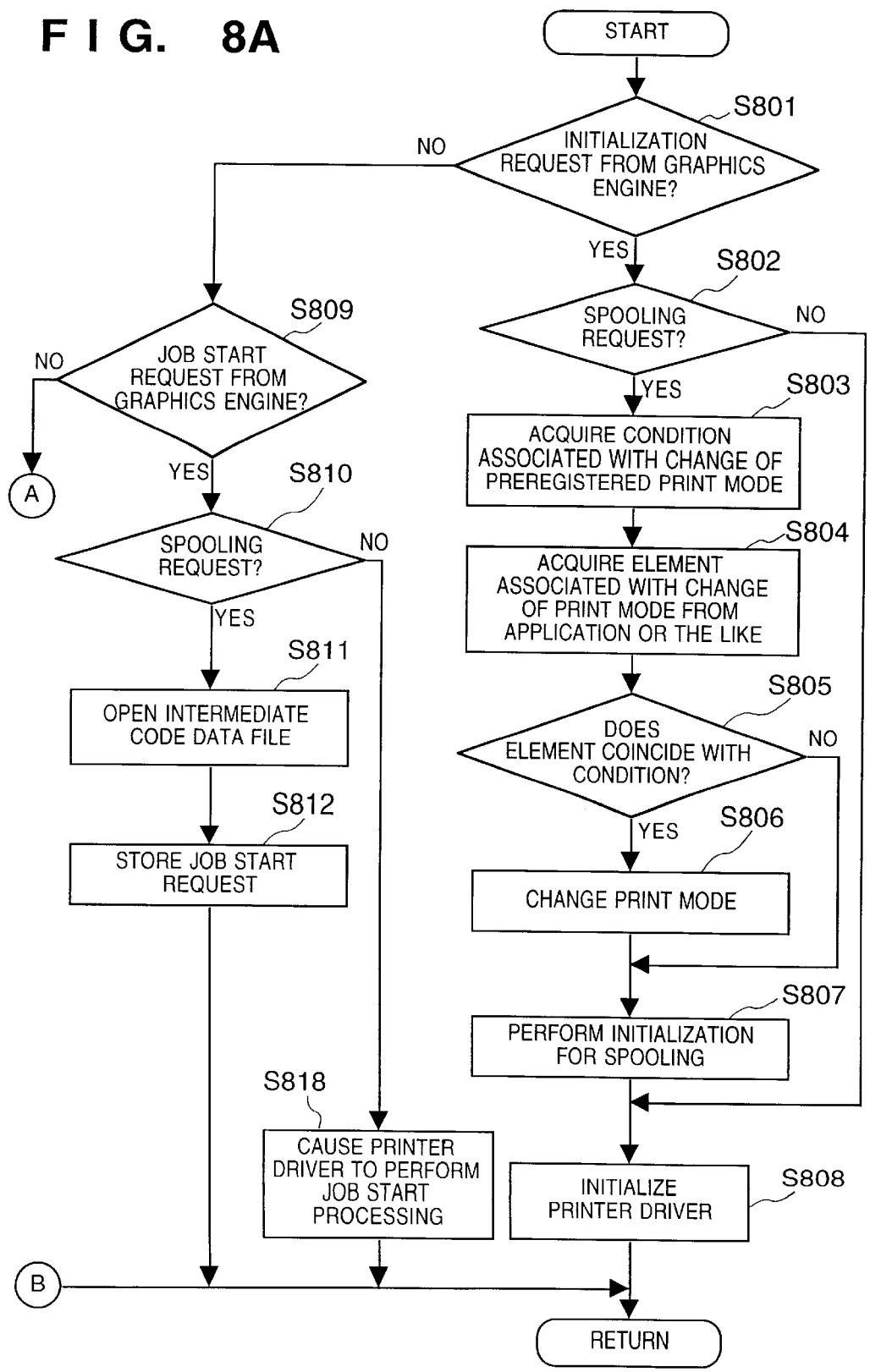

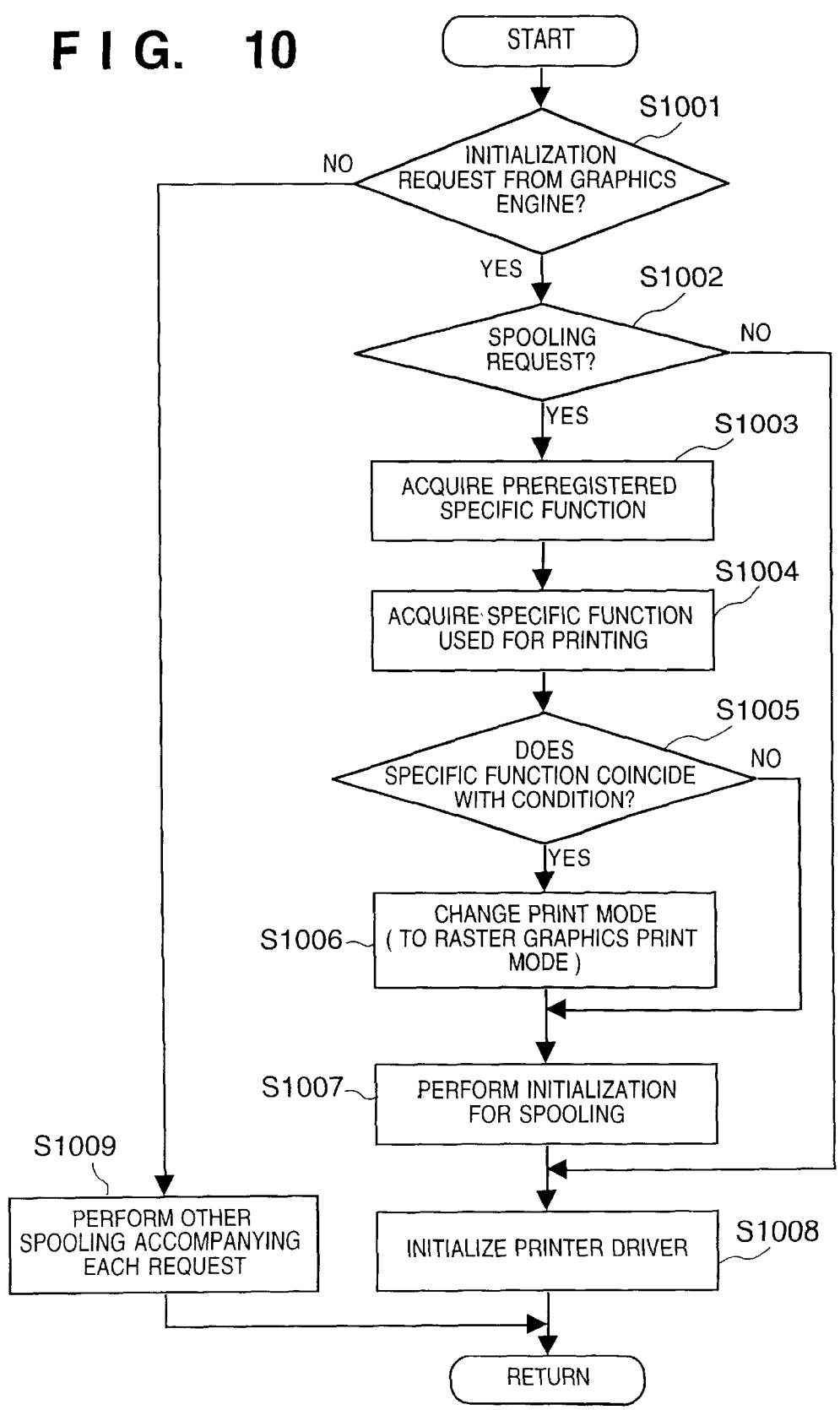

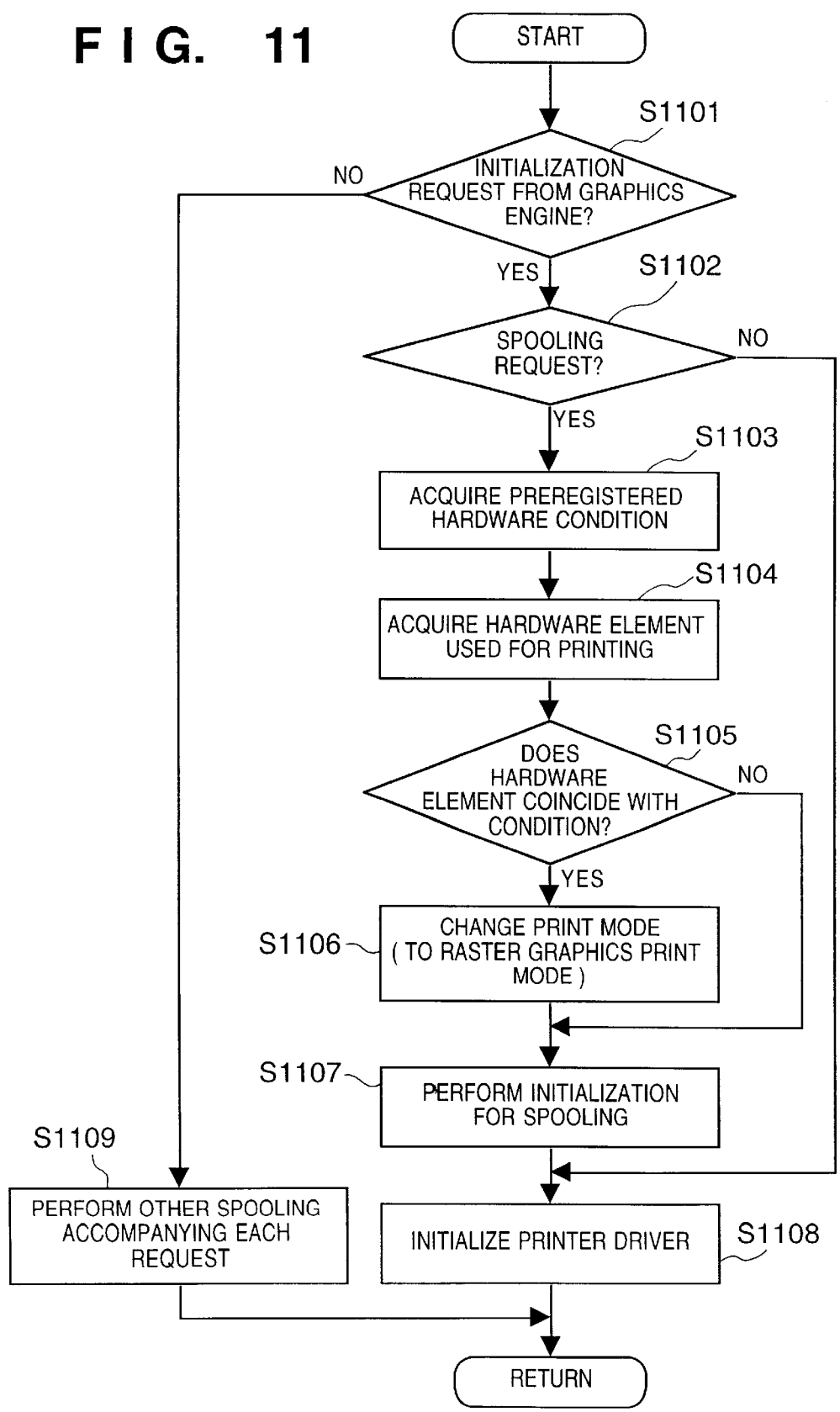

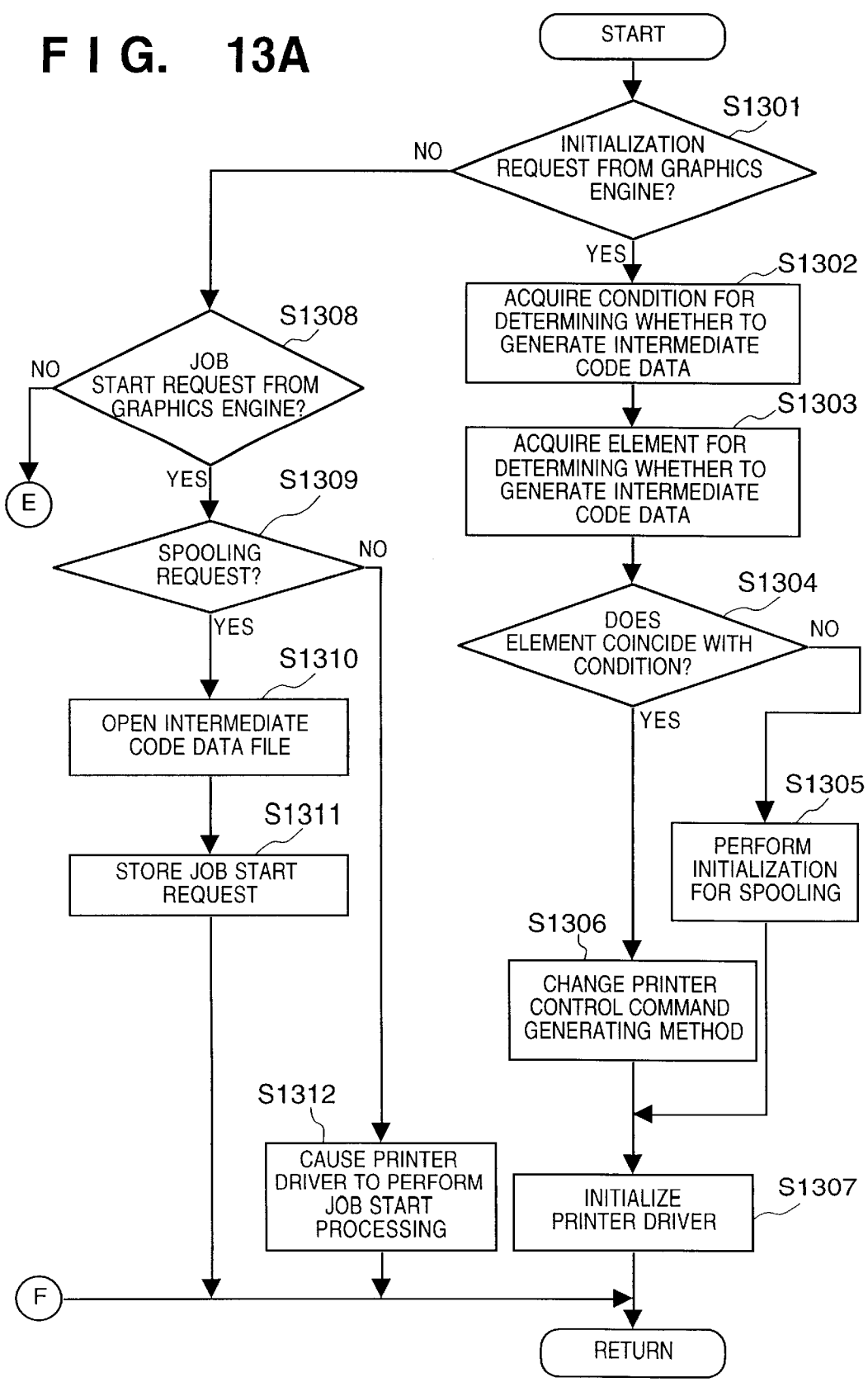

F I G. 13B
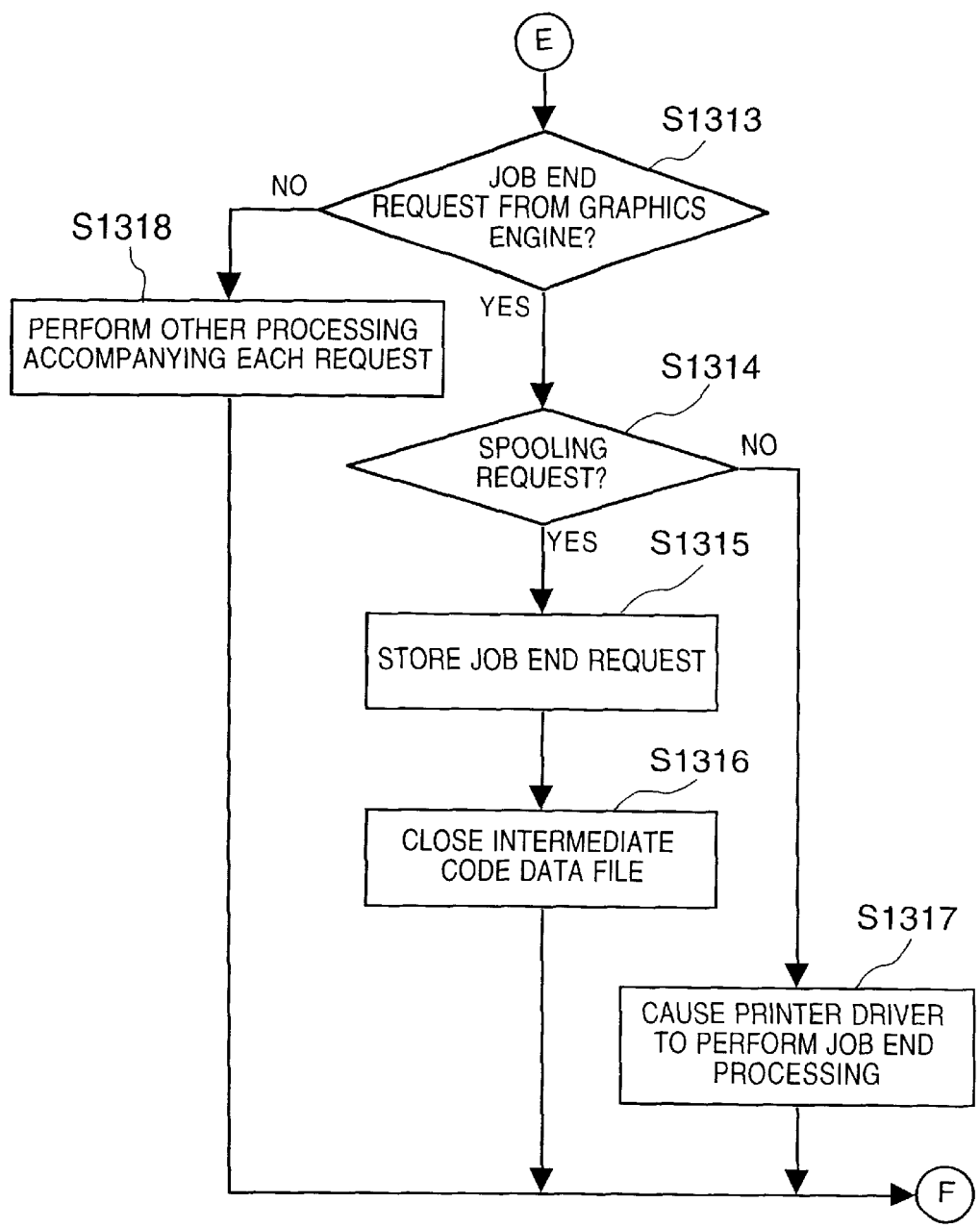

FIG. 23

| PAGE | PRINT MODE |
|---|---|
| 1 | Raster |
| 2 | Raster |
| 3 | Vector |
| 4 | Vector |
| 5 | Vector |

FIG. 28

|  | PRINTER DOUBLE-SIDED UNIT | PAPER DISCHARGE TRAY |
|---|---|---|
| STEP 1: PRINT FOURTH PAGE | LOWER SURFACE OF PAGE 4 | |
| STEP 2: PRINT SECOND PAGE | LOWER SURFACE OF PAGE 2<br><br>LOWER SURFACE OF PAGE 4 | |
| STEP 3: PRINT FIRST PAGE | LOWER SURFACE OF PAGE 4 | LOWER SURFACE OF PAGE 2<br>UPPER SURFACE OF PAGE 1 |
| STEP 4: PRINT THIRD PAGE | | LOWER SURFACE OF PAGE 4<br>UPPER SURFACE OF PAGE 3<br>LOWER SURFACE OF PAGE 2<br>UPPER SURFACE OF PAGE 1 |

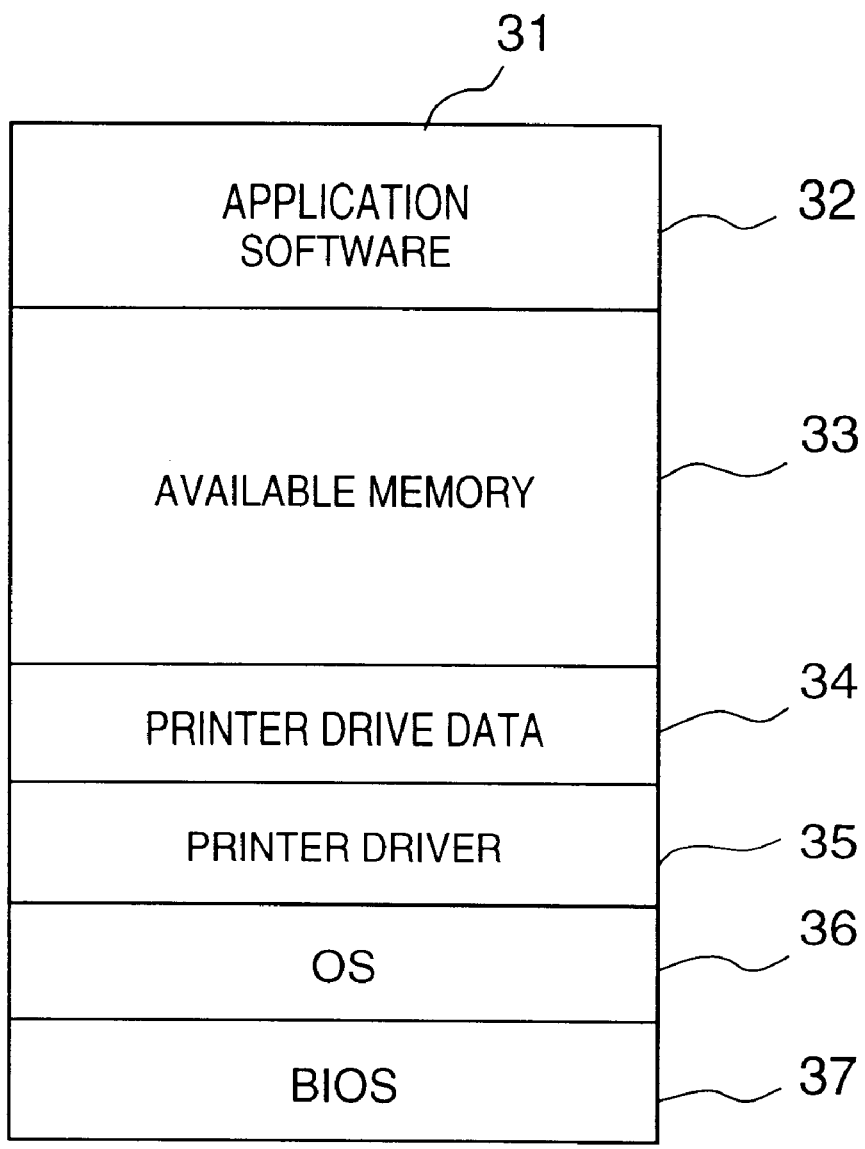

| |
|---|
| HORIZONTAL COORDINATE OF UPPER LEFT CORNER OF RECTANGLE (= left) |
| VERTICAL COORDINATE OF UPPER LEFT CORNER OF RECTANGLE (= top) |
| HORIZONTAL COORDINATE OF LOWER LEFT CORNER OF RECTANGLE (= right) |
| VERTICAL COORDINATE OF LOWER LEFT CORNER OF RECTANGLE (= bottom) |

FIG. 38

| TYPE OF PRINT REQUEST | ADDITIONAL INFORMATION |
|---|---|
| POINT PRINT | COORDINATES (2, 2) |
| RECTANGLE PRINT | COORDINATES (0,0) OF UPPER LEFT CORNER<br>COORDINATES (100, 200) OF LOWER RIGHT CORNER |
| LINE PRINT | COORDINATES (20, 40) OF START POINT<br>COORDINATES (300, 400) OF END POINT |
| RECTANGLE PRINT | COORDINATES (50, 50) OF UPPER LEFT CORNER<br>COORDINATES (60, 70) OF LOWER RIGHT CORNER |
| ELLIPSE PRINT | COORDINATES (500, 600) OF UPPER LEFT CORNER<br>OF CIRCUMSCRIBED RECTANGLE<br>COORDINATES (530, 650) OF UPPER LEFT CORNER<br>OF CIRCUMSCRIBED RECTANGLE |
| BITMAPPED PRINT | COORDINATES (10, 20) OF UPPER LEFT CORNER<br>WIDTH : 50   HEIGHT : 100 |
| ⋮ | ⋮ |

FIG. 41

| SCAN LINE NUMBER | PRINTED? |
|---|---|
| 1 | NO |
| 2 | YES |
| 3 | YES |
| 4 | NO |
| 5 | NO |
| 6 | YES |
| ... | ... |
| ... | ... |

PRINT CONTROL APPARATUS, PRINT DATA GENERATING APPARATUS, PRINT CONTROL METHOD, PRINT DATA GENERATING METHOD, AND STORAGE MEDIUM

BACKGROUND OF THE INVENTION

The present invention relates to a print control apparatus, print data generating apparatus, print control method, print data generating method, and storage medium and, more particularly, a print control apparatus and print data generating method of controlling print modes and generating printer control commands in a system comprised of an information processing apparatus such as a personal computer and a printer.

Some conventional print systems have a plurality of print modes in printing operation using a printer. For example, the print modes include the raster graphics print mode of sending data rasterized by a host unit and printing the data, and the vector graphics print mode of sending vector data to the printer and making the printer rasterize the data and print it. In such a print system comprised of a host computer and a printer connected thereto, although a plurality of print modes can be executed, only the print mode selected by a user is used for printing.

A print system is available to select a method of generating printer control commands for controlling a printer from, for example, a method of generating intermediate code data first and then generating final printer control commands, and a method of directly generating printer control commands. In this print system, the printer control command generating method explicitly selected by the user is used.

In some print systems, when a printer control command is to be generated in accordance with a selected print mode, the printer control command is generated from a print instruction generated by a graphics engine prepared in an application or OS. In such a print system, a print instruction is generated by the graphics engine regardless of the selected print mode.

With regard to a printer control command generating method, a program (raster printer driver) is known, which can generate printer control commands while immediately converting (rasterizing) print instructions issued from various applications into print images in a host computer connected to a printer. However, a printer driver designed to perform such operation must temporarily store a page image in a memory in the form of image data before generating a printer control command. With an increase in printer resolution in recent years, a memory area on the order of several megabytes is required depending on circumstances.

With a printer driver designed to perform such operation, therefore, a page is divided into smaller rectangular areas called bands and pieces of information rasterized into print images are stored as pieces of information corresponding to the respective bands in a memory area (band memory). Similar storing operation is repeated for each of the divided areas to store rasterized information in units of pages. When the last print instruction from the application is processed for one band area, the band memory is divided into small areas to generate a printer control command, as needed. The above procedure is continued while page break processing and the like are performed, as needed, until all the bands constituting all print pages are completely processed.

FIG. 17 is a flow chart showing the contents of processing performed by a conventional raster printer driver. First of all, the printer driver receives a print instruction from an application (step S1701). The printer driver checks whether the print instruction indicates a print start (step S1702). If the printer driver determines that the instruction is a print start request (YES in step S1702), the printer driver ensures a memory area (band memory) for storing a rasterized print image in the RAM of a host computer, and initializes the area (step S1703). The printer driver receives a print instruction from the application again.

If the printer driver determines in step S1702 that the print instruction received from the application does not indicate a print start (NO in step S1702), the printer driver checks whether the instruction indicates a print end (step S1704). Assume that the printer driver determines that the instruction does not indicate a print end (NO in step S1704). In this case, only when the instruction is a print request, the printer driver constructs (rasterizes) a print image corresponding to the contents of the request, and stores it in the band memory (step S1705). The processing in step S1705 is repeated until it is determined that the last print instruction from the application is processed for the band area in process (step S1706). If the printer driver determines in step S1706 that the last print instruction for the band area in process is processed (YES in step S1706), the flow advances to step S1707 to properly divide the band area into small areas and generate printer control commands corresponding to the respective small areas (step S1707).

Note that after step S1707 is processed, the printer driver initializes the band memory (step S1708) and starts receiving a print instruction corresponding to the new band area from the application. If the printer driver determines in step S1704 that the print instruction received from the application indicates a print end (YES in step S1704), the printer driver releases the band memory from the RAM (step S1709), and terminates the processing.

The following four problems are posed in this print system.

The first problem is that print processing is executed by using the print mode selected by the user without any consideration of the print throughput of the printer, proper printing, and the like in spite of the fact that a plurality of print modes can be selected.

The second problem is that print processing is executed by using the printer control command generating method explicitly selected by the user without any consideration of the print throughput of the printer, proper printing, and the like in spite of the fact that a plurality of printer control command generating methods can be selected.

According to the third problem, even if a print mode is selected in consideration of the print throughput of the printer, proper printing, and the like, a print instruction is generated irrelevantly to the print mode, and a print instruction unsuited to the print mode may be generated.

With regard to the fourth problem, the conventional raster printer driver also generates a printer control command corresponding to a band area in which printing is not actually performed, and transmits it to the printer in step S1707 in FIG. 17. In addition, even when only a printer control command corresponding to each band area having undergone printing is to be generated, all the contents of the band memory must be checked one by one to check whether printing has been performed in each of the divided small areas.

SUMMARY OF THE INVENTION

The present invention has been made to solve the first problem, and has as its object to provide a print system, print control apparatus, and print control method which can select the optimal print mode for a preset condition, increase the print throughput of the printer, and obtain proper print results.

The present invention has been made to solve the second problem, and has as its object to provide a print system, print control apparatus, and print control method which can select the optimal printer control command generating method for a preset condition, increase the print throughput of the printer, and obtain proper print results.

The present invention has been made to solve the third problem, and has as its object to provide a print system, print control apparatus, and print control method which can receive print instructions in a form suited to a selected print mode.

The present invention has been made to solve the fourth problem, and has as its object to provide a print system, print control apparatus, and print control method which can reduce or eliminate printer control command generation corresponding to non-printed areas in a band area.

In order to achieve the above objects, a print control apparatus, print data generating apparatus, print control method, print data generating method, and storage medium according to the present invention have the following arrangements, steps, and codes.

There is provided a print control apparatus for processing print information, which is connected to a printer, comprising selection means for selecting a print mode in accordance with a set condition, and control means for causing a printer driver to generate print data in the print mode, selected by the selection means, in accordance with a print instruction generated by a graphics engine.

There is also provided a print control apparatus for processing print information, which is connected to a printer, comprising selection means for selecting a print mode in accordance with a set condition, and generating means for generating print data in the print mode, selected by the selection means, in accordance with a print instruction generated by a graphics engine.

There is also provided a print data generating apparatus comprising print image construction means for constructing a print image on the basis of a print request received from application software, storage means for storing the print image constructed by the print image construction means in a band memory, area forming means for forming area information containing all print images constructed by the print image construction means, band memory dividing means for dividing the band memory in units of scan lines, and sequentially reading out the stored print images, determination means for determining whether the divided scan lines overlap the area information containing all the print images, and control command generating means for generating a printer control command corresponding to a print image at an overlapping portion on the basis of the determination.

There is also provided a print control method of processing print information, comprising the selection step of selecting a print mode in accordance with a set condition, and the control step of causing a printer driver to generate print data in the print mode, selected in the selection step in accordance with a print instruction generated by a graphics engine.

There is also provided a print control method of processing print information, comprising the selection step of selecting a print mode in accordance with a set condition, and the generating step of generating print data in the print mode, selected in the selection step, in accordance with a print instruction generated by a graphics engine.

There is also provided a print data generating method comprising the print image construction step of constructing a print image on the basis of a print request received from application software, the storage step of storing the print image constructed in the print image construction step in a band memory, the area forming step of forming area information containing all print images constructed in the print image construction step, the band memory dividing step of dividing the band memory in units of scan lines, and sequentially reading out the stored print images, the determination step of determining whether the divided scan lines overlap the area information containing all the print images, and the control command generating step of generating a printer control command corresponding to a print image at an overlapping portion on the basis of the determination.

There is also provided a storage medium storing a print control program for processing print information, the program comprising a code for the selection step of selecting a print mode in accordance with a set condition, and a code for the control step of causing a printer driver to generate print data in the print mode, selected in the selection step, in accordance with a print instruction generated by a graphics engine.

There is also provided a storage medium storing a print control program for processing print information, the program comprising a code for the selection step of selecting a print mode in accordance with a set condition, and a code for the generating step of generating print data in the print mode, selected in the selection step, in accordance with a print instruction generated by a graphics engine.

There is also provided a storage medium storing a program for generating print data, the program comprising a code for the print image construction step of constructing a print image on the basis of a print request received from application software, a code for the storage step of storing the print image constructed in the print image construction step in a band memory, a code for the area forming step of forming area information containing all print images constructed in the print image construction step, a code for the band memory dividing step of dividing the band memory in units of scan lines, and sequentially reading out the stored print images, a code for the determination step of determining whether the divided scan lines overlap the area information containing all the print images, and a code for the control command generating step of generating a printer control command corresponding to a print image at an overlapping portion on the basis of the determination.

According to a preferred aspect of the present invention, in the print control, the condition is a name of an application serving as a source from which the print instruction is issued.

According to another preferred aspect of the present invention, in the print control apparatus, the condition is a specific function designated by the print instruction.

According to still another preferred aspect of the present invention, in the print control apparatus defined in claim 1, the condition is a hardware function of the printer.

According to still another preferred aspect of the present invention, in the print control apparatus, the condition is that the print instruction is a special print instruction.

According to still another preferred aspect of the present invention, in the print control apparatus, the condition for selecting the print mode is acquired from a printer driver unique to the printer.

According to still another preferred aspect of the present invention, in the print control apparatus, the apparatus further comprises spool means for converting the print instruction into an intermediate code and temporarily storing the intermediate code, and de-spool means for causing the graphics engine to regenerate the print instruction on the basis of the intermediate code stored in the spool means, and the control means causes the printer driver to generate the print data in accordance with the print instruction regenerated by the graphics engine.

According to still another preferred aspect of the present invention, in the print control apparatus, when the graphics engine is caused to regenerate the print instruction, the graphics engine is notified of an ability of the printer driver in the print mode selected by the selection means, and is caused to generate the print instruction in accordance with the ability.

According to still another preferred aspect of the present invention, in the print control apparatus, the apparatus further comprises print mode storage means for storing print modes selected by the selection means in units of pages, and the control means changes the print mode in units of pages in accordance with the print mode stored in the print mode storage means.

According to still another preferred aspect of the present invention, in the print control apparatus, the apparatus further comprises print mode storage means for storing print modes selected by the selection means in units of pages, the spool means generates an intermediate code for performing layout printing on a single paper sheet from a print instruction for a plurality of pages when the printer is to perform layout printing of the plurality of pages on the single paper sheet, and the control means causes the printer driver to generate the print data to be printed on the single paper sheet in the print modes stored in the print mode storage means in units of pages on the basis of the intermediate code.

According to still another preferred of the present invention, in the print control apparatus, the apparatus further comprises print mode storage means for storing the print modes, in units of pages, which are selected by the selection means in units of pages, the spool means comprises print mode rearranging means for converting the print instruction into an intermediate code and rearranging the print modes in the print mode storage means in accordance with a rearranged order of pages to be actually printed by the printer, and the control means changes the print modes in units of pages in accordance with the order changed by the print mode rearranging means, and causes the printer driver to generate the print data.

According to still another preferred of the present invention, in the print control apparatus, the print modes include a raster graphics print mode of converting the print data into raster data, and a vector graphics print mode of converting the print data into vector data.

According to still another preferred aspect of. the present invention, in the print control apparatus, the condition is a name of an application serving as a source from which the print instruction is issued.

According to still another preferred of the present invention, in the print control apparatus, the condition is a specific function designated by the print instruction.

According to still another preferred aspect of the present invention, in the print control apparatus, the condition is a hardware function of the printer.

According to still another preferred aspect of the present invention, in the print control apparatus, the condition is that the print instruction is a special print instruction.

According to still another preferred aspect of the present invention, in the print control apparatus, the apparatus further comprises spool means for converting the print instruction into an intermediate code and temporarily storing the intermediate code, and de-spool means for causing the graphics engine to regenerate the print instruction on the basis of the intermediate code stored in the spool means, and the generating means generates the print data in accordance with the print instruction regenerated by the graphics engine.

According to still another preferred aspect of the present invention, in the print control apparatus, when the graphics engine is caused to regenerate the print instruction, the graphics engine is notified of an ability of the generating means in the print mode selected by the selection means, and is caused to generate the print instruction in accordance with the ability.

According to still another preferred aspect of the present invention, in the print control apparatus, the apparatus further comprises print mode storage means for storing print modes selected by the selection means in units of pages, and the generating means changes the print mode in units of pages in accordance with the print mode stored in the print mode storage means.

According to still another preferred aspect of the present invention, in the print control apparatus, the apparatus further comprises print mode storage means for storing print modes selected by the selection means in units of pages, the spool means generates an intermediate code for performing layout printing on a single paper sheet from a print instruction for a plurality of pages when the printer is to perform layout printing of the plurality of pages on the single paper sheet, and the generating means generates the print data to be printed on the single paper sheet in the print modes stored in the print mode storage means in units of pages on the basis of the intermediate code.

According to still another preferred aspect of the present invention, in the print control apparatus, the apparatus further comprises print mode storage means for storing the print modes selected by the selection means in units of pages, the spool means comprises print mode rearranging means for converting the print instruction into an intermediate code and rearranging the print modes in the print mode storage means in accordance with a rearranged order of pages to be actually printed by the printer, and the generating means changes the print modes in units of pages in accordance with the order changed by the print mode rearranging means, and generates the print data.

According to still another preferred of the present invention, in the print control apparatus, the print modes include a raster graphics print mode of converting the print data into raster data, and a vector graphics print mode of converting the print data into vector data.

According to still another preferred of the present invention, in the print data generating apparatus, the area containing all the print images constructed by the print image construction means is rectangular.

According to still another preferred aspect of the present invention, in the print data generating apparatus, the apparatus further comprises storage means for storing printed area information in units of print requests, and second determination means for determining whether the area information stored in the storage means overlaps each of the scan lines, and the control command generating means generates a printer control command corresponding to a print image on the overlapping portion.

According to still another preferred of the present invention, in the print data generating apparatus, the scan lines are formed in units of horizontal lines each having a height of one pixel.

According to still another preferred aspect of the present invention, in the print data generating apparatus, when the plurality of print images are input, the area can be expanded to contain all the images.

According to still another preferred aspect of the present invention, in the print data generating apparatus, the area containing all the print images constructed by the print image construction means is circular.

According to still another preferred aspect of the present invention, in the print data generating apparatus, the area containing all the print images constructed by the print image construction means is elliptic.

According to still another preferred aspect of the present invention, in the print data generating apparatus, the apparatus further comprises print information table storage means for retaining rasterized print images in divided band memories, and storing information for determining, in units of the band memories, whether printing has been performed, and third determination means for determining in units of band memories, on the basis of the stored information, whether printing has been performed, and generates a printer control command for the print image when the stored information indicates that printing has been performed.

According to still another preferred aspect of the present invention, in the print data generating apparatus, the band memory is divided in units of rectangles.

According to still another preferred aspect of the present invention, in the print control method, the condition is a name of an application serving as a source from which the print instruction is issued.

According to still another preferred aspect of the present invention, in the print control method, the condition is a specific function designated by the print instruction.

According to still another preferred aspect of the present invention, in the print control method, the condition is a hardware function of the printer.

According to still another preferred aspect of the present invention, in the print control method, the condition is that the print instruction is a special print instruction.

According to still another preferred aspect of the present invention, in the print control method, the condition for selecting the print mode is acquired from a printer driver unique to the printer.

According to still another preferred aspect of the present invention, in the print control method, the method further comprises the spool step of converting the print instruction into an intermediate code and temporarily storing the intermediate code, and the de-spool step of causing the graphics engine to regenerate the print instruction on the basis of the intermediate code stored in the spool step, and the control step includes causing the printer driver to generate the print data in accordance with the print instruction regenerated by the graphics engine.

According to still another preferred aspect of the present invention, in the print control method, the method further comprises the step of, when the graphics engine is caused to regenerate the print instruction, notifying the graphics engine of an ability of the printer driver in the print mode selected in the selection step, and causing the graphics engine to generate the print instruction in accordance with the ability.

According to still another preferred aspect of the present invention, in the print control method, the method further comprises the print mode storage step of storing print modes selected in the selection step in units of pages, and the control step includes changing the print mode in units of pages in accordance with the print mode stored in the print mode storage step.

According to still another preferred aspect of the present invention, in the print control method, the method further comprises the print mode storage step of storing print modes selected in the selection step in units of pages, the spool step includes generating an intermediate code for performing layout printing on a single paper sheet from a print instruction for a plurality of pages when the printer is to perform layout printing of the plurality of pages on the single paper sheet, and the control step includes causing the printer driver to generate the print data to be printed on the single paper sheet in the print modes stored in the print mode storage step in units of pages on the basis of the intermediate code.

According to still another preferred aspect of the present invention, in the print control method, the method further comprises the print mode storage step of storing the print modes, in units of pages, which are selected in the selection step in units of pages, the spool step includes the print mode rearranging step of converting the print instruction into an intermediate code and rearranging the print modes in the print mode storage step in accordance with a rearranged order of pages to be actually printed by the printer, and the control step includes changing the print modes in units of pages in accordance with the order changed in the print mode rearranging step, and causing the printer driver to generate the print data.

According to still another preferred aspect of the present invention, in the print control method, the print modes include a raster graphics print mode of converting the print data into raster data, and a vector graphics print mode of converting the print data into vector data.

According to still another preferred aspect of the present invention, in the print control method, the condition is a name of an application serving as a source from which the print instruction is issued.

According to still another preferred aspect of the present invention, in the print control method, the condition is a specific function designated by the print instruction.

According to still another preferred aspect of the present invention, in the print control method, the condition is a hardware function of the printer.

According to still another preferred aspect of the present invention, in the print control method, the condition is that the print instruction is a special print instruction.

According to still another preferred aspect of the present invention, in the print control method, the method comprises the spool step of converting the print instruction into an intermediate code and temporarily storing the intermediate code, and the de-spool step of causing the graphics engine to regenerate the print instruction on the basis of the intermediate code stored in the spool step, and the generating step includes generating the print data in accordance with the print instruction regenerated by the graphics engine.

According to still another preferred aspect of the present invention, in the print control method, the method further comprises the step of, when the graphics engine is caused to regenerate the print instruction, notifying the graphics engine of an ability in the generating step in the print mode selected in the selection step, and causing the graphics engine to generate the print instruction in accordance with the ability.

According to still another preferred aspect of the present invention, in the print control method, the method further comprises the print mode storage step of storing print modes selected in the selection step in units of pages, and the generating step includes changing the print mode in units of pages in accordance with the print mode stored in the print mode storage step.

According to still another preferred aspect of the present invention, in the print control method, the method further comprises the print mode storage step of storing print modes selected in the selection step in units of pages, the spool step includes generating an intermediate code for performing layout printing on a single paper sheet from a print instruction for a plurality of pages when the printer is to perform layout printing of the plurality of pages on the single paper sheet, and the generating step includes generating the print data to be printed on the single paper sheet in the print modes stored in the print mode storage step in units of pages on the basis of the intermediate code.

According to still another preferred aspect of the present invention, in the foregoing print control method, the method further comprises the print mode storage step of storing the print modes selected in the selection step in units of pages, the spool step includes the print mode rearranging step of converting the print instruction into an intermediate code and rearranging the print modes in the print mode storage step in accordance with a rearranged order of pages to be actually printed by the printer, and the generating step includes changing the print modes in units of pages in accordance with the order changedin the print mode rearranging step, and generating the print data.

According to still another preferred aspect of the present invention, in the foregoing print control method, the print modes include a raster graphics print mode of converting the print data into raster data, and a vector graphics print mode of converting the print data into vector data.

According to still another preferred aspect of the present invention, in the print data generating method, the area containing all the print images constructed in the print image construction step is rectangular.

According to still another preferred aspect of the present invention, in the print data generating method, the method further comprises the storage step of storing printed area information in units of print requests, and the second determination step of determining whether the area information stored in the storage step overlaps each of the scan lines, and the control command generating step includes generating a printer control command corresponding to a print image on the overlapping portion.

According to still another preferred aspect of the present invention, in the print data generating method, the scan lines are formed in units of horizontal lines each having a height of one pixel.

According to still another preferred aspect of the present invention, in the print data generating method, when the plurality of print images are input, the area can be expanded to contain all the images.

According to still another preferred aspect of the present invention, in the print data generating method, the area containing all the print images constructed in the print image construction step is circular.

According to still another preferred aspect of the present invention, in the print data generating method, the area containing all the print images constructed in the print image construction step is elliptic.

According to still another preferred aspect of the present invention, in the print data generating method, the method further comprises the print information table storage step of retaining rasterized print images in divided band memories, and storing information for determining, in units of the band memories, whether printing has been performed, and the third determination step of determining in units of band memories, on the basis of the stored information, whether printing has been performed, and a printer control command is generated for the print image when the stored information indicates that printing has been performed.

According to still another preferred aspect of the present invention, in the print data generating method, the band memory is divided in units of rectangles.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, server to explain the principles of the invention.

FIGS. 8A and 8B are flow charts showing a procedure in the first embodiment;

FIG. 10 is a flow chart showing a procedure for selecting a print mode in the second embodiment;

FIG. 11 is a flow chart showing a procedure for selecting a print mode in the third embodiment;

FIGS. 13A and 13B are flow charts showing a procedure in the fifth embodiment;

FIG. 23 is a print mode information table in the ninth embodiment;

FIG. 28 is a view showing how paper sheets are conveyed in a printer 1500 in the execution of double-sided printing;

FIG. 31 is a view showing the state of a memory map in the 12th embodiment;

FIG. 38 is a printed area information table in the 13th embodiment;

FIG. 41 is a printed area information table in the 14th embodiment;

DETAILED DESCRIPTION OF THE PREFERRED EMBODIMENTS

Preferred embodiments of the present invention will be described in detail in accordance with the accompanying drawings.

[First Embodiment]

An embodiment to which the present invention can be suitably applied will be described below.

<Arrangement of Print System>

Figure 1:
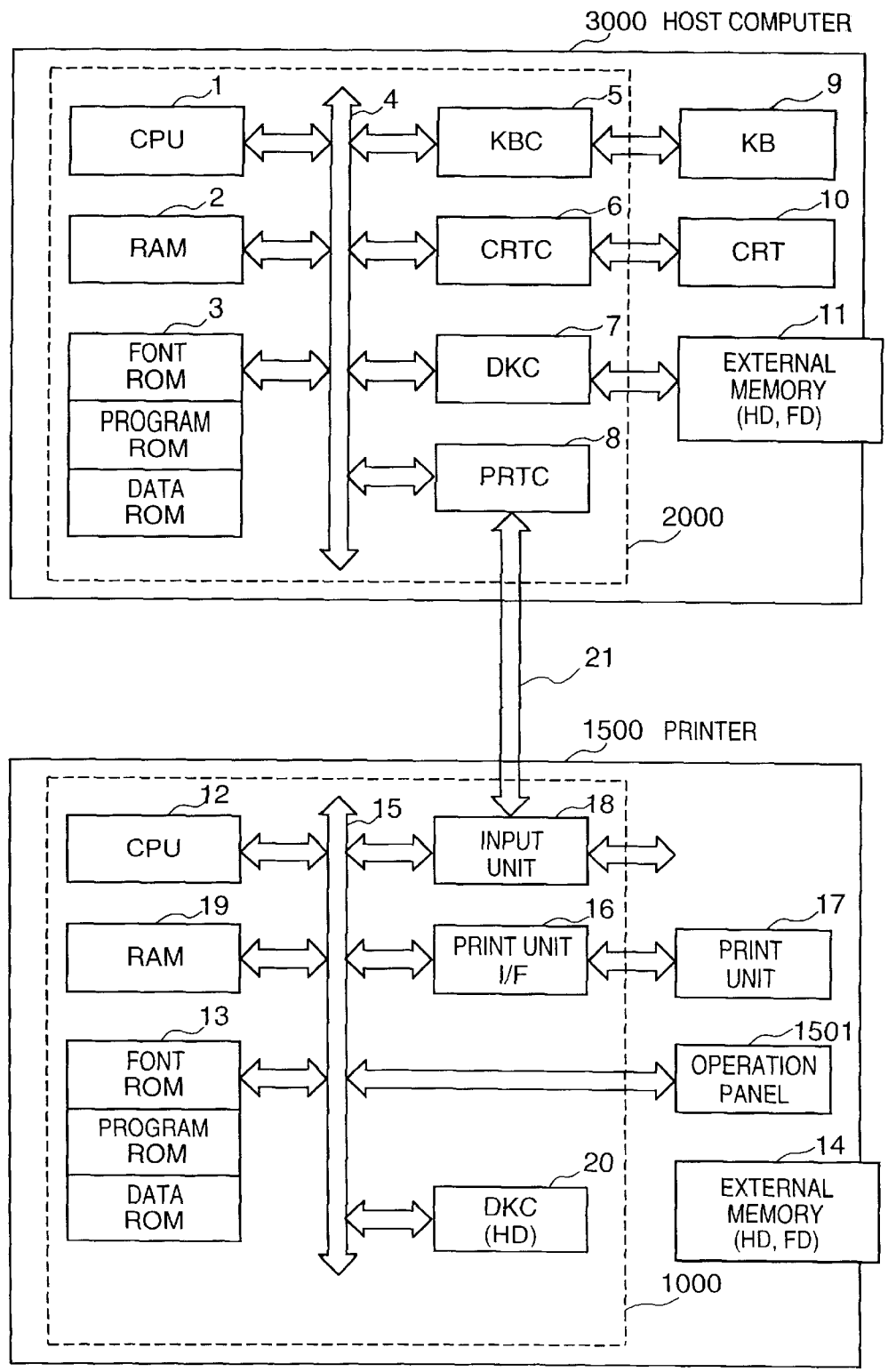
FIG. 1 is a block diagram for explaining the arrangement of a printer control system according to embodiments of the present invention.

FIG. 1 is a block diagram for explaining the arrangement of a printer control system according to an embodiment of the present invention. Obviously, the present invention can be applied to a single device, a system comprised of a plurality of portable devices, and a system in which devices are connected to each other through a network such as a LAN or WAN to perform processing as long as the functions of the present invention can be executed.

Referring to FIG. 1, a host computer 3000 has a CPU 1 for processing document data including graphics, images, characters, tables (including spreadsheets and the like), and the like on the basis of document processing programs and the like stored in the program ROM of a ROM 3 or an external memory 11. The CPU 1 controls the respective devices connected to a system bus 4 as a whole. An operating system program (to be referred to as an OS) as a control program for the CPU 1 is stored in the program ROM of the ROM 3 or the external memory 11. The font ROM of the ROM 3 or the external memory 11 stores font data and the like used for the above document processing. The data ROM of the ROM 3 or the external memory 11 stores various data used for the above document processing.

A RAM 2 functions as a main memory, work memory, and the like for the CPU 1. A keyboard controller (KBC) 5 controls key input through a keyboard 9 or a pointing device (not shown). A CRT controller (CRTC) 6 controls display operation of a CRT display (CRT) 10. A disk controller (DKC) 7 controls access to the external memory 11 such as a hard disk (HD), floppy disk (FD), or the like which stores various applications, font data, user files, edit files, printer control command generation program (to be referred to as a printer driver), and the like. A printer controller (PRTC) 8 is connected to a printer 1500 through a predetermined bidirectional interface (interface) 21 to execute communication control processing for the printer 1500.

Note that the CPU 1 implements so-called WYSIWYG (What You See Is What You Get) on the CRT 10 by executing bitmapping (rasterization) of outline font data in, for example, a display information RAM set in the RAM 2. In addition, the CPU 1 opens various registered windows on the basis of commands designated by the mouse cursor (not shown) and the like on the CRT 10, and executes various data processes. In executing printing, the user opens a window associated with print settings to perform printer setting and print processing method setting for a printer driver, including selection of a print mode.

In the printer 1500, a printer CPU 12 outputs an image signal as output information to a print unit (printer engine) 17 connected to a system bus 15 on the basis of a control program or the like stored in the program ROM of a ROM 13 or external memory 14. This program ROM of the ROM 13 also stores control programs and the like for the CPU 12. The font ROM of the ROM 13 stores font data and the like used to generate the above output information. In a printer without the external memory 14 such as a hard disk, the data ROM of the ROM 13 stores information and the like used on the host computer. The CPU 12 can communicate with the host computer through an input unit 18 and can notify the host computer 3000 of information and the like in the printer.

A RAM 19 functions as a main memory, work area, and the like for the CPU 12. The memory capacity of this RAM can be expanded by connecting an optional RAM to an add-on port (not shown). Note that the RAM 19 is used as an output information bitmapping area, environment data storage area, NVRAM, and the like. A memory controller (MC) 20 controls access to the above external memory 14 such as a hard disk (HD) or IC card. The external memory 14 is connected as an option to store font data, an emulation program, form data, and the like. Operation switches, LED displays, and the like are arranged on an operation panel 1501.

The above external memory is not limited to one, and at least one external memory may be used. For example, an optional font card (in addition to the internal font) and a plurality of external memories storing programs for interpreting printer control languages based on different language systems may be connected to the printer. In addition, the printer may have an NVRAM (not shown) to store printer mode setting information from the operation panel 1501.

<Functional Arrangement of Print System>

Figure 2:
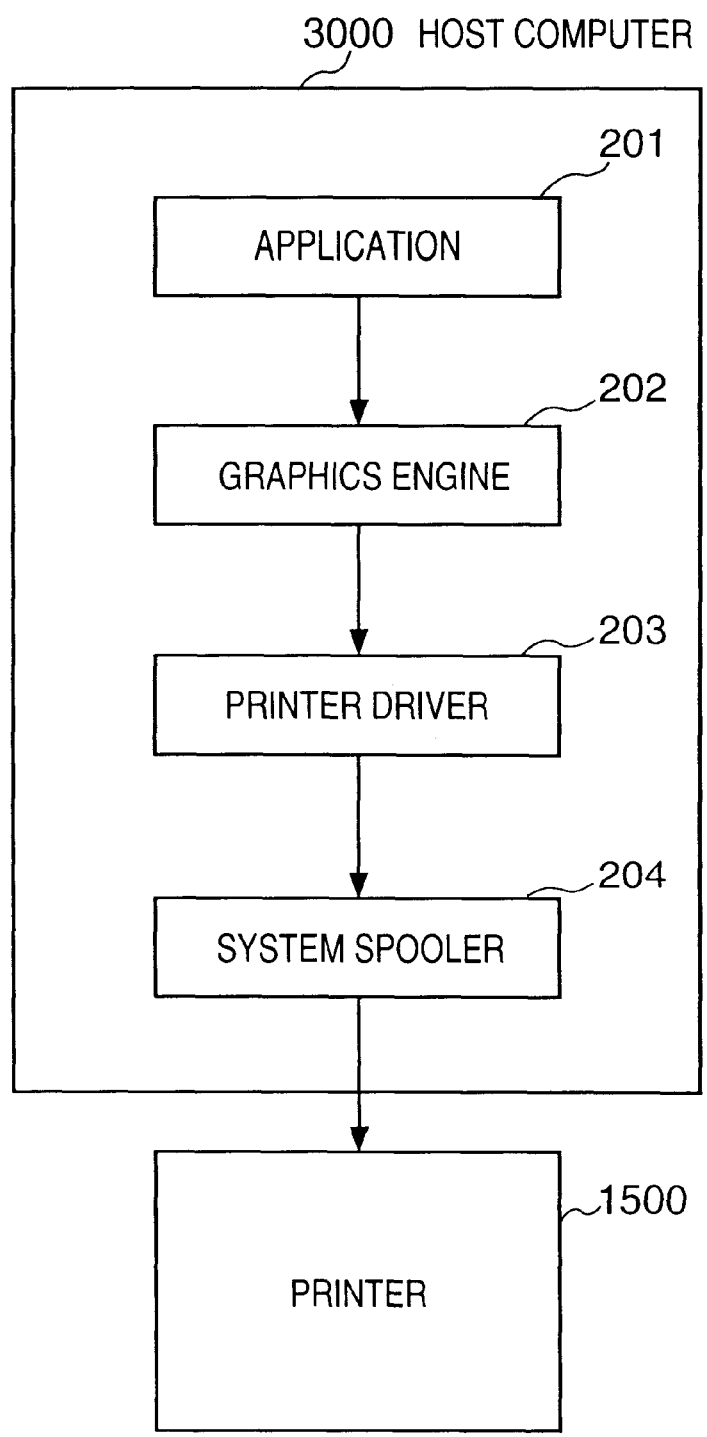
FIG. 2 is a block diagram showing the arrangement of a print processing system according to the embodiments of the present invention.

FIG. 2 is a block diagram showing a print system in a host computer to which a print apparatus such as a printer is connected directly or through a network. The blocks in the host computer 3000 in FIG. 2 respectively represent the functions implemented when the CPU 1 executes the corresponding programs. An application 201, graphics engine 202, printer driver 203, and system spooler 204 are program modules that exist as files stored in the external memory 11 and are loaded into the RAM 2 by the OS or a module using OS modules in execution.

The application 201 and the printer driver 203 can be stored in the FD as the external memory 11 or CD-ROM (not shown) or may be stored in the HD as the external memory 11 through a network (not shown). The application 201 stored in the external memory 11 is loaded into the RAM 2 to be executed. When this application 201 is to perform printing at the printer 1500, output operation (printing) is performed by using the graphics engine 202 that is also designed to be loaded into the RAM 2 to be executed.

As the graphics engine 202, a graphics device interface (to be referred to as a GDI) in MS-Windows from Microsoft or the like is available. The GDI provides an application with a common graphics interface that is independent of output devices such as a printer and display.

The graphics engine 202 loads the printer driver 203 prepared for each print apparatus from the external memory 11 into the RAM 2, and converts an output from the application 201 into a printer control command by using the printer driver 203. The printer control command is output to the printer 1500 through the system spooler 204 loaded into the RAM 2 and the interface 21 under the control of the OS.

Figure 3:
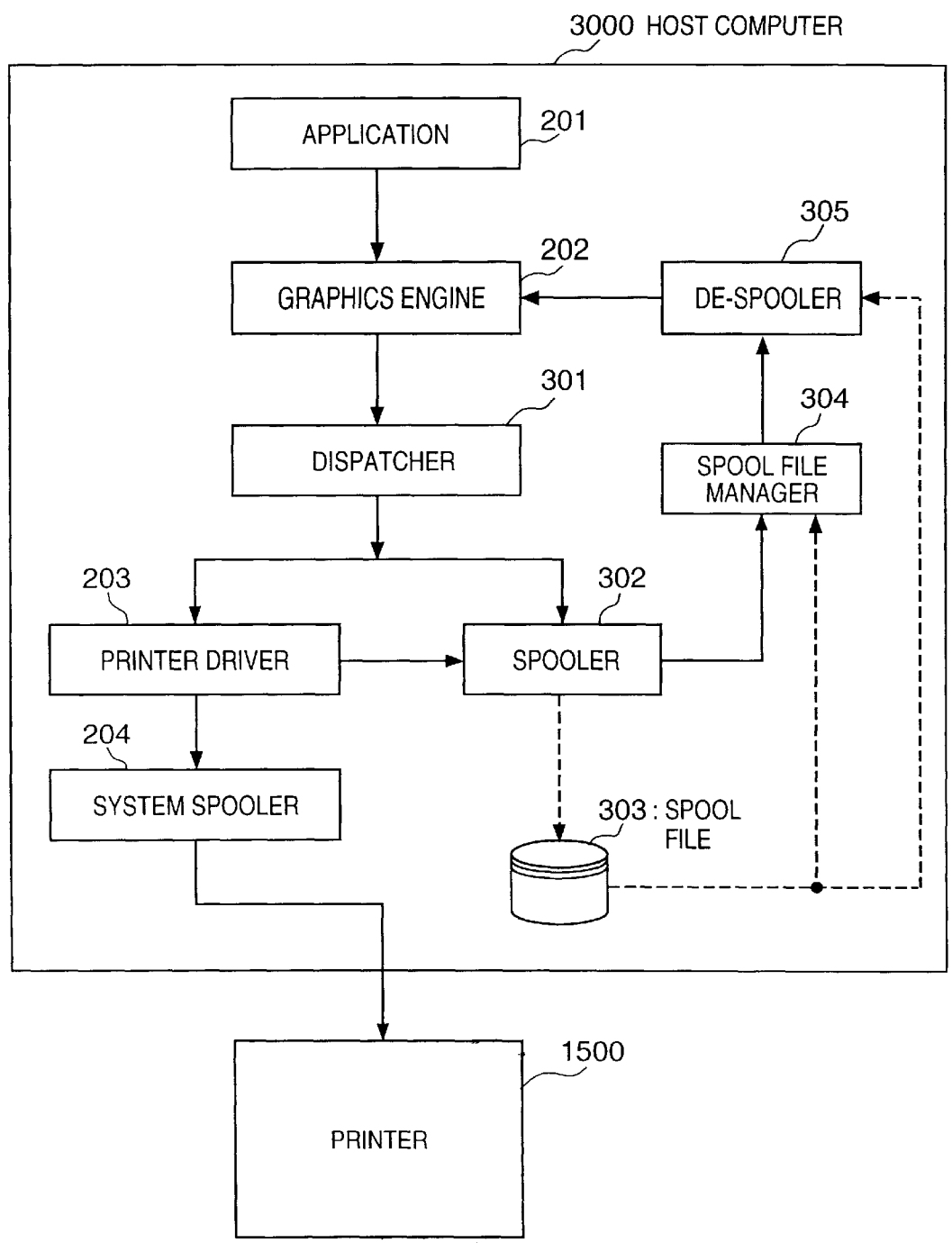
FIG. 3 is a block diagram showing the detailed arrangement of the print processing system according to the embodiments of the present invention.

The present invention is based on the print system comprised of the printer and host computer shown in FIG. 2, but can also be applied to a system designed to temporarily spool print data from an application in the form of intermediate code data, as shown in FIG. 3. FIG. 3 shows a system obtained by upgrading the system in FIG. 2. In this system, when a print instruction is to be sent from the graphics engine 202 to the printer driver 203, a spool file 303 consisting of intermediate code data is temporarily created. In the system shown in FIG. 2, the application 201 is not released from the print processing until the printer driver 203 completes conversion of all print instructions from the graphics engine 202 into printer control commands. In contrast to this, in the system shown in FIG. 3, the application 201 is released from the print processing when a spooler 302 converts all print instructions into intermediate code data and outputs the data to the spool file 303. In general, the latter case requires less time.

In addition, in the system shown in FIG. 3, the contents of the spool file 303 can be processed. This can realize functions other than those of the application, e.g., the function of enlarging/reducing print data from the application and the function of reducing a plurality of pages to one page and printing it. For these purposes, the system in FIG. 2 is upgraded such that print instructions are spooled in the form of intermediate code data, as shown in FIG. 3. In general, to process print data, setting is performed on a window provided by the printer driver 203, and the printer driver 203 stores the set contents in the RAM 2 or the external memory 11.

When the present invention is applied to the system in FIG. 3, a print system, print control apparatus, and print control method can be provided, which can select an optimal print mode for preset conditions, increase the print throughput of the printer, and obtain proper print results while providing functions other than those of an application and printer driver.

<Outline of Print Operation>

The print system in FIG. 3 will be described in detail below. As shown in FIG. 3, according to this upgraded processing scheme, a dispatcher 301 receives a print instruction from the graphics engine 202. If the print instruction received from the graphics engine 202 is one that is issued from the application 201 to the graphics engine 202, the dispatcher 301 loads the spooler 302, stored in the external memory 11, into the RAM 2, and sends the print instruction to the spooler 302 instead of the printer driver 203.

The spooler 302 converts the received print instruction into an intermediate code and outputs it to the spool file 303. The spooler 302 also obtains process setting information about print data, set for the printer driver 203, from the printer driver 203, and stores it in the spool file 303. Although the spool file 303 is created as a file in the external memory 11, it can be created in the RAM 2. The spooler 302 loads a spool file manager 304, stored in the external memory 11, into the RAM 2, and notifies the spool file manager 304 of the creation state of the spool file 303.

Subsequently, upon determining on the basis of the process setting information associated with the print data and stored in the spool file 303 that printing can be performed by using the graphics engine 202 again, the spool file manager 304 loads a de-spooler 305, stored in the external memory 11, into the RAM 2, and commands the de-spooler 305 to perform print processing for the intermediate code data described in the spool file 303.

The de-spooler 305 processes the intermediate code data contained in the spool file 303 in accordance with the process setting information contained in the spool file 303, and outputs the resultant data through the graphics engine 202 again. If the print instruction received from the graphics engine 202 is one that is issued from the de-spooler 305 to the graphics engine 202, the dispatcher 301 sends the print instruction to the printer driver 203 instead of the spooler 302. The printer driver 203 generates a printer control command and outputs it to the printer 1500 through the system spooler 204.

<Print Mode>

In this embodiment, as an example of switching of a plurality of print modes of the printer, a scheme of dynamically switching two printer control command generating methods that greatly differ from each other will be described next. These printer control command generating methods are executed on the printer driver 203. A print mode of the printer 1500 that has received a printer control command generated by the printer driver 203 is determined in accordance with the contents of the command. The two printer control command generating methods in the printer driver 203 will be described below with reference to flow charts an the like. The processing indicated by the flow charts can be executed on the standard print system based on the host computer shown in FIG. 2 and the print system in FIG. 3, which is obtained by upgrading the system in FIG. 2. When the application 201, which is loaded into the RAM 2 and operated in accordance with an instruction from the user or the like, starts print processing on the host computer 3000 under the control of the OS, the printer driver 203 that is also loaded into the RAM 2 generates a printer control command in either the vector graphics print mode shown in FIG. 4 or the raster graphics print mode shown in FIG. 5.

Figure 4:
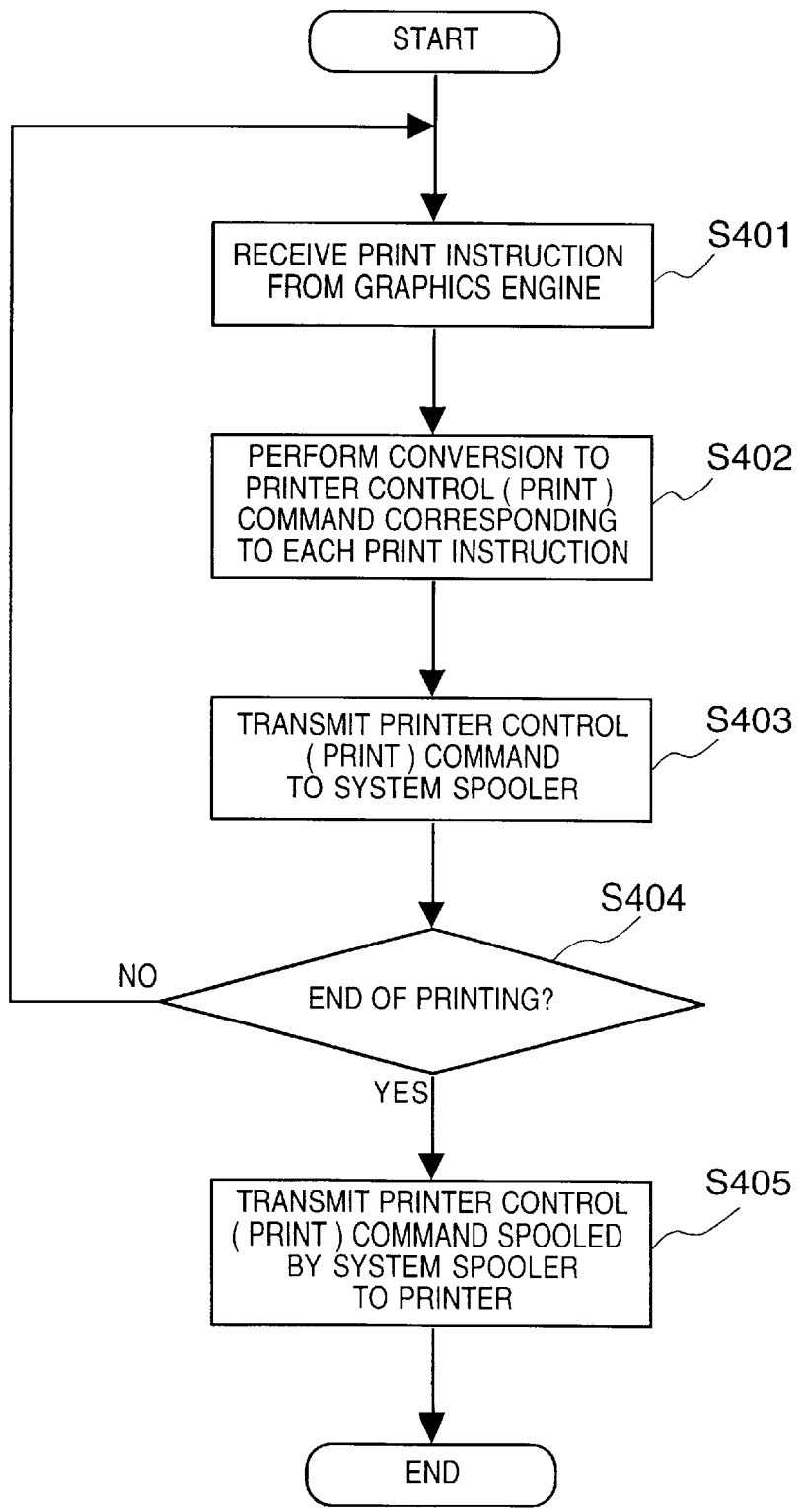
FIG. 4 is a flow chart showing an outline of a procedure for the vector graphics print mode in the embodiments of the present invention.

In the vector graphics print mode, the printer driver 203 operates in accordance with the procedure shown in FIG. 4.

The printer driver 203 receives a print instruction from the application 201 through the graphics engine 202 (step S401), and generates printer control (print) command data corresponding to each print instruction (e.g., a line print instruction) (step S402). The generated printer control command data is spooled in the RAM 2, external memory 11, or the like by the system spooler 204 (step S403). These processes are repeated until the print processing performed by the application 201 and the graphics engine 202 is complete (step S404). Upon completion of the print processing, the printer control command data spooled by the system spooler 204 is transmitted to the printer 1500 (step S405).

The printer control command generating method executed by the printer driver 203 in the vector graphics print mode is characterized in that a printer control (print) command used to generate a geometric image such as lines corresponding to vector graphics is transmitted to the printer, and hence a print image is generated (rasterized) by a program loaded from the program ROM 13 of the printer 1500 into the RAM 19.

Figure 5:
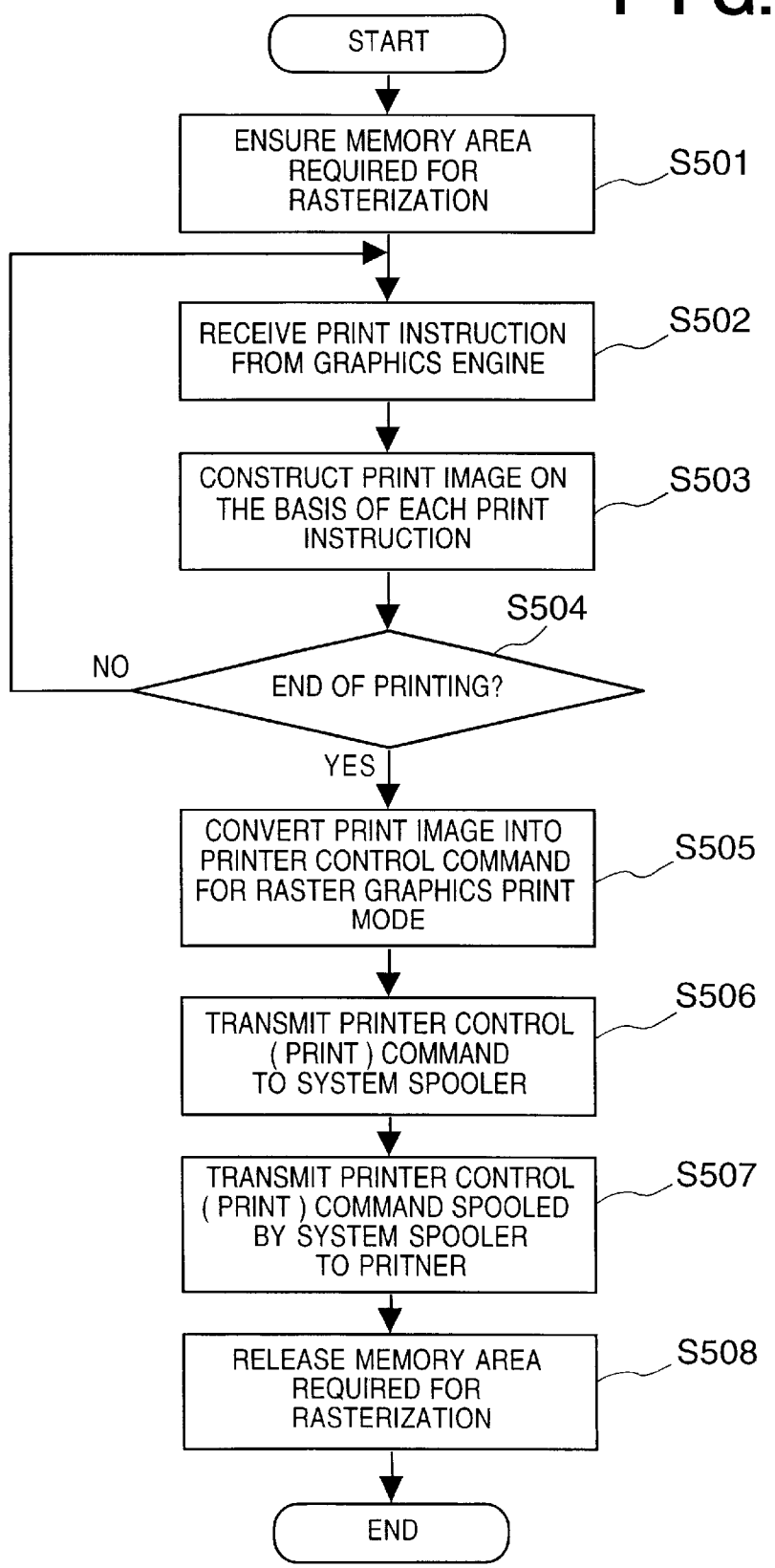
FIG. 5 is a flow chart showing an outline of a procedure for the raster graphics print mode in the embodiments of the present invention.

The method based on the raster graphics print mode shown in FIG. 5 will be described next. The printer driver 203 first ensures a memory area (to be referred to as a band memory), in the RAM 2, in which the print image rasterized by the printer driver 203 on the host computer 3000 is stored (step S501), and then receives a print instruction from the application 201 through the graphics engine 202 (step S502). The received print instruction (e.g., a line print command) is immediately rasterized into a print image by the printer driver 203 (step S503) and stored in the band memory. This process is repeated until the print processing performed by the application 201 and the graphics engine 202 is complete (step S504). Upon completion of the print processing, the printer driver 203 converts the print image stored in the band memory into a plurality of printer control (print) commands corresponding to printing of bitmapped data by fragmentation or the like, as needed (step S505), and outputs them to the system spooler 204 (step S506). The system spooler 204 transmits the spooled printer control commands to the printer (step S507). The printer driver 203 then releases the band memory (step S508).

The printer control command generating method executed by the printer driver 203 in the raster graphics print mode is characterized in that a print instruction such as a line print instruction is rasterized by the printer driver 203 that is loaded into the RAM 2 of the host computer 3000 to operate, and hence most of the printer control (print) commands transmitted to the printer 1500 are basically commands corresponding to a bitmapped image.

<Memory Map in Host Computer>

Figure 6:
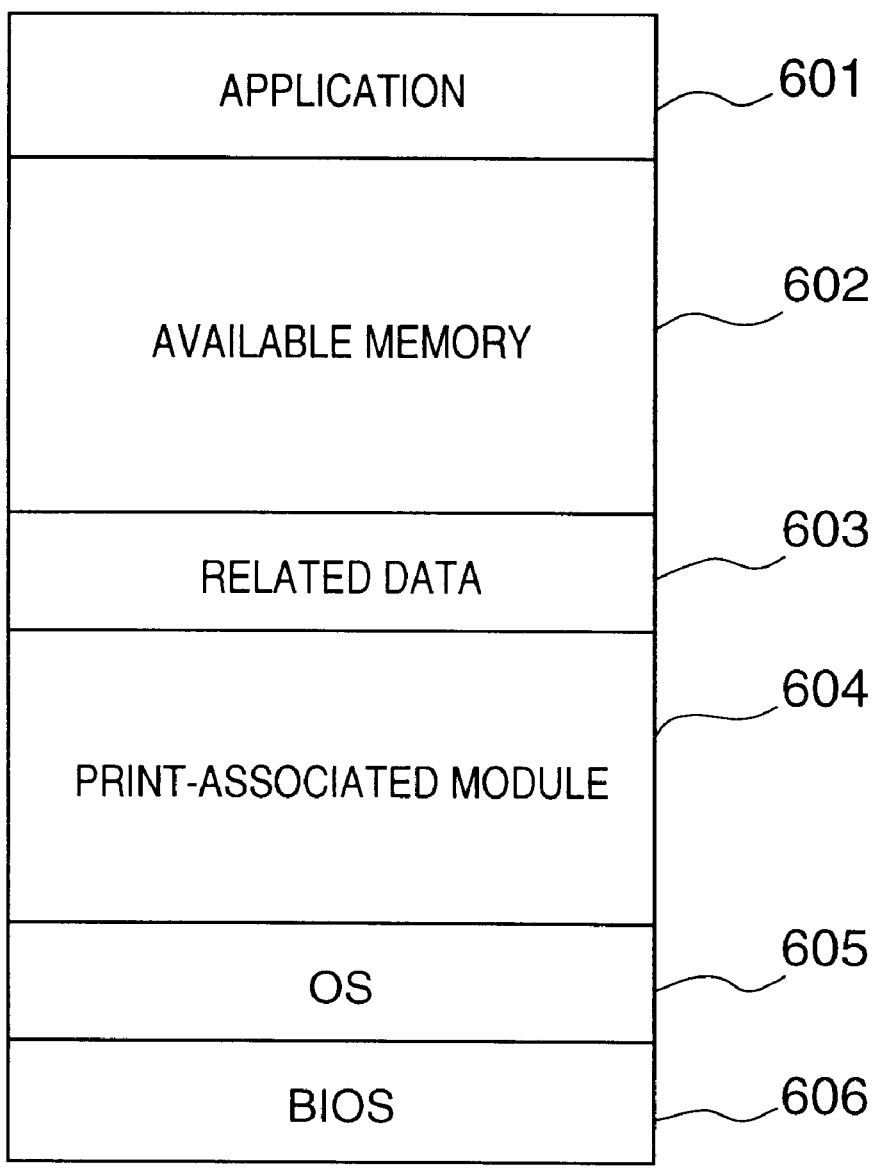
FIG. 6 is a block diagram showing a memory map in a state wherein a print-associated module including an automatic print mode control program is loaded into a RAM 2 of a host computer 3000 to be operated in the embodiments of the present invention.

FIG. 6 shows a memory map in a state wherein print-associated modules including the print mode control program are loaded into the RAM 2 of the host computer 3000 and ready for execution.

Figure 7:
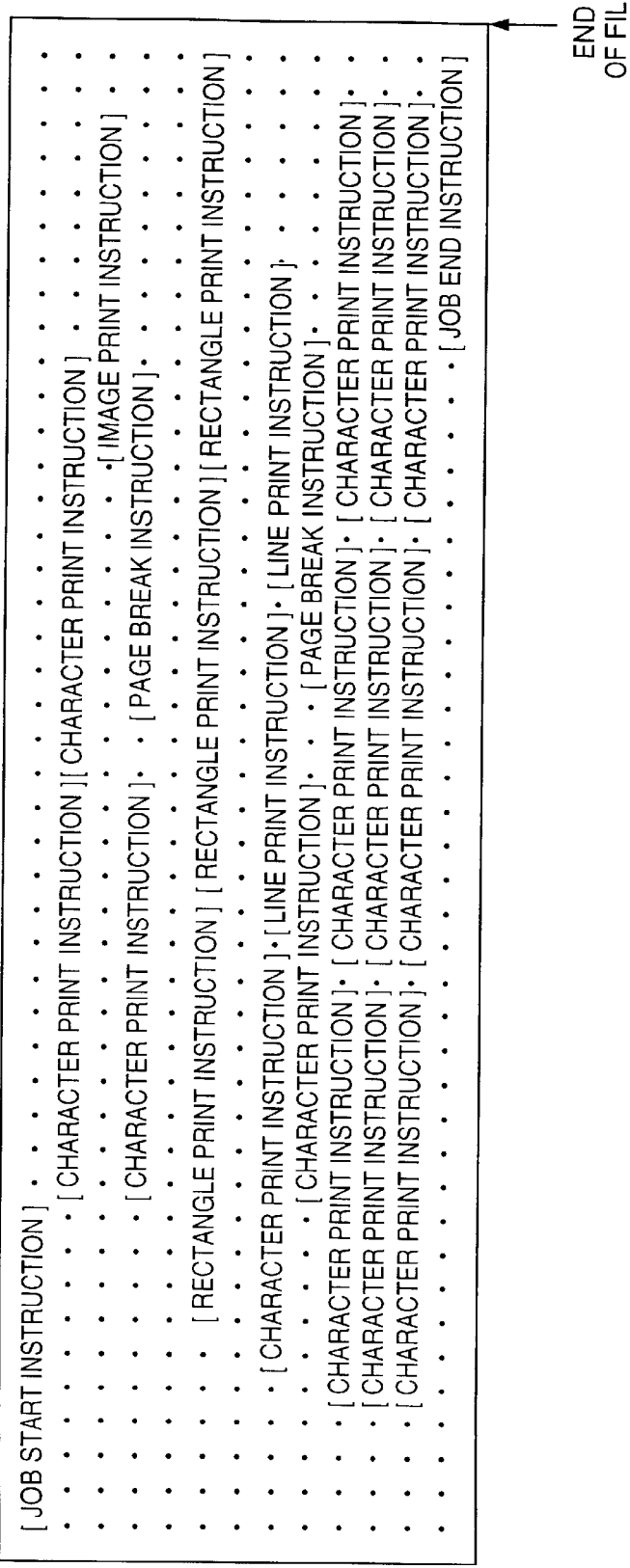
FIG. 7 is a view showing an example of the contents of an intermediate code data file in the embodiments of the present invention.

FIG. 7 shows the contents of an intermediate code data temporary file created in the external memory 11 or the like. Referring to FIG. 7, the wording "job start instruction", "page break instruction", and the like is used for convenience in writing to make it easy to understand intermediate codes in a file. In reality, these intermediate codes are stored in binary notation.

<Print Control Procedure>

Figure 9A:
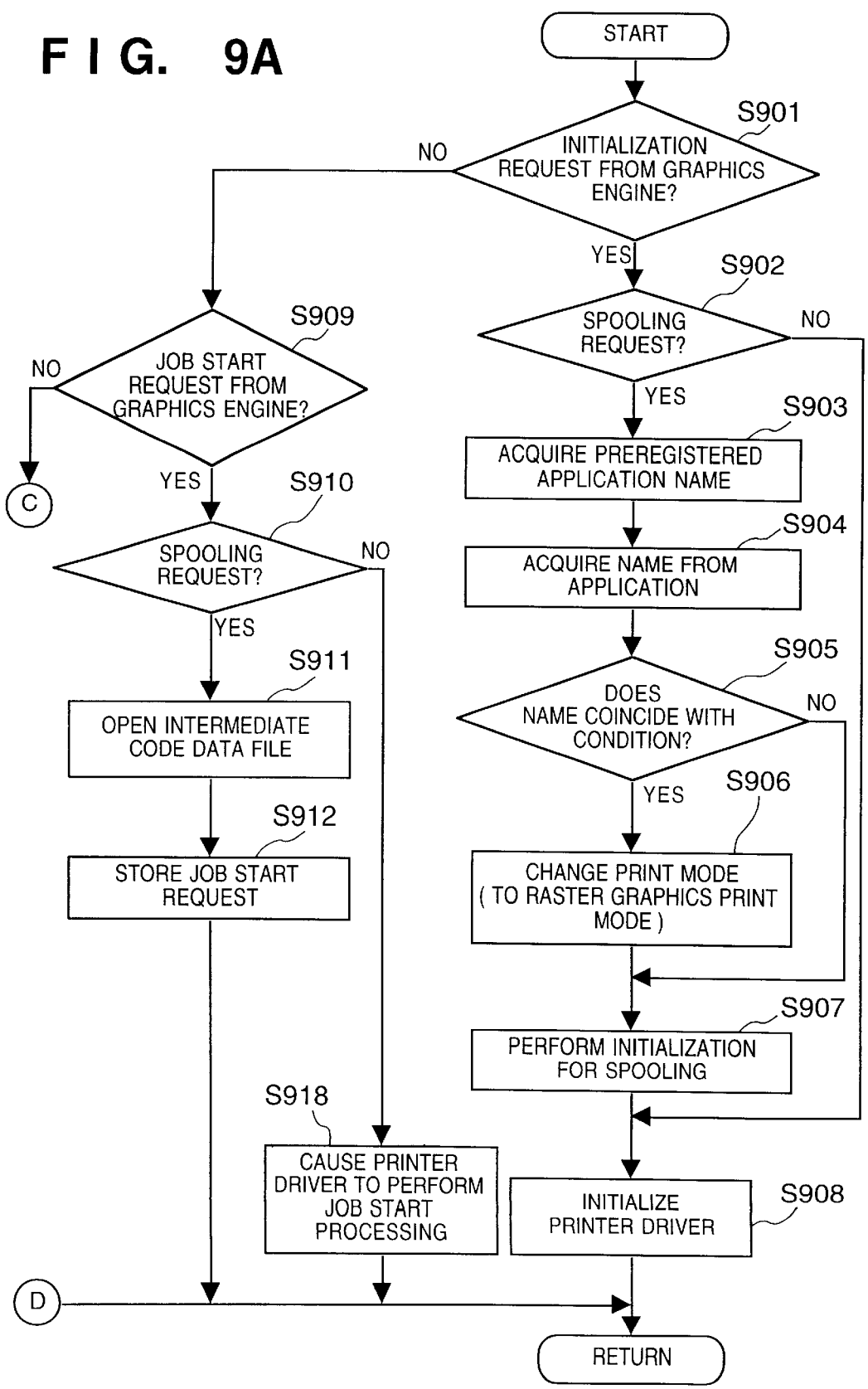
FIGS. 9A and 9B are flow charts showing an example of a procedure in the first embodiment.
Figure 9B:
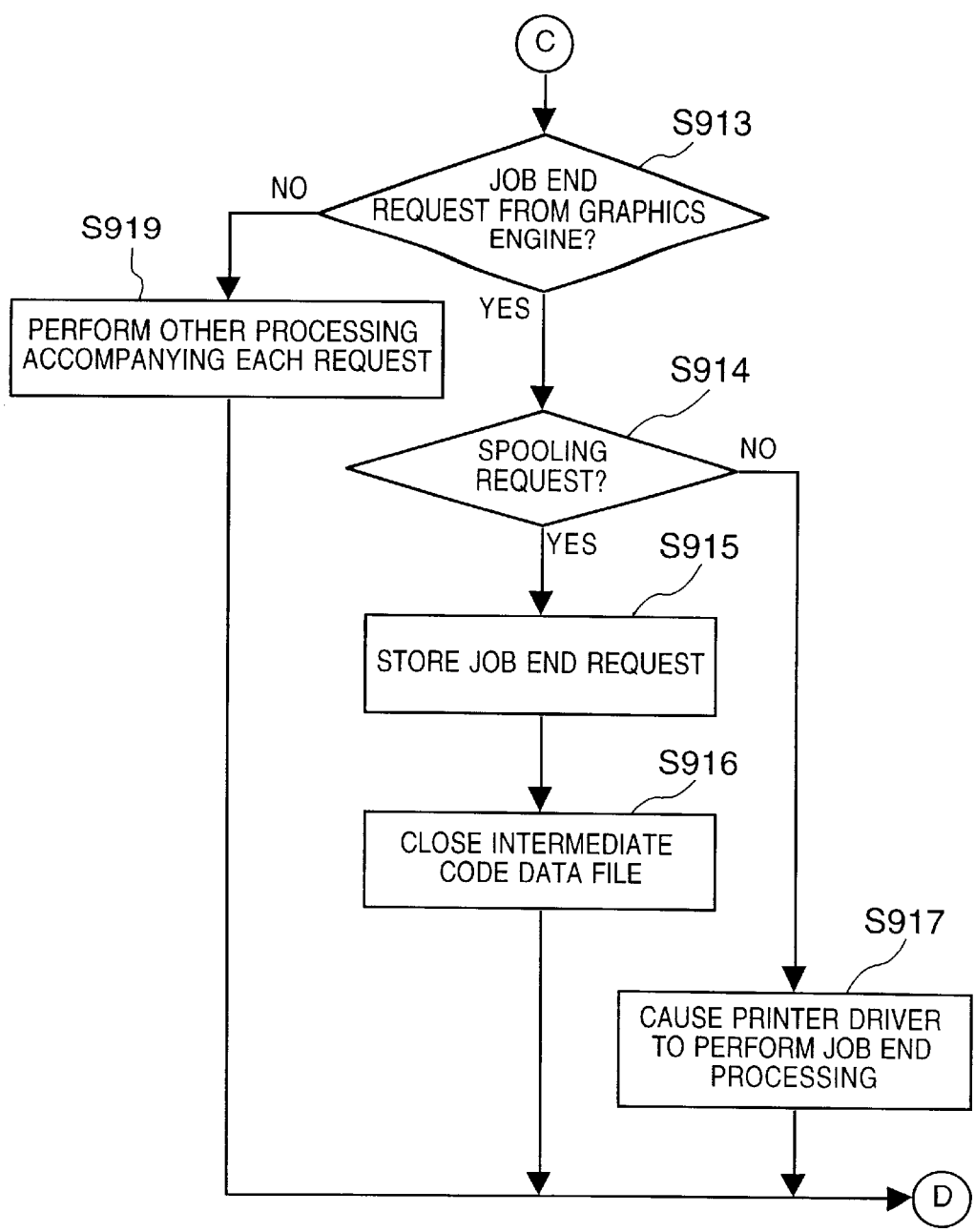

An embodiment of the present invention will be described with reference to flow charts and the like. FIGS. 9A and 9B are flow charts showing the print procedure of this embodiment which is executed by the host computer using the dispatcher 301 and the spooler 302. This procedure is executed by the print system in FIG. 3 but can also be executed by the system in FIG. 2 if "NO" is set for all the spooling requests in FIGS. 9A and 9B.

First of all, it is checked whether an initialization request is output from the graphics engine 202 (step S901). Assume that an initialization request is sent prior to a job start request without fail. The printer driver 203 or the spooler 302 notifies the graphics engine 202 of an output ability (capability) corresponding to the current print mode, thereby making the graphics engine 202 send print data in accordance with the output ability. If, for example, the current print mode is the vector graphics print mode, the printer driver 203 or the spooler 302 notifies the graphics engine 202 of the output ability of printing circles and rectangles. If the current print mode, however, is the raster graphics print mode, the printer driver 203 or the spooler 302 notifies the graphics engine 202 of the lack of the output ability of printing circles and rectangles. The graphics engine 202 then outputs a print instruction in the form suited for the output ability.

If an initialization request is output from the graphics engine 202 (YES in step S901), it is checked whether a next spooling request is generated (step S902). In this case, a spooling request is explicitly designated by the user and selected for some purpose (e.g., releasing an application or performing special printing).

If there is no spooling request, the printer driver is initialized (step S908), and the flow of processing returns to the graphics engine 202. Assume that a spooling request is generated (YES in step S902). An application name registered in advance is acquired (step S903). In this embodiment, it is assumed that the vector graphics print mode is the default mode. For this reason, the names of applications that can obtain high average print throughputs or proper print results by switching to the raster graphics print mode are listed on a table in advance inside the spooling module. The application names are acquired from this table in step S903.

Subsequently, the name is acquired from the application (step S904). In this processing, the application name is acquired through the graphics engine 202. With this processing, the name of the application that has generated the initialization request can be acquired. It is then checked whether these application names coincide with each other (step S905). In this processing, it is checked whether the acquired application name coincides with the application names acquired in step S903.

If it is determined that the application names coincide with each other, i.e., the print mode is to be switched from the vector graphics print mode to the raster graphics print mode (YES in step S905), next print mode changing processing (step S906) is performed. This print mode changing processing is required to de-spool the intermediate code data file into a printer control command. This mode is used for subsequent de-spooling. The printer driver 203 generates a printer control command in accordance with this print mode, following the procedure shown in FIG. 4 or 5.

In addition, the output ability (capability) to be notified to the graphics engine 202 is changed from the output ability in the vector graphics print mode to the one in the raster graphics print mode. This allows the graphics engine 202 to send subsequent print instructions in the form suited for the raster graphics print mode.

It is assumed that the preregistered application can obtain higher performance in the raster graphics print mode than in the vector graphics print mode, and can also obtain accurate print results. With this processing, therefore, optimal print data can always be ensured, and an optimal print mode can be selected.

Initialization processing for spooling is then performed (step S907). With this processing, subsequent print processing requests from the graphics engine 202 can be spooled. Thereafter, the driver is initialized (step S908), and the flow of processing returns to the graphics engine 202. The processing in this initialization is terminated.

If it is determined in determination processing (step S901) that the request is not an initialization request from the graphics engine 202 (NO in step S901), and it is checked whether the request is a job start request from the graphics engine 202 (step S909). To explain a spooling sequence, it is assumed that the request is the jot start request (YES in step S909). If it is determined that the request is the job start request, it is checked whether there is a spooling request (step S910). Assume that a spooling request is generated (YES in step S910). In this case, intermediate code data is generated in the external memory 11 on the host computer 3000, and a file for temporarily storing the intermediate code data is opened (step S911).

An intermediate code corresponding to the job start request is generated and stored in the file (step S912). This starts generation of intermediate code data required for subsequent de-spooling.

If it is determined in determination processing (step S909) that the request is not a job start request from the graphics engine 202 (NO in step S909), it is checked whether the request is a job end request (step S913). Assume that it is determined that the request is not the job end request (NO in step S913). In this case, other processing accompanying each request is performed (step S919). This includes storing intermediate code data as information required for printing in a file, supplying information to the graphics engine 202, and the like. With this processing, a series of print instructions for a given job is processed, and intermediate code data required for de-spooling are sequentially generated.

In this case, there is no need to convert any print instruction into the form suited to the print mode or form a plurality of print instructions into one command. This is because the graphics engine 202 is notified of the output ability (capability) in the initialization processing, and hence received print instructions have already been in the form suited to the current print mode.

If it is determined in the determination processing step (step S913) that the request is a job end request (YES in step S913), it is checked whether there is a spooling request (step S914). Assume that it is determined that there is a spooling request. In this case, an intermediate code corresponding to the job end request is generated and stored in a file (step S915). This intermediate code data file is then closed (step S916). This series of steps is processing associated with spooling of intermediate code data.

High print performance and proper print results can be obtained by automatically selecting the vector graphics print mode or raster graphics print mode in accordance with preregistration.

In this embodiment, the print mode suited to each application can be automatically selected by registering the names of applications that can obtain high average print throughputs or proper print results in the raster graphics print mode. Note that a print mode may be determined from a combination of an application name and a document type or a document type alone instead of an application name alone. For example, a print mode may be determined more accurately by registering that the raster graphics print mode is selected for a document having a graphic pattern input by a specific application. In this case, in step S904 in FIG. 9A, information indicating whether such a graphic pattern is contained in a document to be printed is acquired as well as an application name. Furthermore, it may be registered that the raster graphics print mode is set for any document having a graphic pattern regardless of the application.

Figure 8B:
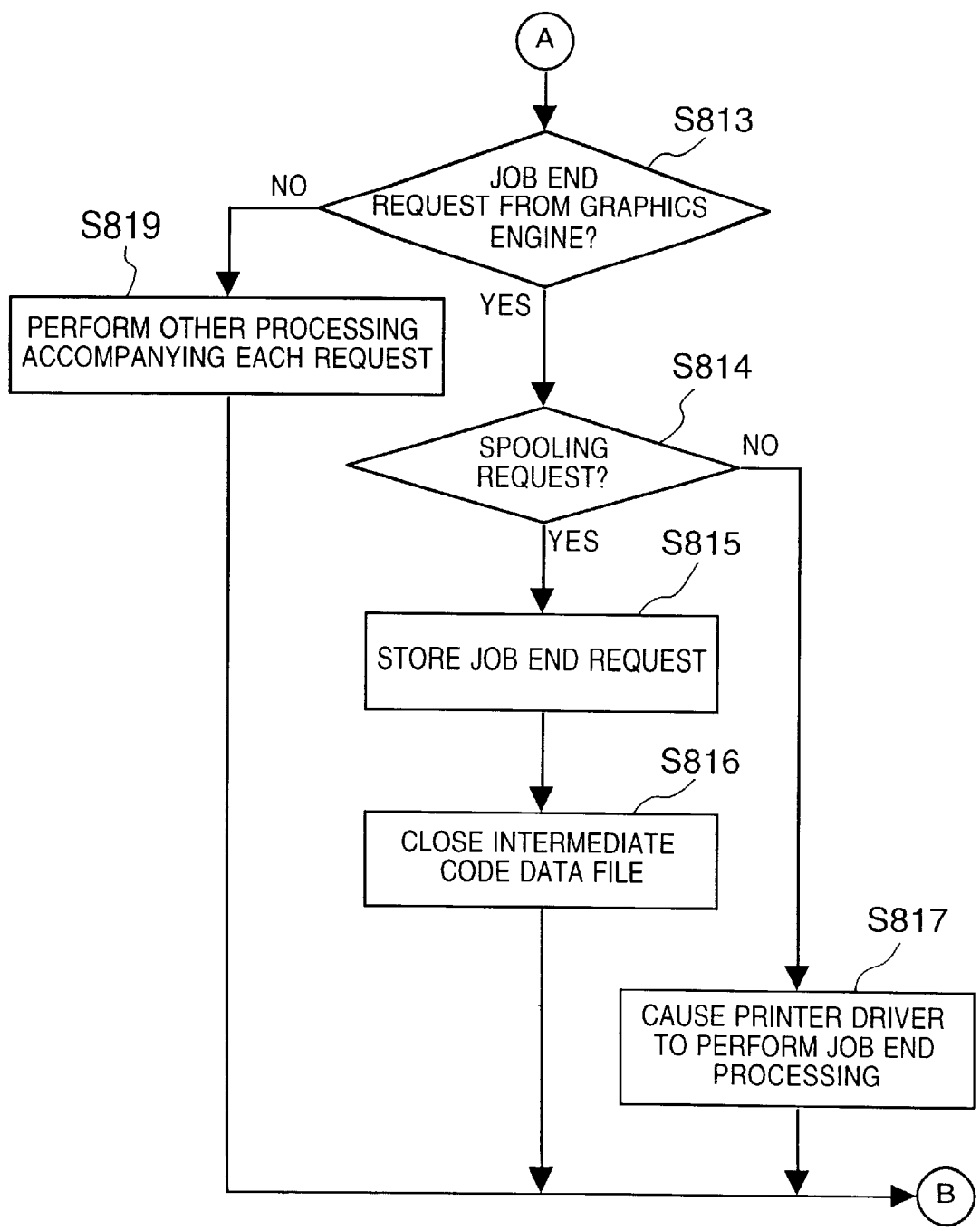

FIGS. 8A and 8B explain an outline of the present invention by generalizing the procedure in FIGS. 9A and 9B. Referring to FIGS. 8A and 8B, more general conditions associated with change of the print modes, including an application name, are acquired in step S803. It is then checked in step S805 whether the application is suited to the generalized conditions. The remaining steps are the same as those in FIGS. 9A and 9B.

The function of this embodiment may be executed by the host computer 3000 in accordance with an externally installed program. In this case, pieces of information including the program are loaded from a storage medium such as a CD-ROM, flash memory, or FD as the external memory 11 or an external storage medium through a network for e-mail, personal computer communications, or the like into a system including an output apparatus and the host computer 3000, thereby allowing the host computer 3000 or the output apparatus to implement the above function.

[Second Embodiment]

The second embodiment is implemented by the systems shown in FIGS. 1 and 3. In this embodiment, a print system having a plurality of functions, e.g., the overlay function of synthesizing document data with form data and the N-up function of reducing N-page data and printing the data on one page, in addition to the function of printing page by page, will be described. In this print system, when an application 201, loaded into a RAM 2 of a host computer 3000 to be operated, generates a print request using a specific function of a printer driver 203 or spooler 302, a print mode suited to the requested function is selected, and a printer control command to be transmitted to a printer 1500 is generated from an intermediate code in the selected print mode. This processing will be described in detail below with reference to the flow chart of FIG. 10. The procedure in FIG. 10 is used in this embodiment in place of the one shown in FIGS. 9A and 9B in the first embodiment.

As shown in FIG. 10, as in the first embodiment, it is checked whether the request is an initialization request from a graphics engine 202 (step S1001). Assume that an initialization request is always sent prior to a job start request. If it is determined that the request is not an initialization request from the graphics engine 202 (NO in step S1001), other spooling accompanying each request is performed (step S1009). That is, the same processing as that in steps S909 to S919 in FIGS. 9A and 9B is performed. If it is determined that the request is an initialization request from the graphics engine 202 (YES in step S1001), it is checked whether there is the next spooling request (step S1002).

If it is determined that there is no spooling request, the printer driver 203 is initialized (step S1008), and the flow of processing returns to the graphics engine 202. Assume that there is a spooling request (YES in step S1002). In this case, a specific function registered in advance is acquired (step S1003). The specific function in this case indicates the N-up function (reducing and printing a plurality of pages on one page), the overlay function held by the device (the graphics superposition function implemented by sending a special escape sequence to the device), or the like.

This preregistered specific function is selected for the following reason. Depending on a designated function, a print mode suited for the function can be determined. For example, with the N-up function of printing a large number of pages, the print time in the raster graphics print mode can be shorter than that in the vector graphics print mode. In addition, the overlay function is effective only in the vector graphics print mode. It is therefore registered in advance that the vector graphics print mode is the default mode, and the N-up function of printing a larger number pages is to be executed in the raster graphics print mode.

Subsequently, the function designated by the user is acquired (step S1004). In this processing, information about print setting explicitly performed by the user is acquired. This allows acquisition of the currently designated effective specific function. It is checked whether the specific function acquired in step S1004 coincides with the one acquired in step S1003 (step S1005). In this processing, it is checked whether the function acquired in step S1004 coincides with the specific function acquired from the table, in step S1003, as a condition for switching the print mode from the raster graphics print mode to the vector graphics print mode.

If the N-up function of printing a large number of pages is designated, since the N-up function is a preregistered specific function, it is determined that the two functions coincide with each other. That is, it is determined that the print mode is to be switched from the vector graphics print mode to the raster graphics print mode. As a result, print mode changing processing is performed (step S1006). In this print mode changing processing (step S1006), the current print mode is switched to the print mode required to de-spool intermediate code data into a printer control command again. This mode is used for subsequent de-spooling.

In this case, as in the first embodiment, the output ability (capability) to be notified to the graphics engine 202 is changed from the output ability in the vector graphics print mode to the one in the raster graphics print mode. With this processing, the graphics engine 202 sends subsequent print instructions in the form suited to the raster graphics print mode.

In this case, since it is assumed that the raster graphics print mode can obtain higher performance than the vector graphics print mode, this processing allows the system to always obtain optimal print data and select an optimal print mode.

After this processing, initialization processing for spooling is performed (step S1007). As a result, subsequent print processing requests from the graphics engine 202 can be spooled. After the printer driver 203 is initialized (step S1008), the flow of processing returns to the graphics engine 202.

Once a print mode is determined in the initialization processing, subsequent print data will be sent to the printer in accordance with the determined mode.

In this manner, a print mode such as the vector graphics print mode or the raster graphics print mode is selected by comparing the specific function designated by the user with a preregistered specific function, thereby ensuring high print performance and proper print results.

[Third Embodiment]

The third embodiment is implemented by the systems shown in FIGS. 1 and 3. According to this embodiment, when a print request is output from a printer driver 203 that is loaded into a RAM 2 of a host computer 3000 to be operated in a print system having a plurality of hardware features, a print mode suited to the corresponding hardware feature is selected, and a printer control command to be transmitted to a printer 1500 is generated from intermediate code data in the selected print mode. Note that the procedure in FIG. 11 is used in the third embodiment in place of the procedure in FIGS. 9A and 9B in the first embodiment.

As shown in FIG. 11, first of all, it is checked whether the request is an initialization request from a graphics engine 202 (step S1101). Assume that an initialization request is always sent prior to a job start request. In this case, if it is determined that the request is not an initialization request from the graphics engine 202 (NO in step S1101), other spooling accompanying each request is performed (step S1109). That is, the same processing as that in steps S909 to S919 in FIGS. 9A and 9B is performed. If it is determined that the request is an initialization request from the graphics engine 202 (YES in step S1101), it is checked whether there is the next spooling request (step S1102). If it is determined that there is no next spooling request, the printer driver 203 is initialized (step S1108), and the flow of processing returns to the graphics engine 202. Assume that there is a spooling request (YES in step S1102).

In this case, a preregistered hardware condition is acquired (step S1103). This hardware condition indicates the RAM capacity held by the printer, the font in the printer, or the like. The preregistered hardware condition is determined as follows. If, for example, the RAM capacity required for the printer to bitmap a command, the raster graphics print mode can shorten the print time as compared with the vector graphics print mode. In this case, any function that demands a RAM capacity equal to or smaller than a predetermined value is registered in advance as a function that should perform printing in the raster graphics print mode.

Subsequently, a hardware element of the system that is to currently perform printing is acquired (step S1104). In this case, a hardware element of the printer that is to currently perform printing, e.g., a memory capacity that can be used to bitmap a command, can be acquired. It is then checked whether this hardware element satisfies the hardware condition acquired in step S103 (step S1105). In this processing, it is checked whether the acquired hardware element coincides with the hardware condition that has been acquired from a table as a condition for switching the print mode. If the printer has only a RAM capacity equal to or smaller than the capacity as the preset condition, the hardware element coincides with the condition. That is, it is determined that the print mode is to be switched from the vector graphics print mode to the raster graphics print mode.

With this processing, print mode changing processing is performed (step S1106). In this print mode changing processing (step S1106), the current print mode is switched to the print mode required to de-spool the intermediate code data file into a printer control command again. This print mode is used for subsequent de-spooling. Thereafter, initialization processing for spooling is performed (step S1107).

In this case, as in the aforementioned embodiments, the output ability (capability) to be notified to the graphics engine 202 is changed from the output ability in the vector graphics print mode to the one in the raster graphics print mode. As a result, the graphics engine 202 sends subsequent print instructions in the form suited to the raster graphics print mode.

In this case, since it is assumed that the acquired hardware element can obtain higher performance in the raster graphics print mode than in the vector graphics print mode, this processing allows the system to always obtain optimal print data and select an optimal print mode.

With this processing, subsequent print processing requests from the graphics engine 202 can be spooled. The printer driver 203 is then initialized (step S1108), and the flow of processing returns to the graphics engine 202.

In this manner, the vector graphics print mode or raster graphics print mode is automatically selected as a print mode in accordance with a hardware condition for the device that performs printing, thereby ensuring high print performance or proper print results.

[Fourth Embodiment]

According to the fourth embodiment, when a print request is output from a printer driver 203 that is loaded into a RAM 2 of a host computer 3000 to be operated, a condition for determining a print mode suited to the print processing is acquired from the printer driver 203 that is dependent on a printer feature. A print mode is determined in accordance with this acquired condition. A printer control command to be transmitted to a printer 1500 is generated from intermediate code data in this print mode.

Figure 12:
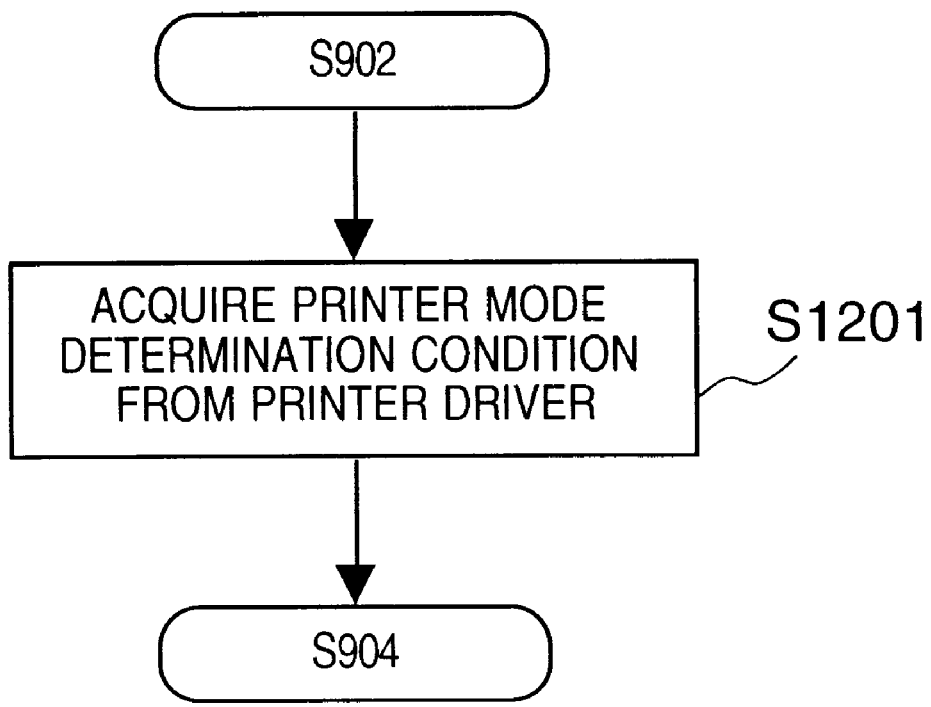
FIG. 12 is a flow chart showing a procedure for acquiring a condition for determining a print mode in the fourth embodiment.

In this embodiment, the procedure in FIG. 12 is executed in place of step S903 in FIGS. 9A and 9B. That is, a print mode determination condition is acquired from the printer driver 203 to determine a suitable print mode (step S1201). That is, a condition for obtaining a suitable print mode is provided by the printer or printer driver 203, and the print mode is switched under the condition. As in the first embodiment, this condition may be set to select a print mode in accordance with an application. More specifically, the name of an application for which the print mode should be changed is registered in advance, and this name is used to check in step S905 whether the acquired name coincides with the condition. Obyiously, the condition acquired in step S1201 is not limited to the name of an application. For example, as in the third embodiment, a hardware feature, and more specifically, the memory capacity of the printer or the like, may be acquired.

By acquiring a determination condition from the printer driver 203 that is dependent on the feature of each device, the vector graphics print mode and raster graphics print mode are automatically switched without a dispatcher 301 or spooler 302 itself having the determination condition. This allows the system to ensure high print performance or proper print results. In addition, a hardware element of the device may be stored in the printer driver 203 that is dependent on the feature of each device so as to acquire the hardware element from the printer driver 203 as well. In this case, if a hardware feature is set as a condition for selecting a print mode, any hardware element need not be acquired from the device. This can prevent a decrease in processing speed due to communication with the device.

[Fifth Embodiment]

Figure 14A:
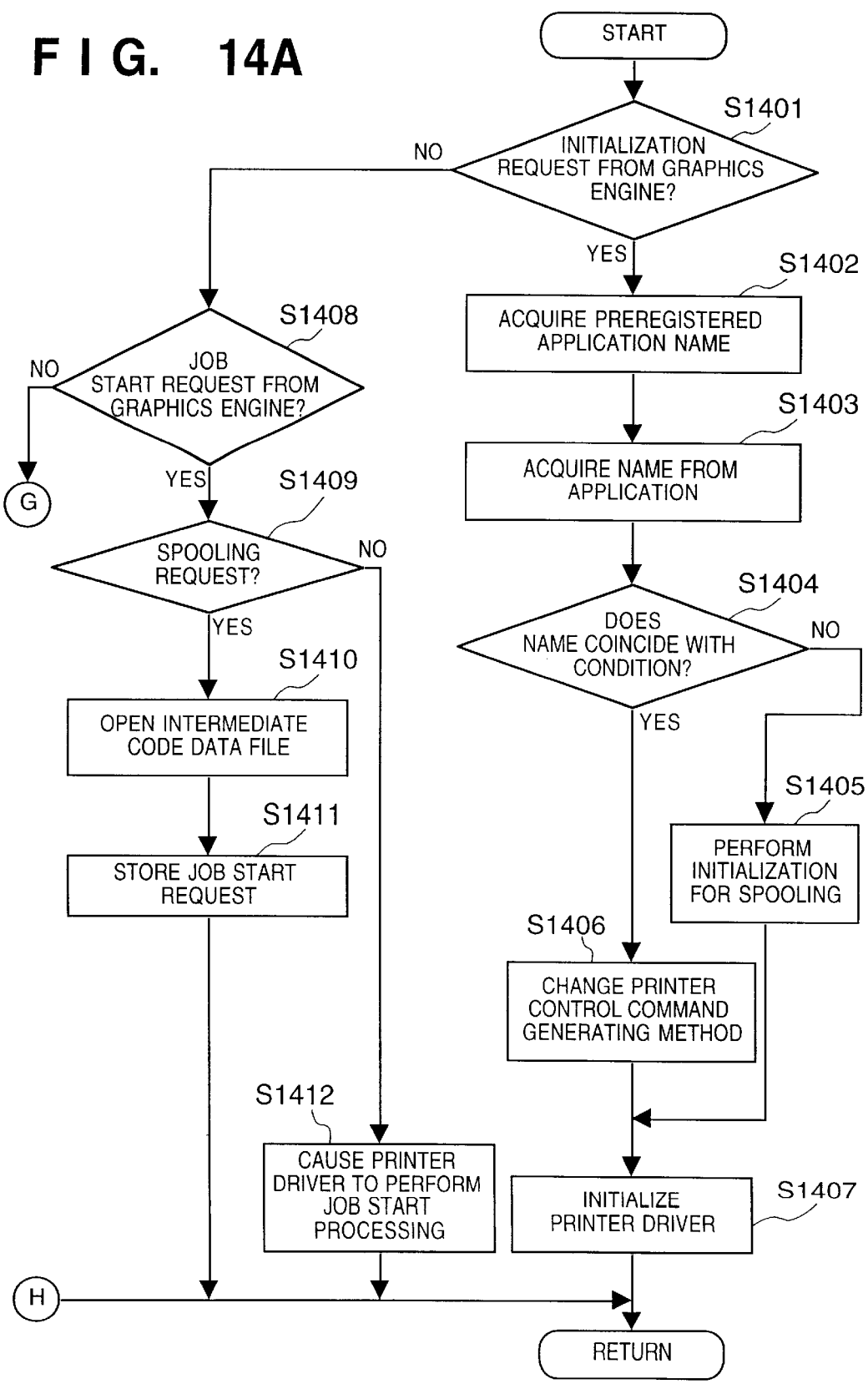
FIGS. 14A and 14B are flow charts showing an example of a procedure in the fifth embodiment.
Figure 14B:
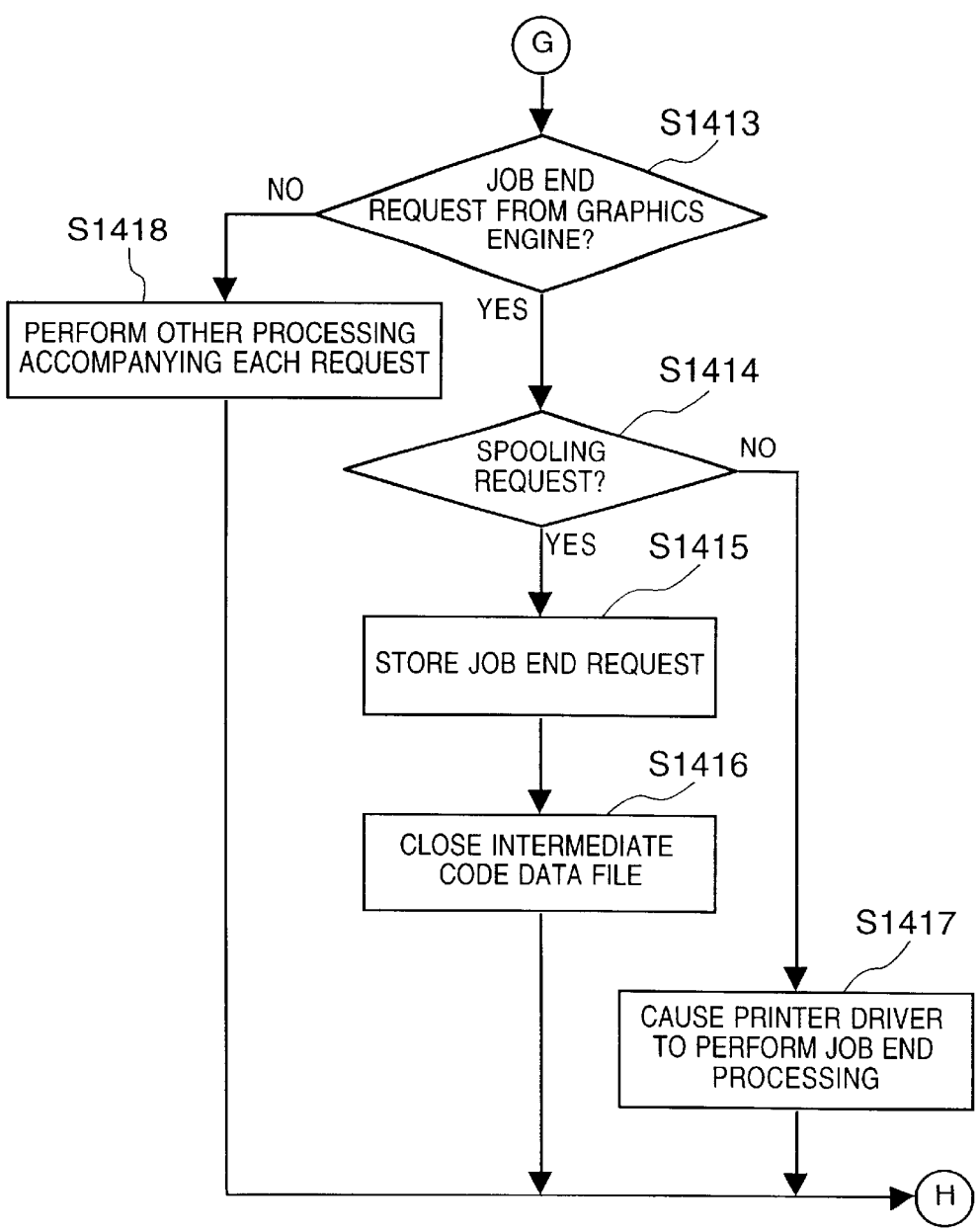

The fifth embodiment is implemented by the print system shown in FIG. 3. FIGS. 13A and 13B explain an outline of the fifth embodiment of the present invention. FIGS. 14A and 14B are flow charts showing a procedure executed by a dispatcher 301 and a spooler 302. In this flow chart, "condition" in steps S1302 and S1304 in FIG. 13A is described in more detail.

This embodiment will be described in detail below with reference to the flow charts of FIGS. 14A and 14B.

This embodiment is based on the premise that both the print system in FIG. 2, which is comprised of the printer and the host computer, and the system in FIG. 3, which temporarily spools print data from an application in the form of intermediate code data, can be used. In this embodiment, it is assumed that when printing is to be performed by using the latter system, functions other than those of an application or printer driver can be used, but a deterioration in performance or improper printing may occur depending on an application. In this embodiment, therefore, when a printer control command is to be generated, whether intermediate code data is to be generated is selected depending on an application.

First of all, it is checked whether the request is an initialization request from a graphics engine 202 (step S1401). Assume that an initialization request is always sent prior to a job start request.

If it is determined that the request is an initialization request from the graphics engine 202 (YES in step S1401), an application name preregistered and listed on a table or the like is acquired (step S1402). This name corresponds to a determination condition for the generation of intermediate code data (step S1302). Whether to generate intermediate code data is determined afterward on the basis of this name. Assume that the generation of intermediate code data is default operation. If it is expected that a high average print throughput or proper print result can be obtained when a printer control command is directly issued without generating any intermediate code data, the default setting is changed to a printer control command generating method of generating no intermediate code data. Obyiously, the same procedure as described above can be applied even if the default operation is to generate no intermediate code data.

Subsequently, an application name is acquired from the application (step S1403). In this processing, an application name is acquired through the graphics engine 202. With this processing, the name of the application that has output the initialization request can be acquired. It is then checked whether the two application names coincide with each other (step S1404). In this processing, it is checked whether the acquired application name coincides with the application name that has been acquired in step S1402 from the table as a condition for switching the print mode.

If it is determined that these names coincide with each other (YES in step S1404), it is determined that no intermediate code data is to be generated in printer control command generating processing. As a result, printer control command generating method changing processing is performed (step S1406). In this printer control command generating method changing processing (step S1406), after this initialization sequence, flag setting or the like performed, which is used for determining a spooling request.

If it is determined that the two names do not coincide with each other (NO in step S1404), i.e., intermediate code data is to be generated in printer control command generating processing, initialization processing for spooling is performed (step S1405). With this processing, subsequent print processing requests from the graphics engine 202 can be spooled. Then, a printer driver 203 is initialized (step S1407), and the flow of processing returns to the graphics engine 202. The processing in initialization is terminated.

If it is determined in determination processing (step S1401) that the request is not an initialization request from the graphics engine 202 (NO in step S1401), it is checked whether the request is a job start request from the graphics engine 202 (step S1408). To explain a spooling sequence, it is assume that the request is a job start request (YES in step S1408). If it is determined that the request is a job start request, it is checked whether there is a spooling request (step S1409). In this case, if it is determined in determination processing (step S1404) that the application name does not coincide with the condition for changing the printer control command generating method in initialization processing, i.e., intermediate code data is to be generated in printer control command generating processing, it is determined that a spooling request is generated.

In this case, a file for temporarily storing generated intermediate code data is opened in the external memory 11 on a host computer 3000 (step S1410). An intermediate code corresponding to the job start request is generated and stored in the file (step S1411). With this processing, generation of intermediate code data required for subsequent de-spooling is started.

If it is determined in determination processing (step S1404) that the application name coincides with the condition for changing the printer control command generating method in initialization processing, i.e., no intermediate code data is to be generated in printer control command generating processing, it is determined in determination processing (step S1409) that no spooling request is generated (NO in step S1409). As a result, the printer driver performs job start processing (step S1412) to directly issue a printer control command without generating any intermediate code data.

If it is determined in determination processing (step S1408) that the request is not a job start request from the graphics engine 202 (NO in step S1408), it is checked whether the request is a job end request (step S1413). Assume that the request is not a job end request. In this case, other processing accompanying each request is performed (step S1418). This processing includes storing information required for printing in an intermediate code data file, supplying information to the graphics engine 202, or the like. With this processing, a series of print instructions is processed, and intermediate code data required for de-spooling are sequentially generated.

It is determined in determination processing (step S1413) that the request is a job end processing (YES in step S1413), it is checked whether there is a spooling request (step S1414) as in the case wherein the job start request is generated. In this case as well, if it is determined in determination processing (step S1404) that the application name does not coincide with the condition for changing the printer control command generating method in initialization processing, i.e., intermediate code data is to be generated in printer control command generating processing, it is determined that a spooling request is generated. As a result, an intermediate code corresponding to the job end request is generated and stored in the file (step S1415). The intermediate code data file is then closed (step S1416).

Similarly, if it is determined in determination processing (step S1404) that the application name coincides with the condition for changing the printer control command generating method in initialization processing, i.e., no intermediate code data is to be generated in printer control command generating processing, it is determined in determination processing (step S1414) that no spooling request is generated. As a result, the printer driver 203 performs job end processing (step S1417) as end processing to be performed upon directly issuing a printer control command without generating any intermediate code data.

This series of steps is processing associated with spooling of intermediate code data.

In this manner, the method of generating a printer control command by performing de-spooling after generating intermediate code data or the method of generating a printer control command without generating any intermediate code data is automatically selected in initialization processing in accordance with the preregistered application name, thereby ensuring high print performance and proper print results.

The function of this embodiment may be implemented by the host computer 3000 using an externally installed program. In this case, pieces of information including the program are loaded from a storage medium such as a CD-ROM, flash memory, or FD as the external memory 11 or an external storage medium through a network for e-mail, personal computer communications, or the like into a system including an output apparatus and the host computer 3000, thereby providing the above function for the host computer 3000 or the output apparatus. The present invention can be applied to such a case.

[Sixth Embodiment]

According to the sixth embodiment, when a printer driver 203 that is loaded into a RAM 2 of a host computer 3000 to be operated in a printer having a plurality of print functions generates a print request for printing using a specific function held by the printer driver 203 or a spooler 302, a printer control command generating method suited to the print processing is determined from the specific function, thereby acquiring the optimal printer control command generating method.

Similar to the fifth embodiment, this embodiment is based on the premise that both the print system in FIG. 2, which is comprised of the printer and the host computer, and the system in FIG. 3, which temporarily spools print data from an application in the form of intermediate code data, can be used. In this embodiment, it is assumed that when printing is to be performed by the latter system, the use of a specific function is inhibited.

Figure 15:
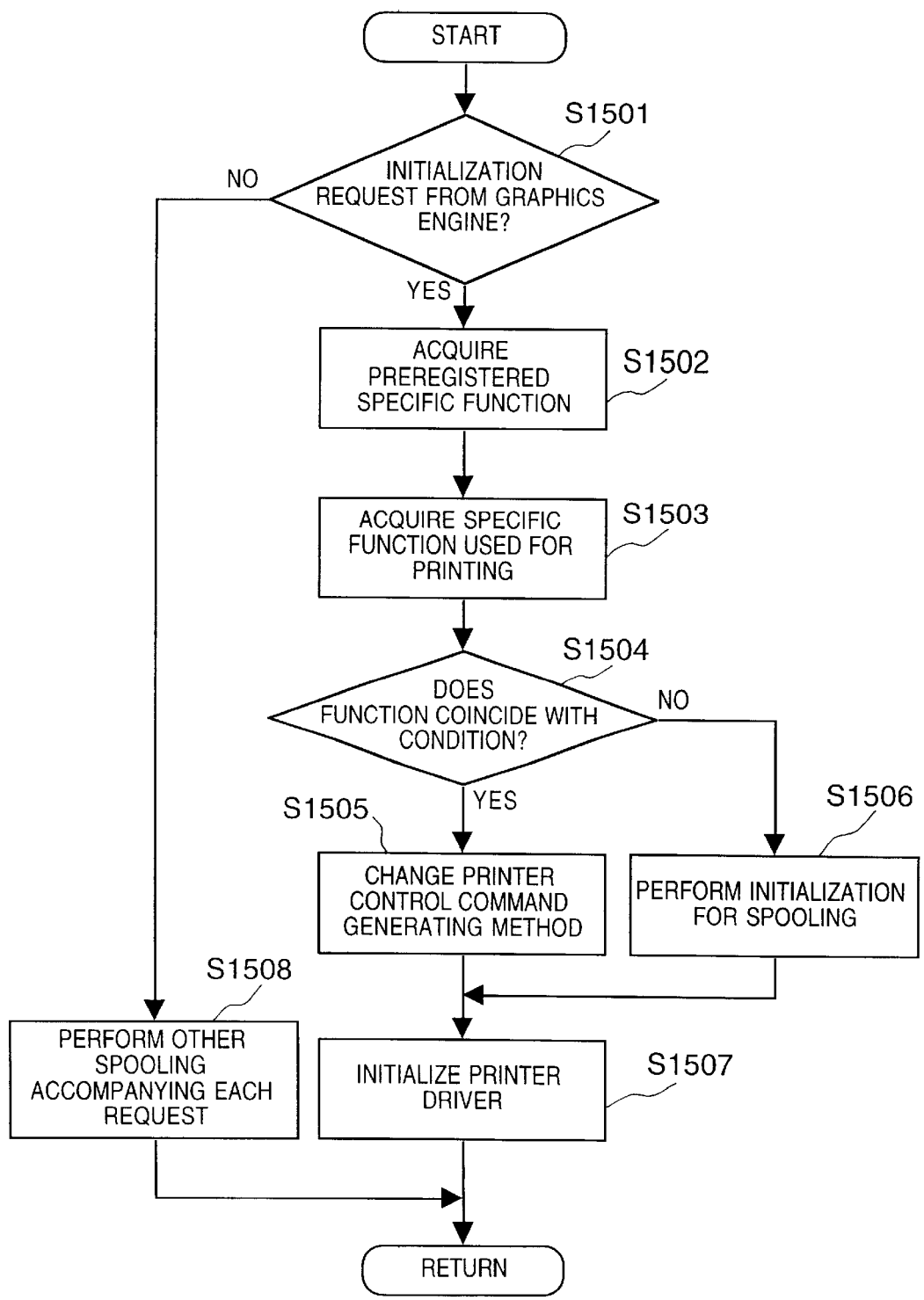
FIG. 15 is a flow chart showing a procedure for selecting a print mode in the sixth embodiment.

FIG. 15 is a flow chart showing the processing to be performed in this embodiment. The procedure in FIG. 15 is used in place of the one in FIG. 14 in the fifth embodiment.

Referring to FIG. 15, first of all, it is checked whether the request is an initialization request from a graphics engine 202 (step S1501). Assume that an initialization request is always sent prior to a job start request. If it is determined that the request is an initialization request from the graphics engine 202 (YES in step S1501), a preregistered specific function is acquired (step S1502). This specific function indicates the overlay function held by the device (the graphics superposition function implemented by sending a special escape sequence to the device), or the like. Assume that there is a condition stating that the overlay function is not effective for the printer control command generating method of generating intermediate code data and performing de-spooling on the basis of the intermediate code data. In this case, the overlay function is registered in advance as a function for which no intermediate code data is to be generated.

Subsequently, a function used for printing is acquired (step S1503). In this processing, information about print setting explicitly performed by the user is acquired. With this processing, the currently set effective specific function can be acquired. It is then checked whether these specific functions coincide with each other (step S1504). More specifically, it is checked whether the acquired specific function coincides with the specific function that has been acquired from a table as a condition for switching the print mode.

If the overlay function is designed, it is determined that the two functions coincide with each other, and it is determined that the method of directly issuing a printer control command without generating any intermediate code data is selected. As a result, printer control command generating method changing processing (step S1505) is performed. In this printer control command generating method changing processing, after this initialization sequence, flag setting or the like is performed, which is used for determining a spooling request (steps S1409 and S1414).

In checking whether the function acquired in step S1503 coincides with the specific function that has been acquired from the table in step S1502 as the condition for switching the print mode (step S1504), if it is determined that only the function that is not listed in the table is selected (NO in step S1504), initialization processing for the next spooling is performed (step S1506). With this processing, subsequent print processing requests from the graphics engine 202 can be spooled. A printer driver 203 is then initialized (step S1507), and the flow of processing returns to the graphics engine 202. The processing in initialization is terminated.

In this manner, the method of generating a printer control command by performing de-spooling after generating intermediate code data or the method of generating a printer control command without generating any intermediate code data is automatically selected in initialization processing in accordance with the preregistered specific function information, thereby ensuring high print performance and proper print results.

[Seventh Embodiment]

According to the seventh embodiment, when a print request is output from a printer driver 203 that is loaded into a RAM 2 of a host computer 3000 to be operated, and a printer control command generating method suited to the print processing is to be determined, a condition for determining the printer control command generating method is acquired from the printer driver 203 that is dependent on a printer feature. A printer control command generating method is determined in accordance with this acquired condition, and a printer control command to be transmitted to a printer 1500 is generated by this print control command.

Similar to the aforementioned embodiments, this embodiment is based on the premise that both the print system in FIG. 2, which is comprised of the printer and the host computer, and the system in FIG. 3, which temporarily spools print data from an application in the form of intermediate code data, can be used. In this embodiment, it is assumed that when printing is to be performed by using the latter system, functions other than those of an application or printer driver can be used, but a deterioration in performance or improper printing may occur under rare conditions.

Figure 16:
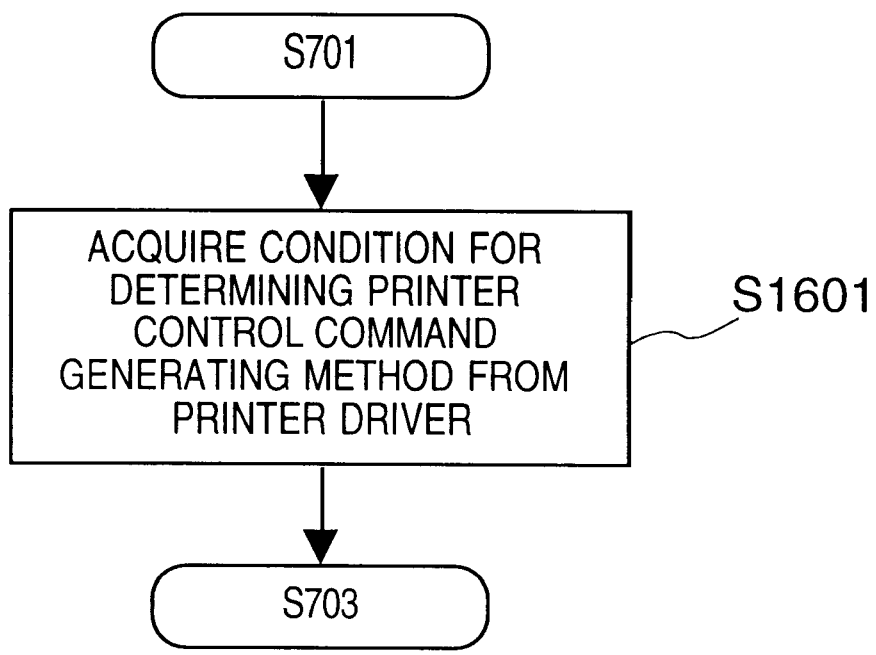
FIG. 16 is a flow chart showing a procedure for acquiring a condition for determining a print mode in the seventh embodiment.

In this embodiment, the procedure shown in FIG. 16 is executed in place of step 1402 in FIG. 14A. More specifically, when a suitable printer control command generating method is to be determined, a condition for determining a printer control command generating method is acquired from the printer driver 203 (step S1601). This operation indicates that a condition for obtaining a suitable printer control command generating method is supplied from the printer or printer driver 203, and the printer control command generating methods are switched in accordance with the condition. Assume that an application name is used as the condition, and the application name used as the condition is acquired in step S1601. The acquired condition is used to check in step S1404 whether the application name coincides with the condition. As is obvious, the condition acquired in step S1601 is not limited to an application name, and may be a function to be used for printing or the like.

By acquiring a determination condition from the printer driver 203 that is dependent on each device feature in this manner, the method of generating a printer control command by generating intermediate code data and de-spooling the data and the method of directly generating a printer control command are automatically switched without a dispatcher 301 or spooler 302 having the determination condition itself. This allows the system to ensure high print performance or proper print results.

[Eighth Embodiment]

Figure 18:
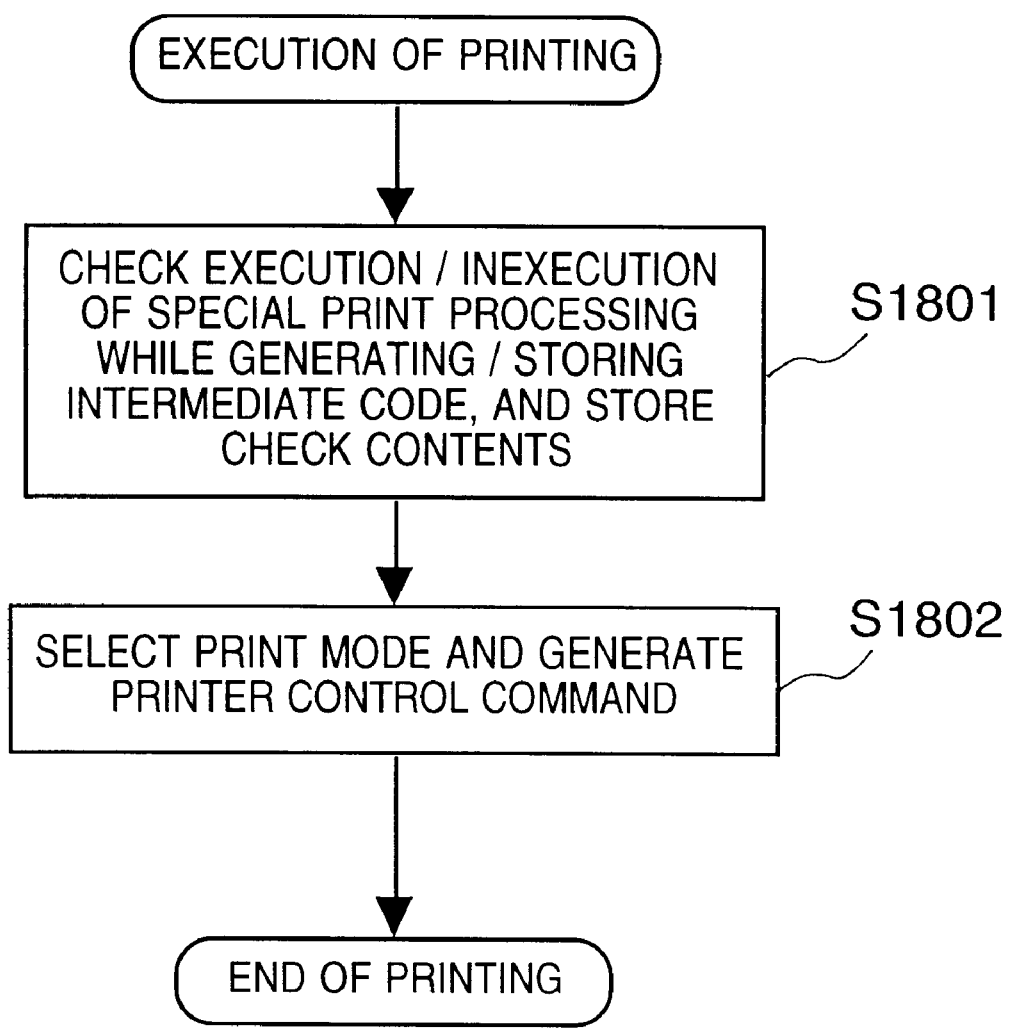
FIG. 18 is a flow chart showing an outline of a procedure in the eighth embodiment.

FIG. 18 is a flow chart showing a procedure for generating a printer control command in this embodiment. First of all, a print instruction received from a graphics engine 202 is converted into intermediate code data, and the data is stored in a file. At the same time with this processing, a spooler 302 checks whether the print instruction contains a special print instruction designation (e.g., a special raster operation), and stores the determination result in a RAM 2 or external memory 11 (step S1801). When the print instruction from the graphics engine 202 is complete, a print mode is determined on the basis of the result stored in the previous step. The printer driver then generates a printer control command from the temporarily stored intermediate code data through the print instruction generated by the graphics engine 202 (step S1802).

A maximum of 256 types of raster operations are supported by Windows 95. A raster operation is a logical arithmetic operation designated in various objects and performed between pixels. With this operation, for example, an image to be finally drawn when operation such as destination control or brushing is performed for source data can be obtained by logical operation. In this embodiment, it is assumed that not all the raster operations can be guaranteed by the vector graphics print mode.

More specifically, in the vector graphics print mode, a raster operation is expressed by a printer control command as a print logic setting instruction. However, such instructions corresponding to all the raster operations that can be used on the Windows 95 are not prepared.

In contrast to this, in the raster graphics print mode, all the raster operations can be supported, and a print image can be generated while proper logic printing is performed. This allows the system to always obtain proper print results.

Figure 19:
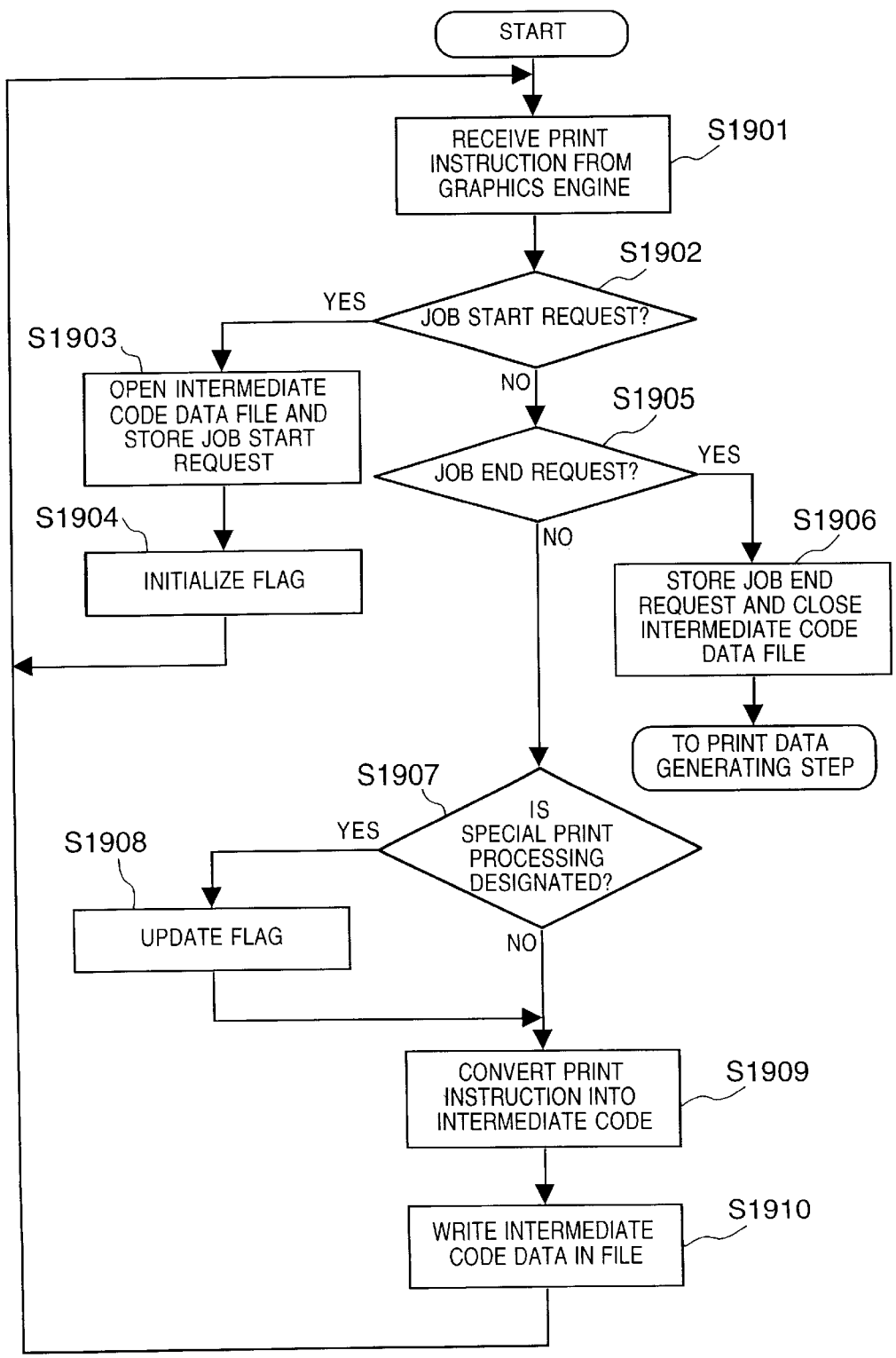
FIG. 19 is a flow chart showing a procedure in the eighth embodiment.

FIG. 19 shows this processing in more detail. The following description is based on the premise that spooling is performed.

A print instruction is received from an application through the graphics engine 202 (step S1901), and it is checked whether this print instruction is a job start request (step S1902).

If it is determined that the instruction is a job start request (YES in step S1902), a file for temporarily storing intermediate code data is created in the external memory 11 on a host computer 3000, and the file is opened to store intermediate code data corresponding to the job start instruction in the file (step S1903).

Subsequently, a memory area for storing a flag value indicating a print mode suited to overall print processing (print job) is ensured in the RAM 2, and the flag is initialized with the value indicating the vector graphics print mode (step S1904). Assume that the vector graphics print mode is the default print mode. The flow returns from step S1904 to step S1901 again to receive a print instruction from the graphics engine 202.

If it is determined in step S1902 that the instruction is not a job start request (NO in step S1902), it is checked whether the instruction is a job end request (step S1905).

If it is determined in step S1905 that the print instruction from the graphics engine 202 is not a job end request (NO in step S1905), it is checked whether special print processing is designated in the print instruction (step S1907). If it is determined that a special print process is determined (YES in step S1907), the flag value indicating the print mode is updated to the value indicating the raster graphics print mode (step S1908).

Note that in this embodiment, when even one special print process is designated in a print job, the raster graphics print mode is selected. After step S1908 is executed or when it is determined in step S1907 that no special print process is designated (NO in step S1907), the flow advances to step S1909 to convert the print instruction into intermediate code data (step S1909). The intermediate code data after the conversion is written in a temporary file (step S1910).

After this processing, the flow returns to step S1901 to receive a print instruction from the graphics engine 202. This series of steps S1901 to S1910 is continued until a job end request is received from the graphics engine 202.

If it is determined in step S1905 that the instruction is a job end request, intermediate code data corresponding to the job end request is generated and stored in a temporary file, and the file is closed (step S1906). The flow of processing advances to the generation of a printer control command.

Figure 20:
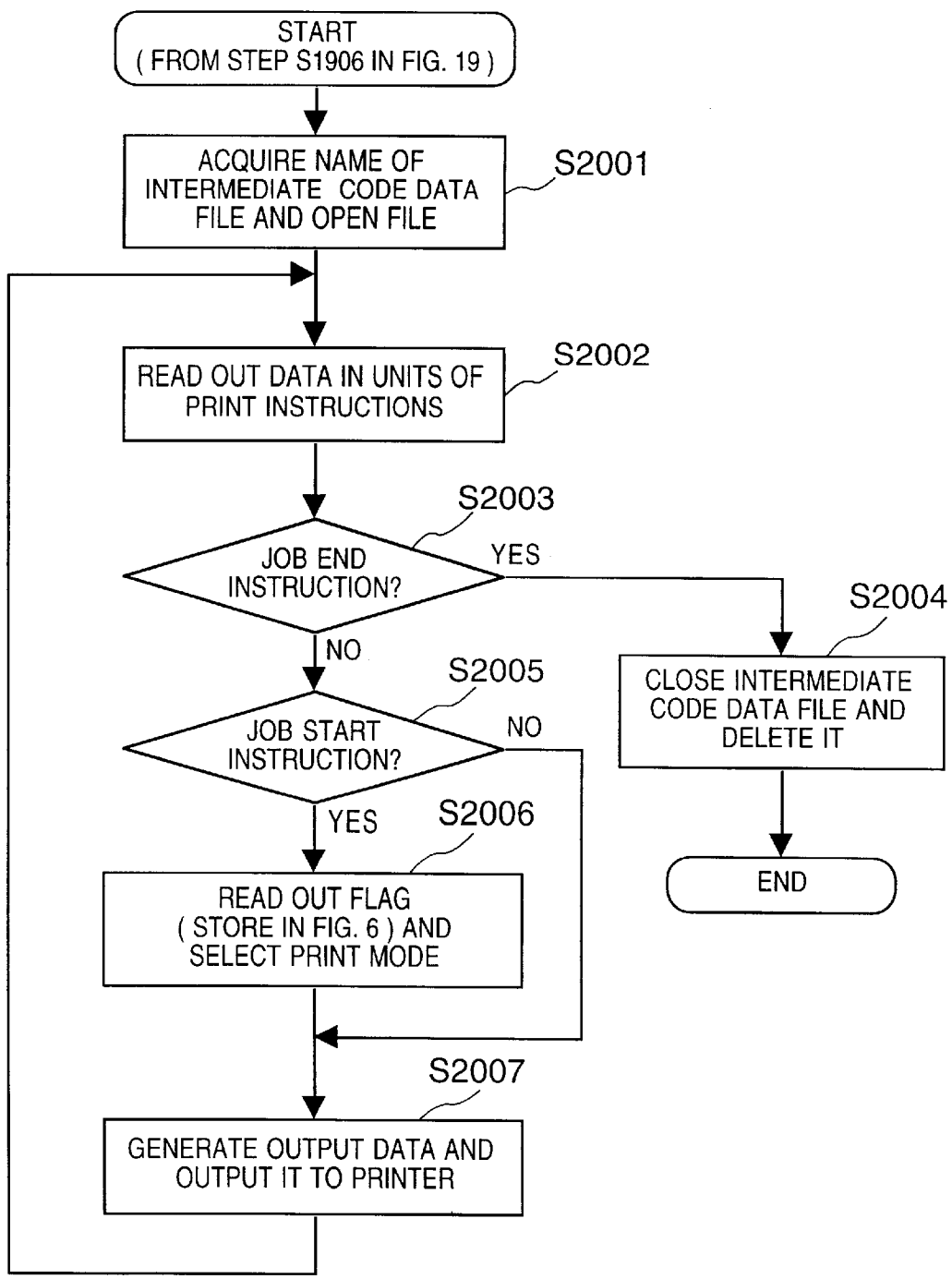
FIG. 20 is a flow chart showing printer control command generation processing in the eighth embodiment.

As shown in FIG. 20, in the steps of generating a print control command and designating a print mode, the intermediate code data file is opened (step S2001), and the data are sequentially read out in units of print instructions (step S2002). As described above, FIG. 7 shows the contents of the intermediate code data file. The first instruction read out from this file is a "job start instruction". It is then checked whether the instruction is a "job end instruction" (step S2003). If it is determined that the instruction is not a job end instruction (NO in step S2003), it is checked whether the instruction is a job start instruction (step S2005). If it is determined that the instruction is a job start instruction (YES in step S2005), a specific print mode in which a printer control code to be transmitted to the printer 1500 is generated is determined (step S2006) by referring to the flag value stored in the processing in FIG. 19 and indicating a print mode (steps S1904 and S1908 in FIG. 19). More specifically, the vector graphics print mode or raster graphics print mode is selected in accordance with the above flag value.

If it is determined in step S2005 that the instruction is not a job start instruction (NO in step S2005), the flow advances from step S2006 to step S2007. In step S2007, a printer control command that is generated from the intermediate code data and transmitted to the printer 1500 is generated and output in accordance with the print mode. In this case, the intermediate code data is converted into the printer control command through the graphics engine 202.

The processing from step S2002 to step S2007 is repeated until a job end instruction is read out.

If it is determined in step S2003 that the readout print instruction is a job end instruction (YES in step S2003), the intermediate code data file is closed and deleted, and the area on the RAM 2 in which the above flag value is stored is released.

According to this embodiment described above, the vector graphics print mode is the default print mode, and the raster graphics print mode is automatically selected when a special print instruction is generated. Therefore, a printer control command that can ensure relatively high print performance and a proper print result can be automatically generated.

[Ninth Embodiment]

When a request to print a plurality of pages is output to a printer driver that is loaded into a RAM 2 of a host computer 3000 to be operated, the step of obtaining a print mode suited to print processing and the step of generating a printer control command from an intermediate code in the print mode obtained in the step of obtaining the print mode in the eighth embodiment may be applied to each print page, thus improving the embodiment.

Figure 21:
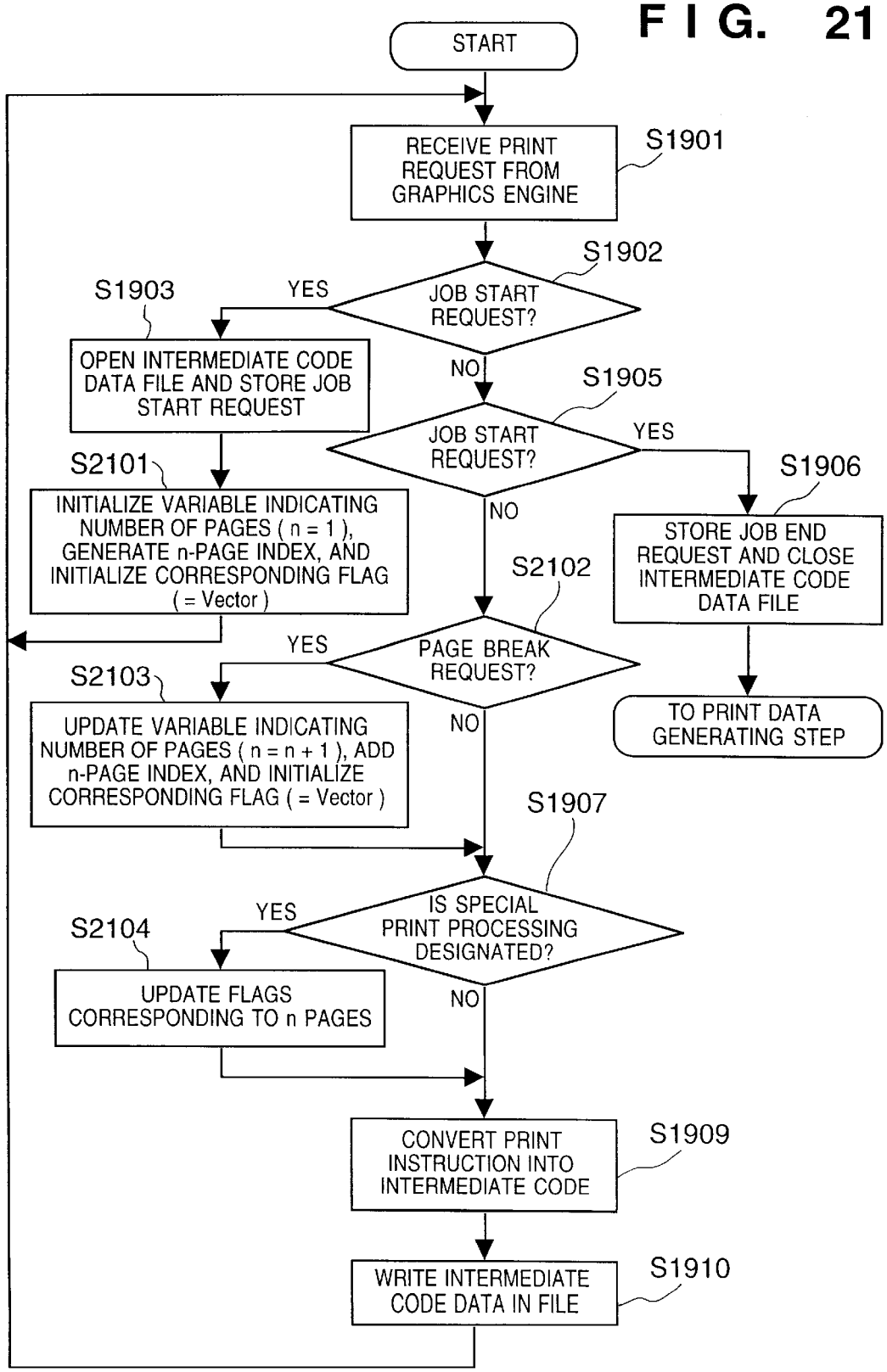
FIG. 21 is a flow chart showing intermediate code data generation processing in the ninth embodiment.
Figure 22:
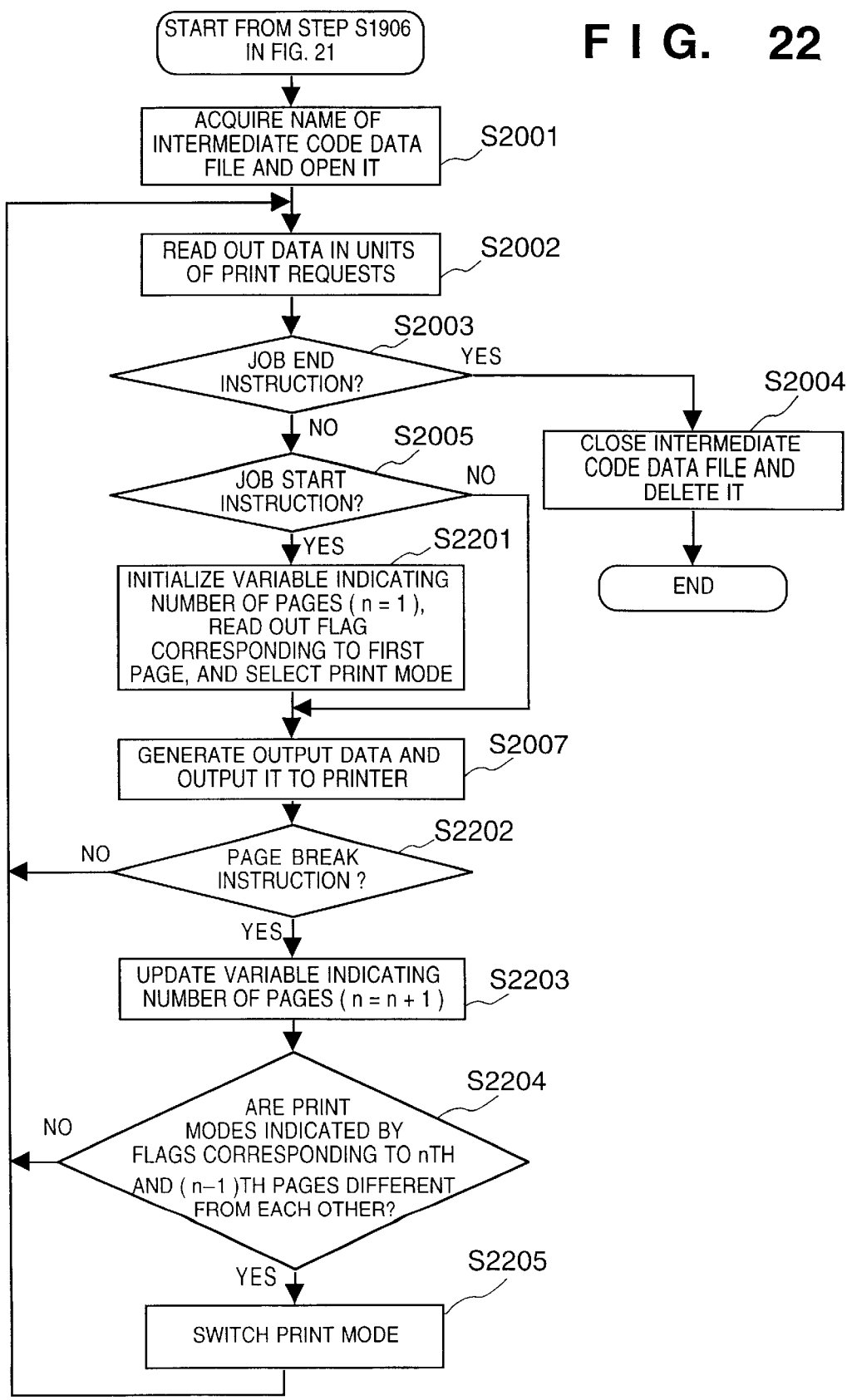
FIG. 22 is a flow chart showing printer control command generation processing in the ninth embodiment.

FIGS. 21 and 22 show processing as an improvement of the processing in the eighth embodiment. The same reference numerals in the flow charts in FIGS. 21 and 22 denote the same processing as in FIGS. 19 and 20.

Steps S2101 and S2104 in FIG. 21 are improvements of the embodiment of the eighth embodiment. The processing in steps S2101 and S2104 is executed in place of the processing in steps S1904 and S1908, and the processing in steps S2102 and S2103 is executed between steps S1905 and S1907 in FIG. 19.

Referring to FIG. 22, the processing in step S2201 is executed in place of the processing in step S2006 in FIG. 20, and the processing in steps S2202 to S2205 is additionally executed after step S2007 in FIG. 20. Only improvements in the processing in the eighth embodiment will be described in detail below with reference to FIGS. 21 and 22.

Referring to FIG. 21, as in the eighth embodiment, if it is determined in step S1902 that a print instruction from a graphics engine 202 is a job start request (YES in step S1902), a file for storing intermediate code data is opened, and intermediate code data corresponding to the job start request is stored in the file (step S1903).

Subsequently, an area for storing print mode information for each page in the table format in FIG. 23 is ensured on the RAM 2. In addition, a variable n indicating a page number is ensured on the RAM 2. The variable n is then initialized into 1, and the print mode information corresponding to the page number 1 is initialized into a value indicating the vector graphics print mode (step S2101). Assume that an area for storing print mode information for the nth page is added to the end portion of the table area shown in FIG. 23 with an increase in the number of print pages.

In the eighth embodiment, if it is determined in step S1905 that the instruction is not a job end request, it is immediately checked whether special print processing is designated. In contrast to this, in this embodiment, it is checked before this step whether a page break request is generated (step S2102). If the page break request is designated (YES in step S2102), the variable n indicating the page number and ensured on the RAM 2 in step S2102 is incremented by one. In addition, an area for storing print mode information corresponding to the new page is added to the end portion of the table in FIG. 23 (step S2103). The print mode information corresponding to the new print page is initialized with the value indicating the vector graphics print mode (step S2103).

If it is determined in step S2102 that no page break request is designated (NO in step S2102), it is checked whether the print instruction from the graphics engine 202 designates special print processing (step S1907). If it is determined that special print processing is designated (YES in step S1907), the print mode information corresponding to the nth page is updated to the value indicating the raster graphics print mode (step S2104). If it is determined that special print processing is not designated (NO in step S1907), the flag information corresponding to the nth page is not updated, and the print instruction is converted into an intermediate code. The intermediate code data is then written in the file (steps S1909 and S1910).

With the processing in FIG. 21, a print mode is set for each print page. In the processing in FIG. 22, if it is determined that the instruction read out from the intermediate code data file is a job start instruction (YES in step S2005), the variable n indicating a page number is ensured on the RAM 2, and the variable n is initialized to n=1 (step S2201). At the same time, the print mode corresponding to the first page obtained by the processing in FIG. 21 is selected (step S2201).

In this print mode, a printer control command to be output to a printer 1500 is generated from the intermediate code data through the print instruction (step S2007). This processing is repeated until a job end instruction is detected. If a page break instruction is read out in the processing of reading out the intermediate code data (YES in step S2202), the variable n indicating the current print page number is incremented by one (step S2203), and the print mode is switched (S2205) only when the print mode that has been selected differs from the print mode corresponding to the nth page which is obtained in the processing in FIG. 21 (YES in step S2204).

With the processing shown in FIG. 22 in this embodiment, a proper print mode is set for each print page by minimum necessary switching processing. Assume that in the print processing for five pages, print modes for the respective pages are obtained such that the raster graphics print mode is set for the first and second pages, and the vector graphics print mode is set for the third and subsequent pages, as shown in FIG. 23. In this case, a print mode is actually designated and changed two times, i.e., immediately after reception of a page break instruction immediately before the first page and after the second page.

[10th Embodiment]

Figure 24:
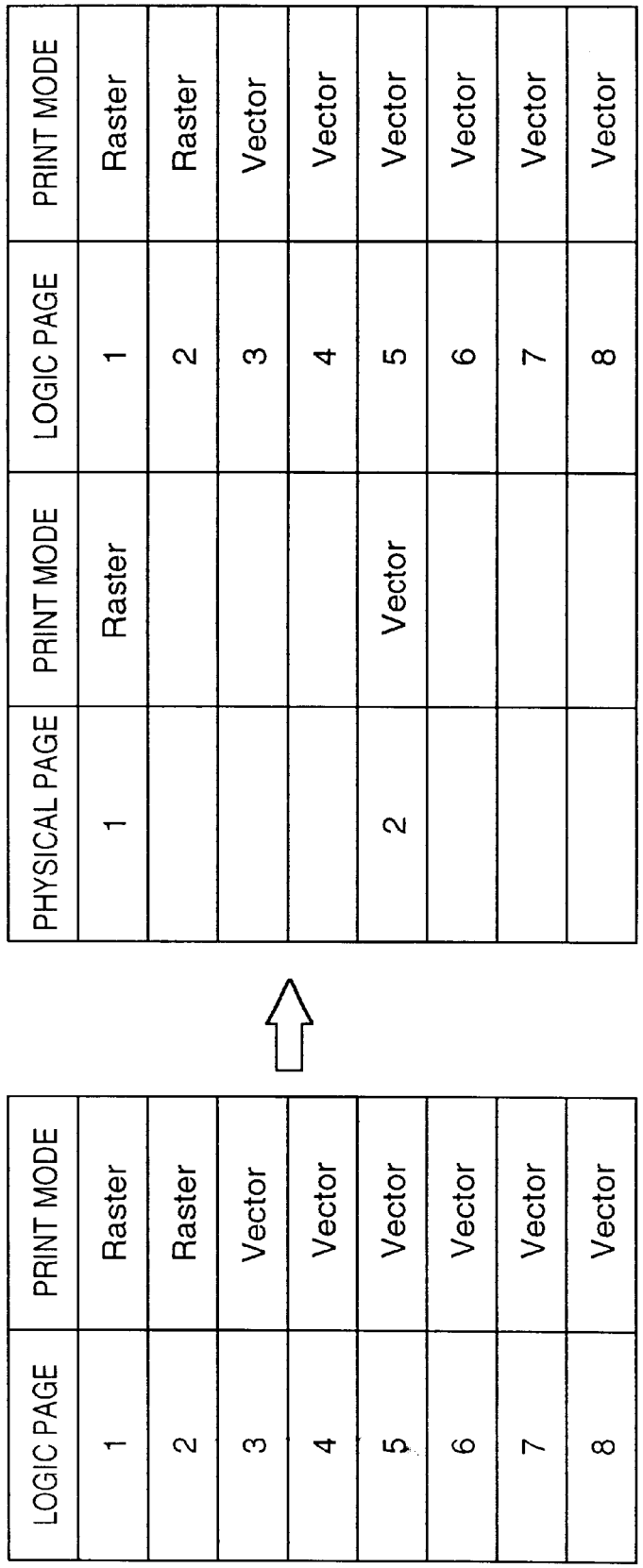
FIG. 24 is a print mode information table in the 10th embodiment.

Assume that in the 10th embodiment, a printer driver that is loaded into a RAM 2 of a host computer 3000 to be operated and a printer 1500 have the function (N-page printing) of reducing a plurality of print pages (logic pages) and printing the pages upon laying out them on one page (physical page) (FIG. 24). In this case, an improvement can be made such that a print mode suited to print processing in the ninth embodiment is selected for each logic page first, and then a suitable print mode is selected for each physical page.

Figure 25:
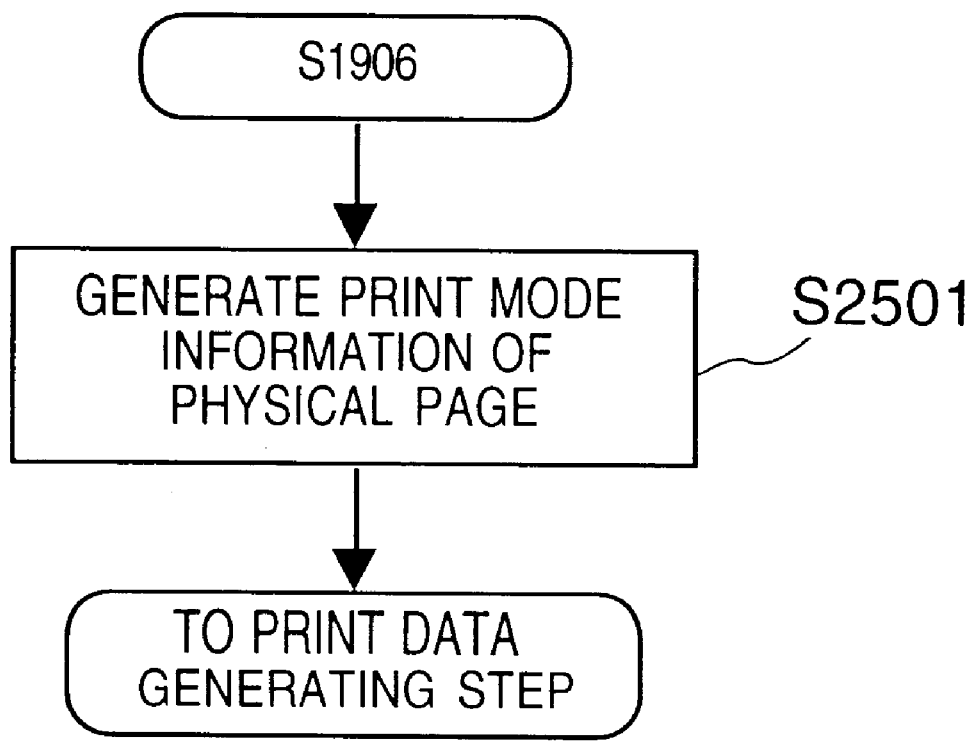
FIG. 25 is a flow chart showing a characteristic feature of the procedure in the 10th embodiment.

Assume that a four-page printing mode (four logic pages are laid out on one physical page to be printed) is designated by an application that is loaded into the RAM 2 of the host computer 3000 to be operated, and a print instruction for eight pages is issued to the printer driver (FIG. 24). In this case, in this embodiment, after the processing in step S1906 in FIG. 21, print mode information for each physical page, shown on the right side of FIG. 24, is generated in the RAM 2 of the basis of print mode information for each of the eight logic pages (step S2501 in FIG. 25).

In the case shown in FIG. 24, since the raster graphics print mode is set for only the first and second logic pages, the raster graphics print mode is determined for the first physical page, and the vector graphics print mode is determined for the second physical page.

Figure 26:
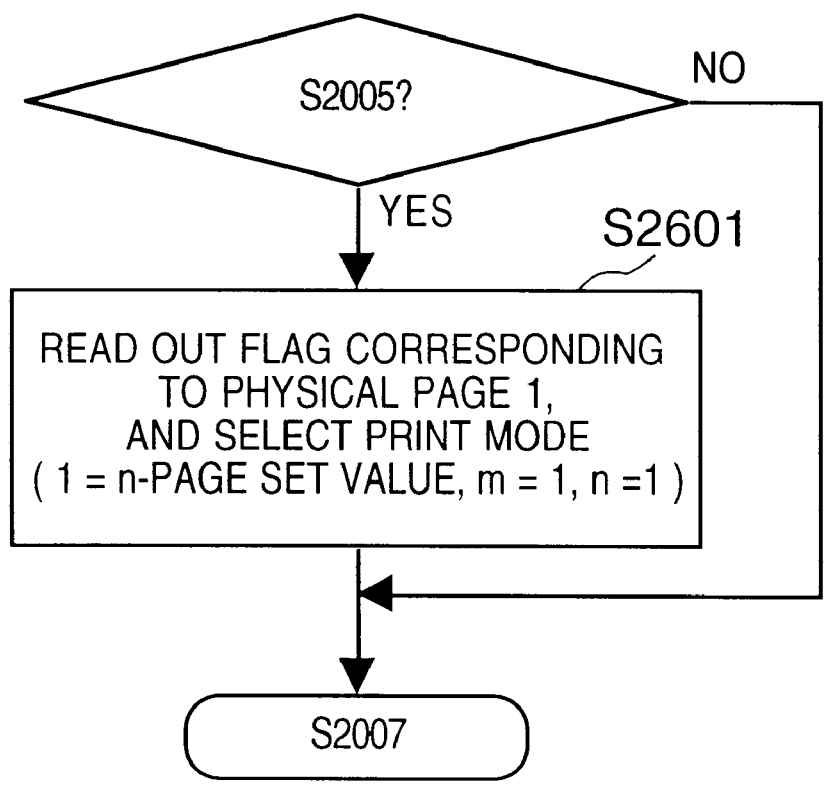
FIG. 26 is a flow chart showing a characteristic feature of printer control command generation processing in the 10th embodiment.
Figure 27:
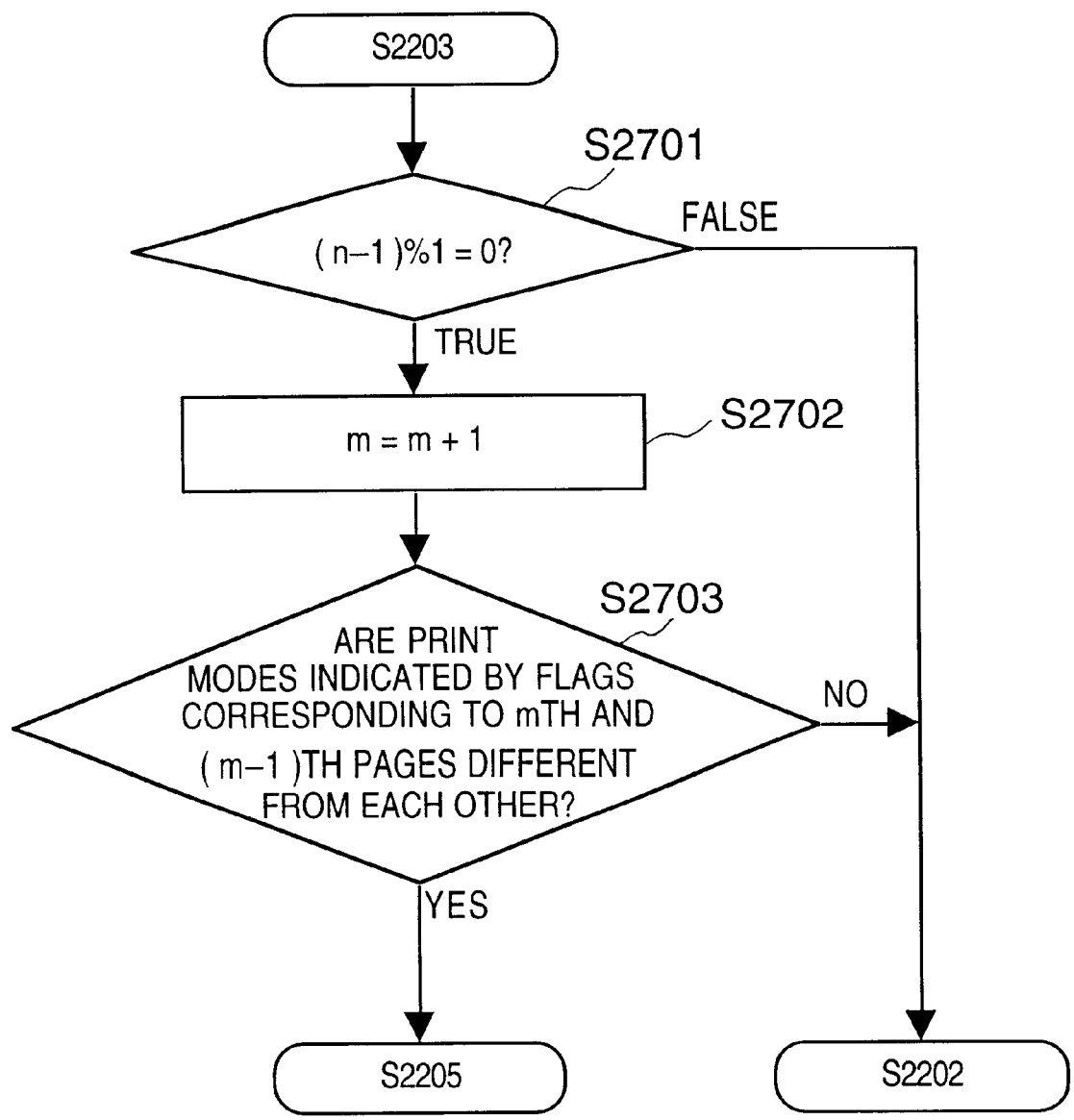
FIG. 27 is a flow chart showing a characteristic feature of printer control command generation processing in the 10th embodiment.

The printer control command generation step in FIG. 22 follows these processes. The processing in this step is basically the same as that in the ninth embodiment described above, except that the processing in step S2601 in FIG. 26 is performed in place of the processing in step S2201 in FIG. 22, and the processing in steps S2701 to S2703 in FIG. 27 is performed in place of step S2204.

By adding the above processing to the eighth embodiment, switching of proper print modes is controlled in units of physical pages instead of logical pages. This prevents a plurality of print modes from being designated for a single physical page at once, and allows N-page printing in an optimal print mode.

[11th Embodiment]

Assume that in the 11th embodiment, a printer 1500 has a double-sided print function, and a maximum of two pages having undergone single-sided printing can be pooled at once inside the printer to improve the performance of double-sided printing. In this case, an improvement can be made such that the step of obtaining a print mode suited to print processing described in the above embodiment and the step of generating a printer control command from an intermediate code in the obtained print mode are applied in consideration of the conveying order of paper sheets in the printer 1500.

FIG. 28 shows how paper sheets are conveyed in the printer 1500 when double-sided printing is executed. When the printer 1500 actually receives four continuous page data, the printer prints the fourth page first, and then pools it in a printer double-sided unit (step 1 in FIG. 28). Subsequently, the printer 1500 prints the second page and pools it in the double-sided unit like the fourth page (step 2 in FIG. 28).

The paper sheet having the second page printed is fed from the double-sided unit to print the first page, and the resultant paper sheet is discharged facing down onto the paper discharge tray (step 3 in FIG. 28). Thereafter, the paper sheet having the four page printed is fed from the double-sided unit to print the third page, and the resultant paper sheet is discharged facing down on the paper discharge tray in the same manner as described above (step 4 in FIG. 29).

Assume that a request to perform double-sided printing of four pages is output from an application that is loaded into a RAM 2 of a host computer 3000 to be operated. In this case, according to this embodiment, after the processing in step S1906 in FIG. 21 in the ninth embodiment is complete, the total number of pages is checked from print mode information for every four pages, shown on the left side of FIG. 29, and the print mode information on the left side of FIG. 29 is sorted in the actual printing order of pages, thereby obtaining the table shown in the middle of FIG. 29 (step S3001 in FIG. 30).

If the print modes are frequently switched, the performance of the printer 1500 deteriorates. The number of times of print mode switching is therefore taken into consideration. In this embodiment, the print modes are switched only when two or more pages are continuously subjected to print processing in the same print mode, in consideration of a deterioration in the performance of the printer 1500 upon switching of the print modes.

Figure 29:
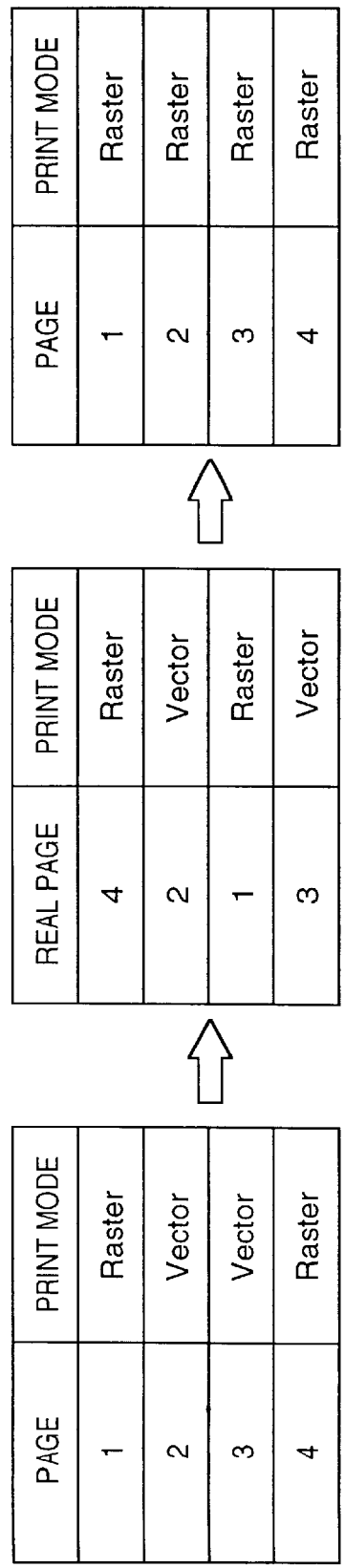
FIG. 29 is a print mode information table in the 11th embodiment.
Figure 30:
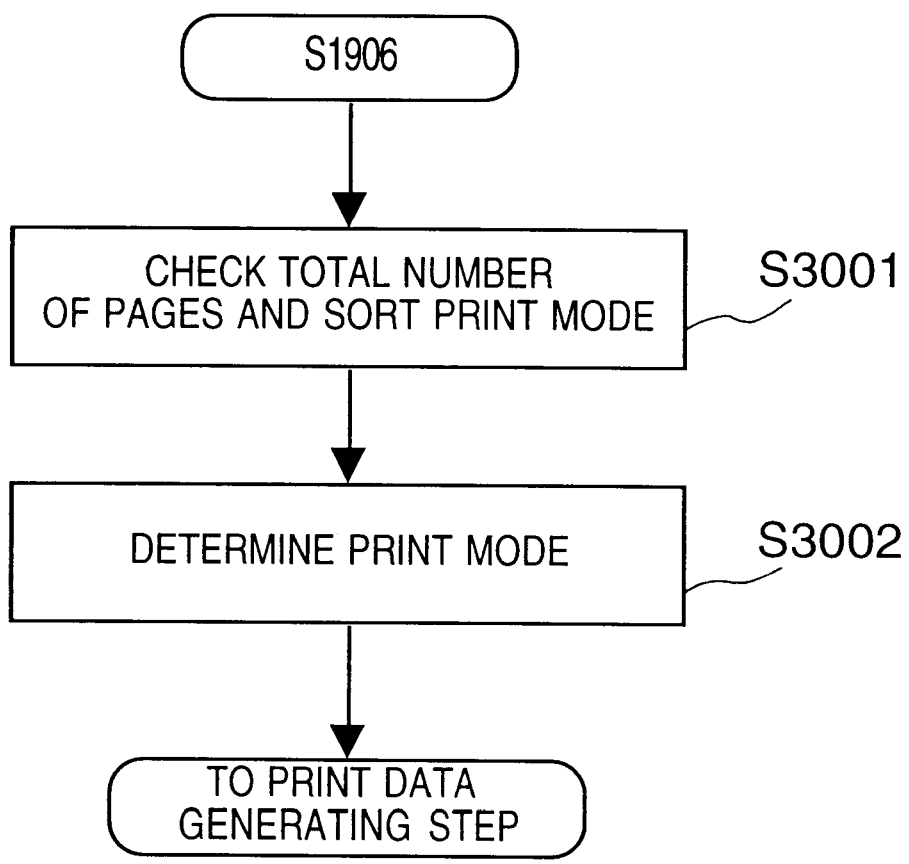
FIG. 30 is a flow chart showing a characteristic feature of intermediate code data generation processing in the 11th embodiment.

In the case of the print mode information in the middle of FIG. 29, for example, since the print modes are switched for each page, the print mode on the right side of FIG. 29 is selected in consideration of the above condition. That is, the actual page numbers in the middle table in FIG. 29 are renumbered, and all the print modes that are designed in the order of the raster graphics print mode, the vector graphics print mode, the raster graphics print mode, and the vector graphics print mode from the first page (actually the fourth page) are changed to the raster graphics print mode.

[12th Embodiment]

FIG. 31 shows a memory map in a state wherein a printer driver to which the present invention is applied is loaded into the RAM of the host computer to be executed. In a host computer 3000 (FIG. 1), a BIOS, OS, application, and printer driver to which a method of optimizing printer control command generating processing according to the present invention is applied are operated by a CPU 1. The BIOS is written in a program ROM 3b, and the OS is written in a hard disk (to be referred to as an HD) as an external memory 11. When the power supply for the host computer 3000 is turned on, an OS 36 is loaded from the HD 11 into a RAM 2 by the IPL (Initial Program Loading) function in the BIOS program and operates.

The printer driver can actually operate when an application 32 that operates under the control of the OS on the host computer 3000 starts print processing in accordance with an instruction from the user or the like, and more specifically, when a printer driver 35 is read out from a medium such as the external memory 11, on which the printer driver 35 is recorded, and loaded into the RAM 2 under the control of the OS 36 and a BIOS 37.

Figures 32A, 32B:
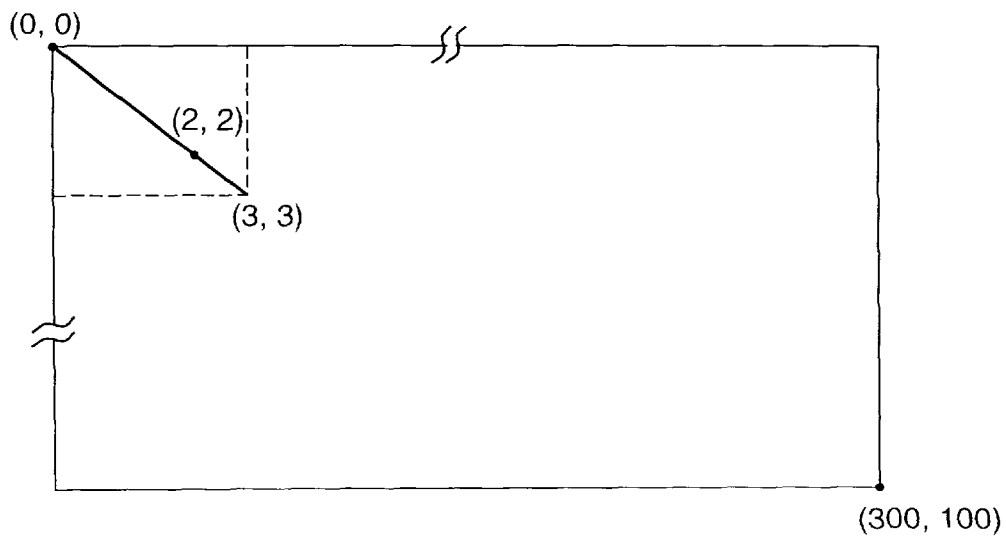
FIG. 32A is a view for explaining a printed area in the 12th embodiment.
FIG. 32B is a view for explaining a printed area in the 12th embodiment.

In this embodiment, since the printer driver ensures one memory area like the one shown in FIG. 32A in the RAM 2 of the host computer 3000 to store an area, as rectangular information, which is drawn within a band area. In the four storage areas shown in FIG. 32A, the horizontal and vertical coordinate values of the upper left corner and lower right corner of a rectangle are stored in relative coordinate values in units of integers with the upper left corner of the rectangle indicating the entire band area being set as an origin (0, 0).

The above rectangular information is updated (enlarged) such that every time the printer driver 35 receives a print instruction from the application 32, an area designated as a print area is contained in each print instruction.

Figure 17:
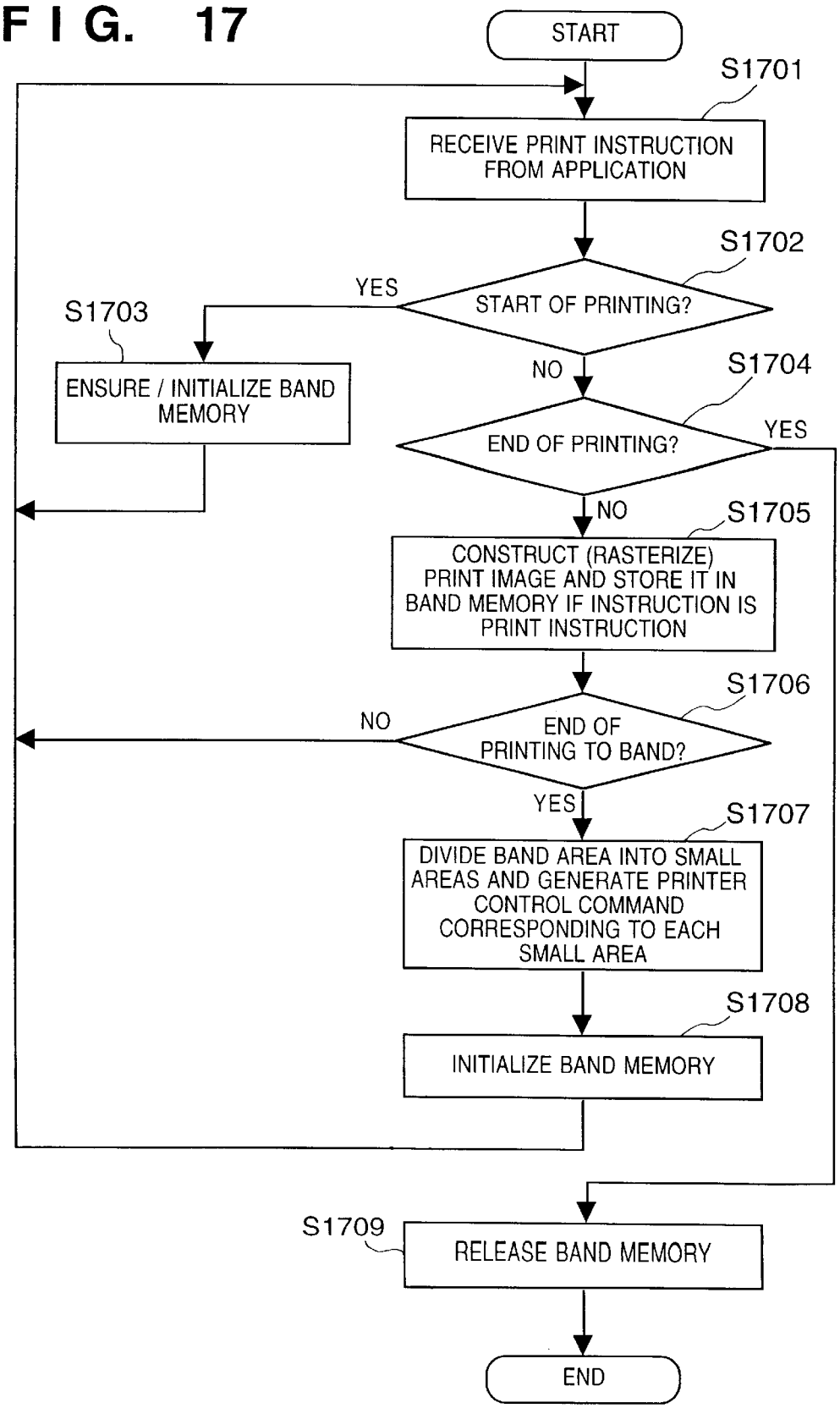
FIG. 17 is a flow chart showing the contents of processing performed by a conventional printer driver in the raster graphics print mode.

This embodiment uses the means for defining a band area depending on how a rectangular area is contained (using area information having undergone printing). As is obvious, however, the effects of the present invention can be obtained even if a shape other than a rectangular shape, e.g., an elliptic or polygonal shape, is used. In addition, in this embodiment, as a band area forming method in step S1707 in FIG. 17, a method of dividing the area in units of horizontal lines (to be referred to as scan lines) each having a height of one pixel is used.

Figure 33:
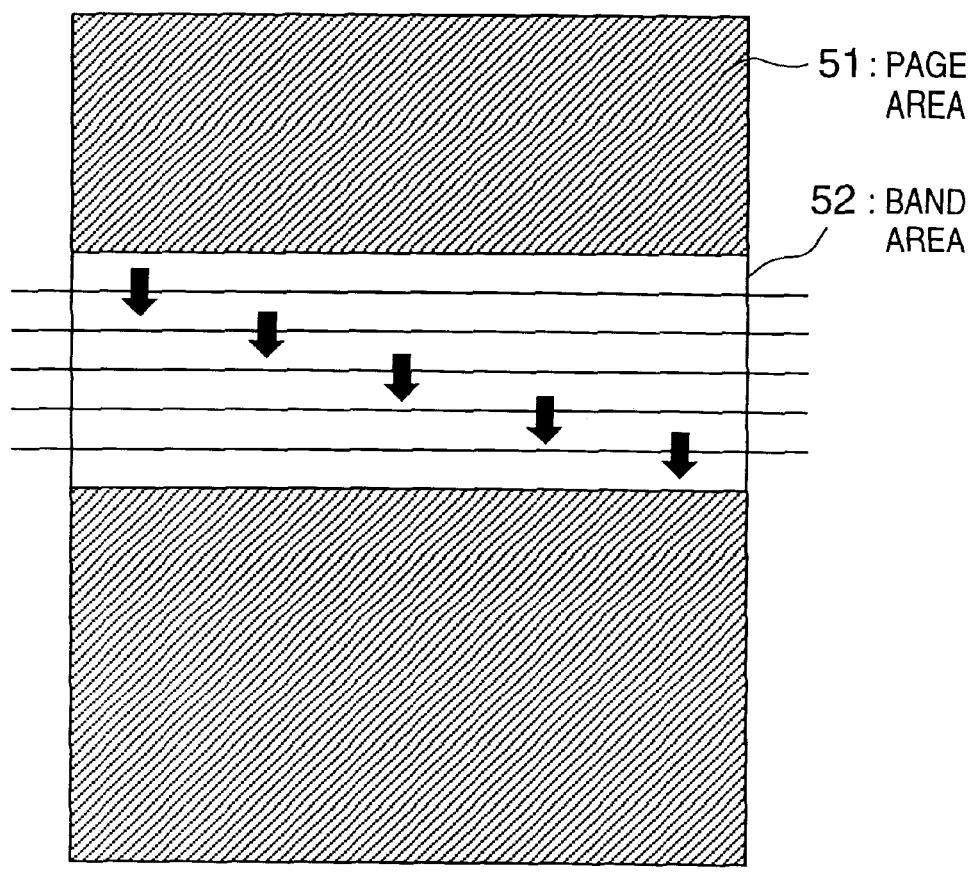
FIG. 33 is a view showing how a band area is divided in units of scan lines.

FIG. 33 shows how an area is divided. Reference numeral 51 denotes a page area; and 52, a band area. With this dividing operation, the printer driver 35 generates printer control commands in units of scan lines.

As described above, the method of dividing an area into band areas in units of scan lines is applied to this embodiment. However, the same effect as that of the present invention can be obtained by applying another dividing method, for example, a method of dividing an area into rectangular areas smaller than band areas, to the embodiment.

Figure 34:
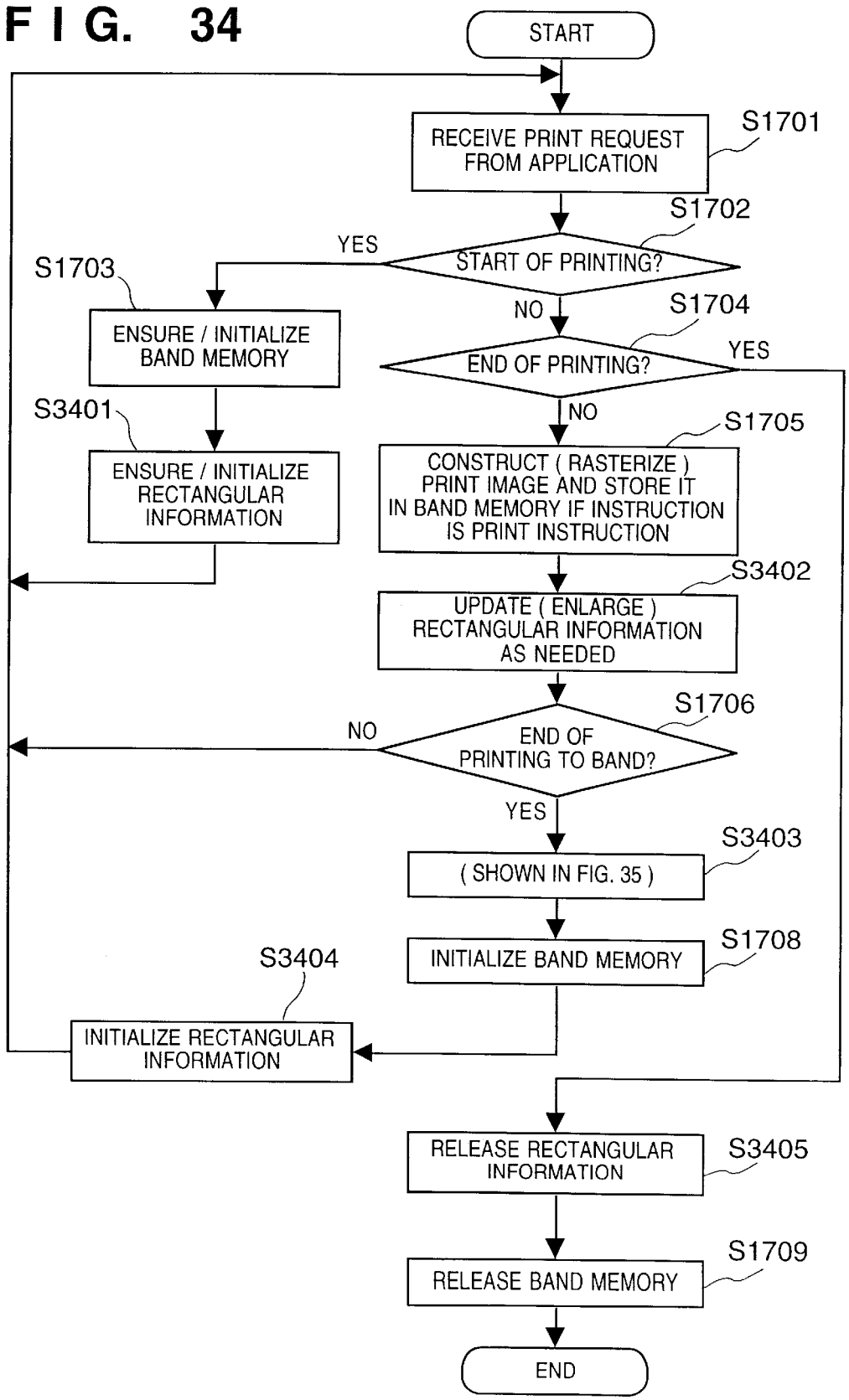
FIG. 34 is a flow chart showing a procedure for rasterizing a print image in the 12th embodiment.
Figure 35:
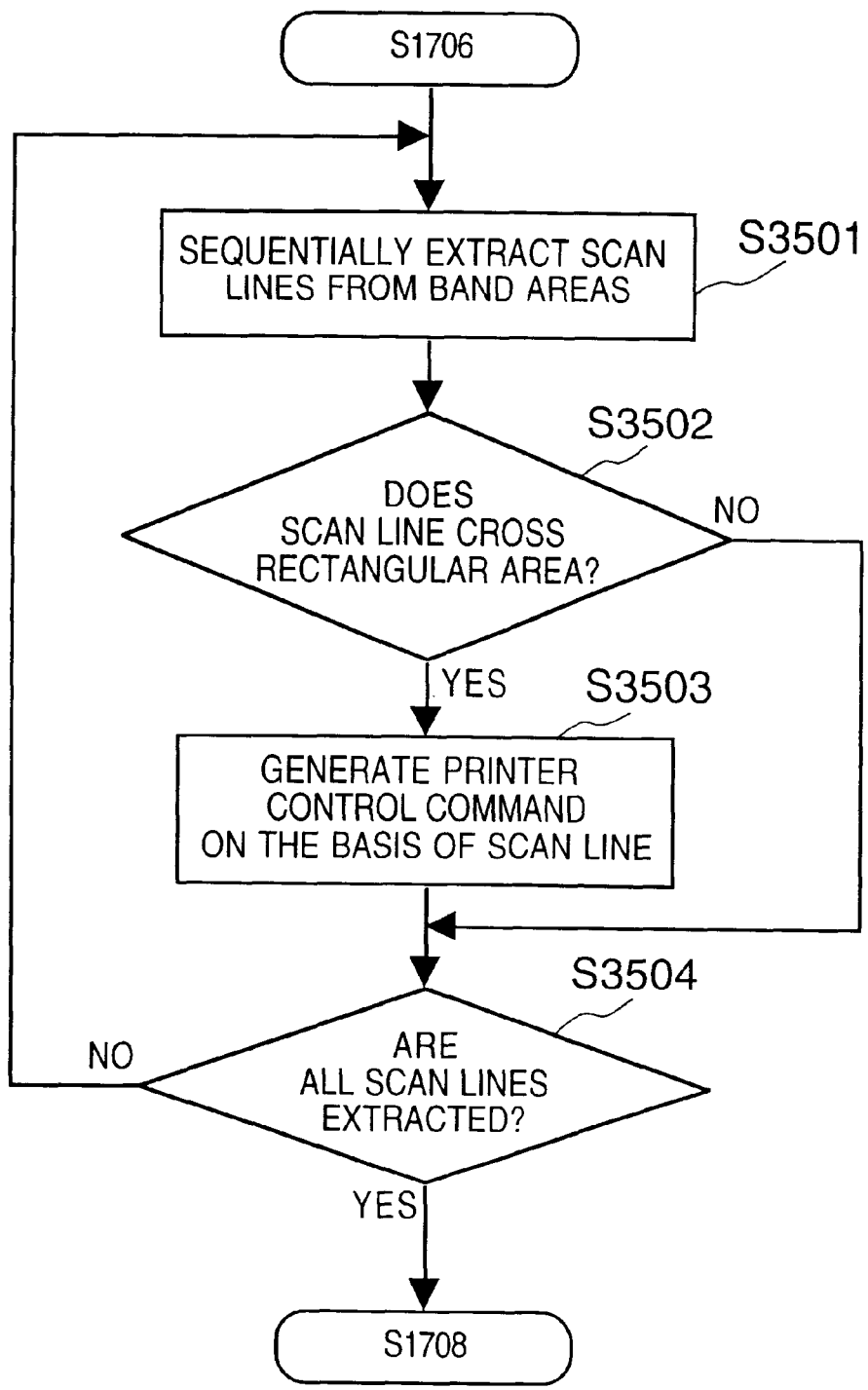
FIG. 35 is a flow chart showing a procedure for dividing a band area in the 12th embodiment.

FIG. 34 shows the details of the procedure executed in this embodiment to which the present invention is applied. The same reference numerals in FIG. 34 denote the same steps as in FIG. 17. Since the procedure in FIG. 17 has been described in association with the prior art, a repetitive description of the steps denoted by the same reference numerals will be omitted. FIG. 35 is a flow chart showing the details of the processing in step S3403 in FIG. 34.

The manner in which areas, in band areas, which have undergone printing are stored will be described first with reference to FIG. 34. In step S1702, a print instruction received from the application 32 that is loaded into the RAM 2 of the host computer 3000 to be operated is checked (step S1702). If it is determined that the instruction indicates a print start (YES in step S1702), a band memory is acquired/initialized (step S1703). Then, a memory area for holding rectangular information is ensured in the RAM 2 in the form shown in FIG. 32A, and all pieces of information are initialized to "0" (step S3401).

This rectangular information is updated (enlarged) such that when the printer driver receives a print request from the application, rasterizes print image in accordance with the print request, and stores the resultant data in the band memory (step S1705), the entire print image rasterized in accordance with the print request is contained in a rectangle (step S3402). When a print request from the application with respect to a given band area is completely processed (YES in step S1706), a printer control command corresponding to the band area is generated (step S3403) first, and then all the pieces of rectangular information are initialized to "0" (step S3404). Note that a memory area for storing the above rectangular information is released in the RAM 2 (step S3405) at the end of printing (YES in step S1704).

The manner in which rectangular information is updated will be described in detail below (FIG. 32B). Assume that the printer driver sequentially receives the following three print requests for a given band area. Note that the coordinate values of the following points are relative coordinate values with the upper left corner of a band area being set as an origin (0, 0), and are expressed in the form of (horizontal coordinate value, vertical coordinate value). Referring to FIG. 32A, the values of the pieces of rectangular information are expressed by relative coordinate values from the origin, as in the above case, in the form of (left, top, right, bottom).

(1) line print request . . . start point (0, 0), end point (3,3)

(2) point print request . . . coordinates (2, 2)

(3) bitmap print request . . . start point (0, 0), width of 300, height of 100.

Upon reception of print request (1), the printer driver updates rectangular information to ((0, 0), (3, 3)). Upon reception of print instruction (2), the printer driver performs print processing. However, since print coordinates are present in the rectangular information that has already been stored, the rectangular information is not updated. Upon reception of print request (3), the printer driver updates the print information to ((0, 0), (300, 100)) because the print area is larger than an area containing the rectangular area. When the printer driver receives the above series of print requests, ((0, 0), (300, 100)) is stored as rectangular information.

The processing in step S3403 in FIG. 34 will be described next with reference to FIG. 35. The manner in which the rectangular information stored in the RAM 2 is used to generate a printer control command and the processing is optimized will be described in particular.

A band area as part of a page image is divided in units of scan lines, and the areas are sequentially extracted (step S3501). In this embodiment, the scan lines are extracted from the upper portion of the band area 52 in the order shown in FIG. 33. It is then checked whether a given scan line crosses stored rectangular information (step S3502). If it is determined that they cross each other (YES in step S3502), a printer control command corresponding to this scan line is generated (step S3503).

If it is determined in step S3502 that they do not cross with each other (NO in step S3502), or after step S3503, the flow advances to step S3504 to check whether all the scan lines are extracted (step S3504). The processing from step S3501 to step S3503 is repeated until it is determined in step S3504 that all the scan lines are extracted.

With regard to step S3503 in this embodiment, there is only the description "a printer control command corresponding to this scan line is generated". If, however, several steps are required to generate a printer control command from the scan line, wasteful processing can be eliminated by using information indicating how many non-printed areas are present between the left and right ends of the scan line.

For example, such steps include color conversion from colors (to be referred to as R, G, and B values) expressed by luminance components such as red, green, and blue into colors (to be referred to as C, M, Y, and K values) expressed by density components such as cyan, magenta, and yellow, and data compression processing. However, the present invention is not limited to them.

According to this embodiment to which the present invention is applied, since printer control command generation corresponding to non-printed areas in each band area can be reduced or eliminated, the processing time can be shortened. In addition, the size of print data to be generated by the printer driver can be reduced.

If the present invention is applied to a case wherein the conventional printer driver checks all the processing target areas in a band memory one by one to omit printer control command generation corresponding to non-printed areas in each band area, processing that is irrelevant to printing can be omitted more efficiently. This can optimize the printer driver processing.

As described in one case in this embodiment, when several steps are required to generate a printer control command, wasteful processing can be omitted by using information indicating, for example, how many non-printed areas are present between the left and right ends of each scan line in this embodiment. The time required for printer driver processing can be further shortened. In addition, according to this embodiment, when several steps are required to generate each printer control command from the band memory, the processing time associated with the printer driver can be shortened by obtaining areas that are irrelevant to printing from target areas from which printer control commands are to be generated, and skipping steps corresponding to the obtained areas.

The function of this embodiment may be implemented by the host computer using an externally installed program. In this case, pieces of information including the program are loaded from a storage medium such as a CD-ROM, flash memory, or FD or an external storage medium through a network for e-mail, personal computer communications, or the like into a system including an output apparatus and the host computer, thereby providing the above function for the host computer or the output apparatus. The present invention can be applied to such a case.

[13th Embodiment]

As the 13th embodiment, an improvement can be made such that when a print instruction is received from application software, information about printed areas in band areas are stored in advance in units of print requests.

Figure 37:
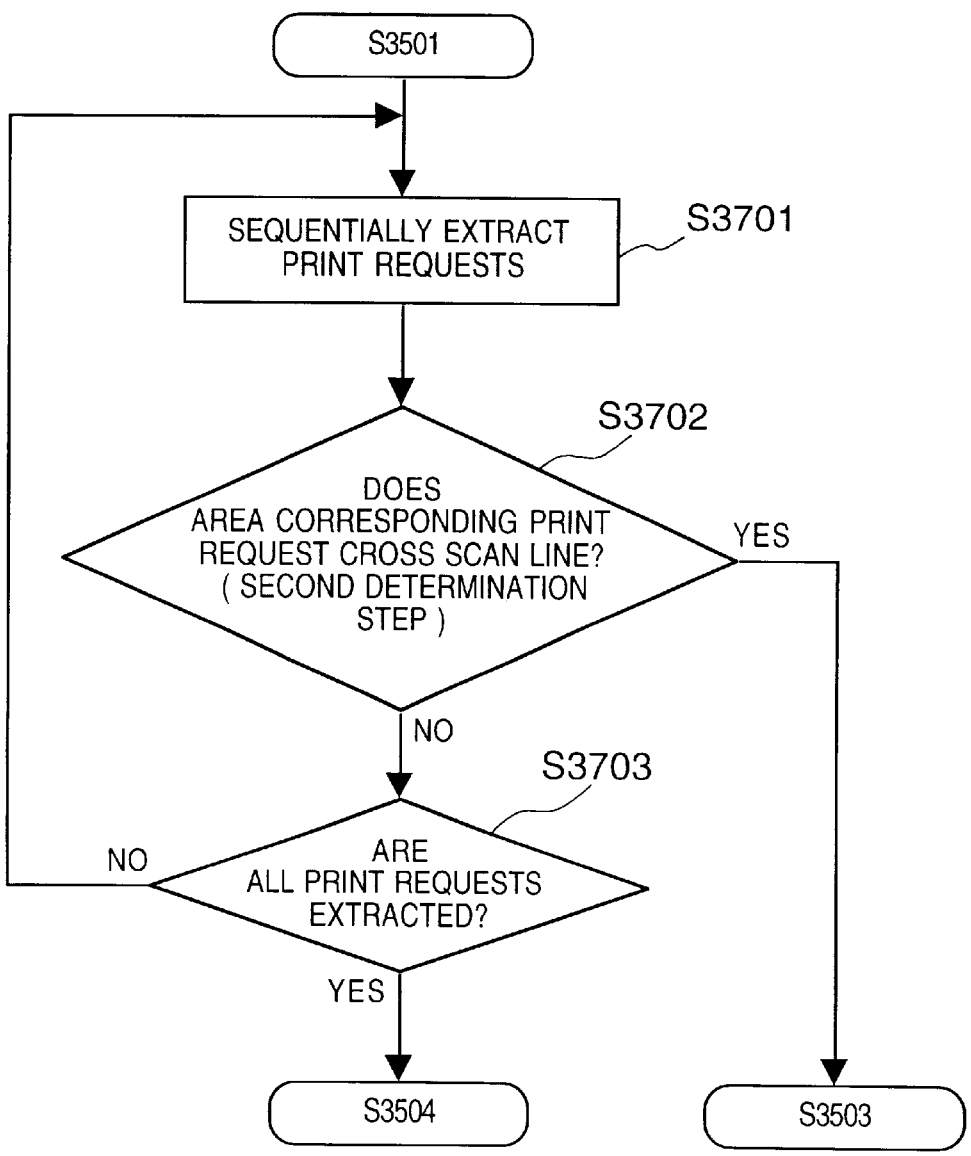
FIG. 37 is a flow chart showing a procedure for dividing a band area in the 13th embodiment.

In this embodiment, the processing in steps S3601, S3602, S3604, and S3605 in FIGS. 34A, 34B, 34C, and 34D is performed in place of the processing in steps S3401, S3402, S3404, and S3405 in FIG. 34 showing the contents of processing in the 12th embodiment. In addition, the processing shown in FIG. 37 is performed in place of step S3502 in FIG. 35 showing the contents of processing in step S3403 in FIG. 34.

The manner in which printed areas in each band area are stored will be described first with reference to FIGS. 36A, 36B, 36C, and 36D. If a print instruction received from an application indicates a print start, a storage area for storing information about printed areas is ensured in a RAM 2 and initialized (step S3601 in FIG. 36A). Note that upon reception of a print instruction, the printer driver sequentially adds a combination of the type of print instruction and additional information such as coordinates corresponding to the type to the printed area information in the form shown in FIG. 38 (step S3602 in FIG. 36B).

Figure 36A:
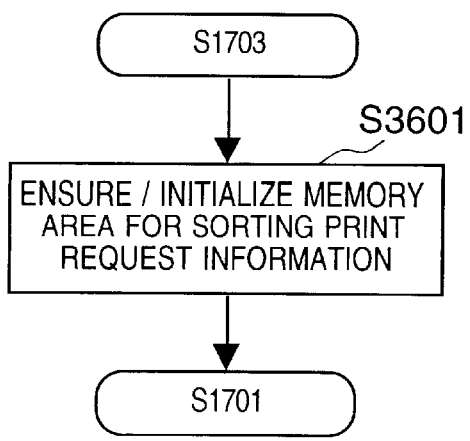
FIG. 36A is a flow chart showing a characteristic feature of a procedure in the 13th embodiment.
Figure 36B:
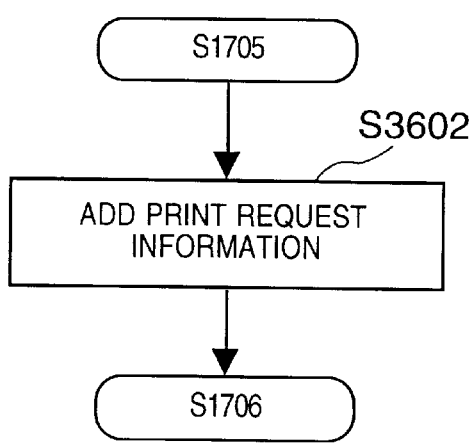
FIG. 36B is a flow chart showing a characteristic feature of the procedure in the 13th embodiment.
Figure 36C:
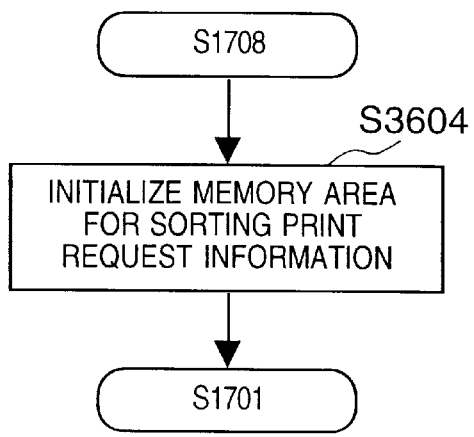
FIG. 36C is a flow chart showing a characteristic feature of the procedure in the 13th embodiment.

When the last print instruction from the application with respect to the band area is processed, the storage area is initialized upon generation of each printer control command corresponding to the band area (step S3604 in FIG. 36C).

Figure 36D:
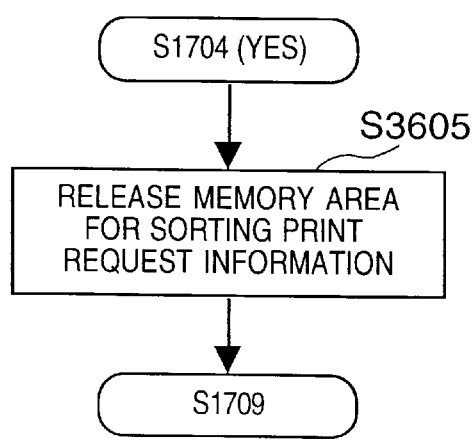
FIG. 36D is a flow chart showing a characteristic feature of the procedure in the 13th embodiment.

Note that the storage area storing the printed area information is released in the RAM 2 at the end of the print processing (step S3605 in FIG. 36D).

The manner in which the area information stored in the RAM 2 is used to generate printer control commands and the processing is optimized will be described with reference to FIG. 37 next. To check whether printing is performed with respect to each scan line extracted in step S3501 in FIG. 35, the print requests stored in the previous step are sequentially extracted from the start (step S3701), and it is checked whether each print request is used for printing with respect to a corresponding scan line (step S3702).

That is, it is checked whether an area printed by the print request overlaps (crosses) the scan line. If parts of them overlap each other, it is determined that printing has been performed. If it is determined in step S3702 that printing has been performed (YES in step S3702), the flow advances to step S3503 to generate a printer control command.

If it is determined in step S3702 that printing has not been performed, the flow advances to step S3703 to check whether the print request is the last one. If it is determined in step S3703 that the print request is not the last one (NO in step S3703), the flow returns to step S3701 again to extract a new print request from the table in FIG. 38. If it is determined that the print request is the last one (YES in step S3703), the flow advances to step S3504.

According to this embodiment, since printer control command generation corresponding to each non-printed area in a band area can be omitted, the processing time can be shortened. In addition, the size of print data to be generated by the printer driver can be further reduced.

In addition, if the present invention is applied to the case wherein the conventional printer driver checks all the processing target areas in the band memory one by one to omit printer control command generation corresponding to each non-printed area in a band area, processing that is irrelevant to printing can be omitted more efficiently. This can optimize printer driver processing.

In this embodiment, pieces of printed area information are stored in units of print requests from an application. However, these pieces of information may be classified according to the shapes of graphic patterns to some extent, and may be stored in units of classified shapes. If, for example, rectangular print information, bitmapped print information, text print information, and the like are stored collectively as rectangular information, more efficient processing can be realized.

[14th Embodiment]

As the 14th embodiment, an improvement can be made such that when a print instruction is received from application software, information indicating whether printing has been performed is stored as printed area information for each scan line. As this area information, information indicating whether printing has been performed is stored in correspondence with each scan line number in a table form, as shown in FIG. 41.

This embodiment is based on the premise that a band memory is divided and printer control commands are generated in units of scan lines. However, the present invention is not limited to this.

In this embodiment, the processing in steps S3901, S3902, S3904, and 3905 shown in FIGS. 39A, 39B, 39C, and 39D is performed in place of steps S3401, S3402, S3404, and S3405 in FIG. 34 showing the contents of processing in the 12th embodiment. In addition, the processing in FIG. 40 is performed in place of step S3502 in FIG. 35 showing the contents of processing associated with the step S3404 in FIG. 34.

The manner in which information of printed areas in a band area is stored will be described first with reference to FIGS. 39A, 39B, 39C, and 39D. If a print instruction received from an application indicates a print start, an area for storing printed area information in units of scan lines is ensured in a RAM 2 and initialized (step S3901 in FIG. 39A). Note that the printed area information is stored in the table form shown in FIG. 41.

More specifically, a table corresponding to all the scan lines constituting the band area is prepared, and the all the pieces of information are initialized with a value indicating that printing has not been performed. In addition, a value corresponding to each sub-area influenced when the printer driver has received the print instruction is updated with a value indicating that printing has been performed (step S3902 in FIG. 39B).

Figure 39A:
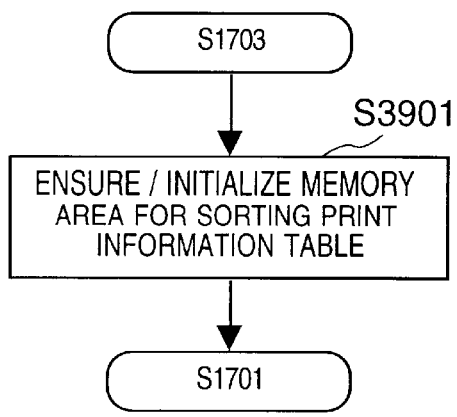
FIG. 39A is a flow chart showing a characteristic feature of a procedure in the 14th embodiment.
Figure 39B:
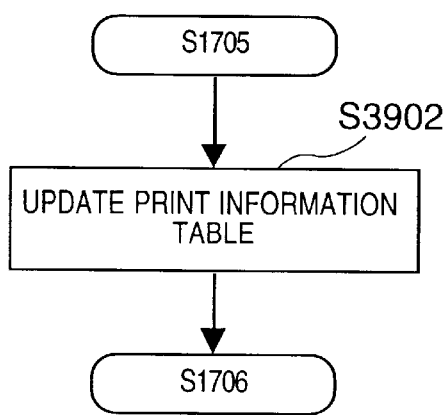
FIG. 39B is a flow chart showing a characteristic feature of the procedure in the 14th embodiment.
Figure 39C:
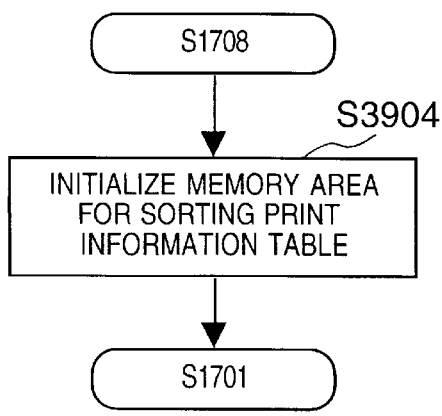
FIG. 39C is a flow chart showing a characteristic feature of the procedure in the 14th embodiment.
Figure 39D:
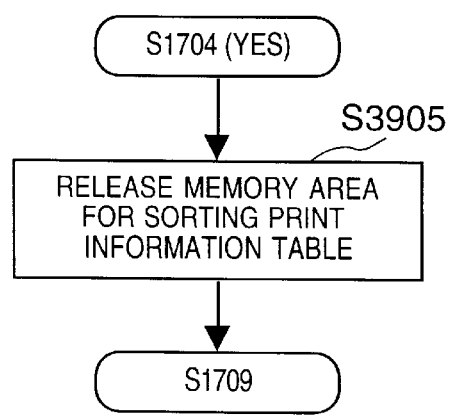
FIG. 39D is a flow chart showing a characteristic feature of the procedure in the 14th embodiment.
Figure 40:
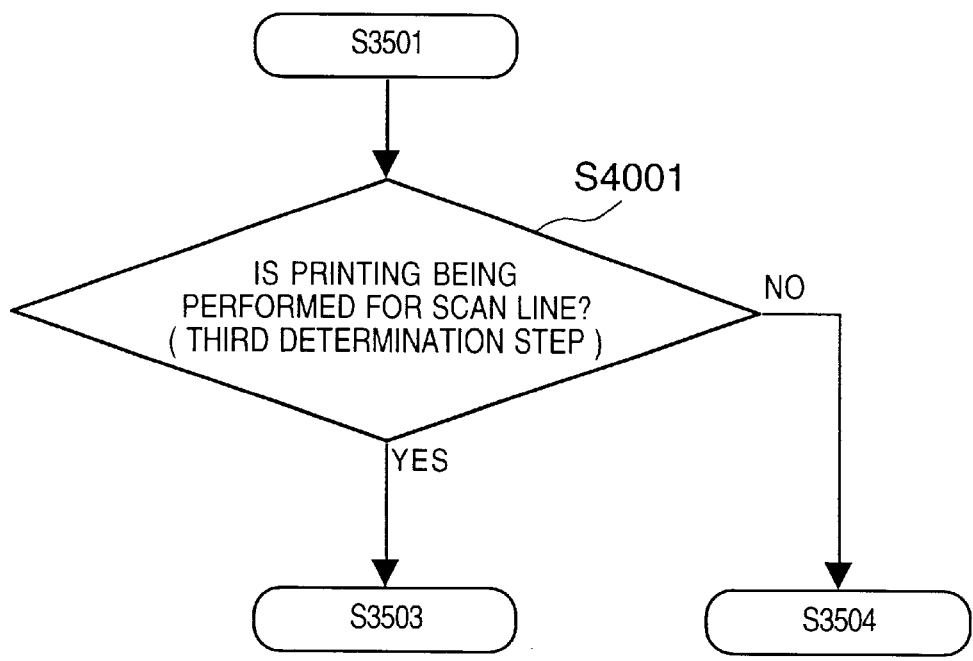
FIG. 40 is a flow chart showing band area dividing processing in the 14th embodiment.

When the last print instruction from the application with respect to the band area is processed, the storage area is initialized upon generation of each printer control command corresponding to the band area (step S3904 in FIG. 39C). Note that the area storing the printed area information is released in the RAM 2 upon completion of the print processing (step S3905 in FIG. 39D).

The manner in which the print information stored in the RAM 2 in the previous step is used to generate printer control commands and the processing is optimized will be described next with reference to FIG. 40.

Whether printing is performed with respect to each scan line extracted in step S3501 in FIG. 35 is checked by referring to a value corresponding to each scan line with the area information stored in the previous step in a table form (step S4001). If it is determined in step S4001 that printing has been performed (YES in step S4001), the flow advances to step S3503 to generate a printer control command.

It is determined in step S4001 that printing has not been performed (NO in step S4001), the flow advances to step S3504 to check whether all the scan lines are extracted.

According to this embodiment, since printer control command generation corresponding to each non-printed area in a band area can be omitted, the processing time can be shortened. In addition, the size of print data to be generated by the printer driver can be reduced.

Furthermore, if the present invention is applied to a case wherein the conventional printer driver checks all the processing target areas in a band memory one by one to omit printer control command generation corresponding to non-printed areas in each band area, processing that is irrelevant to printing can be omitted more efficiently. This can optimize the printer driver processing.

[15th Embodiment]

The objects of the present invention are also achieved by supplying, to the system or apparatus, a storage medium on which a program code of software that can realize the functions of the 12th to 14th embodiments is recorded, and making the computer (CPU or MPU) in the system or apparatus read out the program code from the storage medium and execute it.

In this case, since the program code itself, read out from the storage medium, realizes the functions of the above embodiments, the storage medium storing the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The present invention includes not only a case wherein the functions of the above embodiments are realized by making the computer execute the readout program code but also a case wherein the functions of the above embodiments are realized by making an OS (operating system) running on the computer execute some or all of actual processing operations on the basis of the instructions of the program code.

Furthermore, the present invention includes a case wherein the program code read out from the storage medium is stored in a memory in a function extension board inserted in the computer or a function extension unit connected to the computer, and some or all of actual processing operations are executed by a CPU or the like arranged in the function extension board or function extension unit on the basis of the instructions of the program code, thereby realizing the functions of the above embodiments.

Figure 42A:
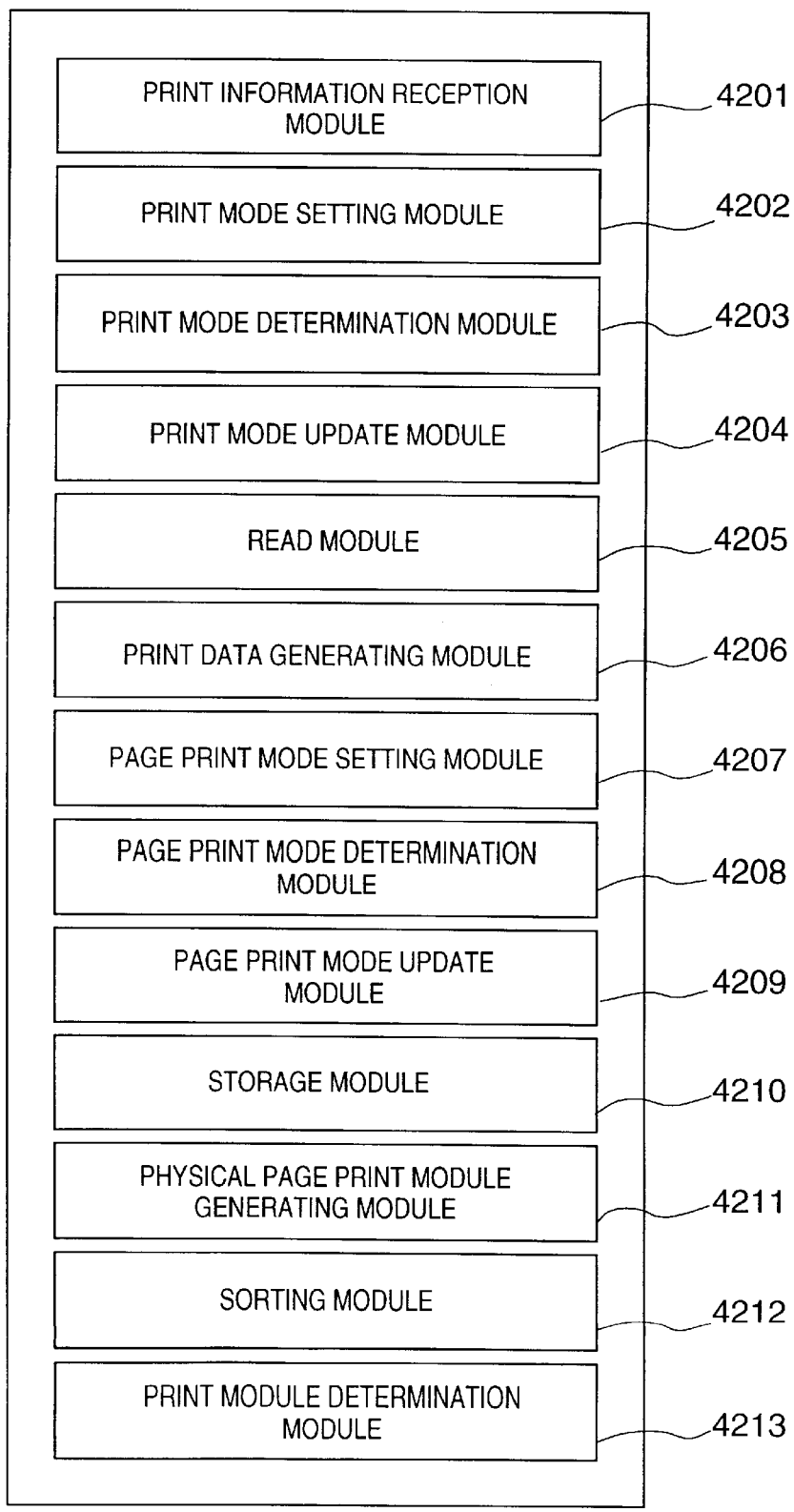
FIG. 42A is a view showing a memory map in the 15th embodiment.
Figure 42B:
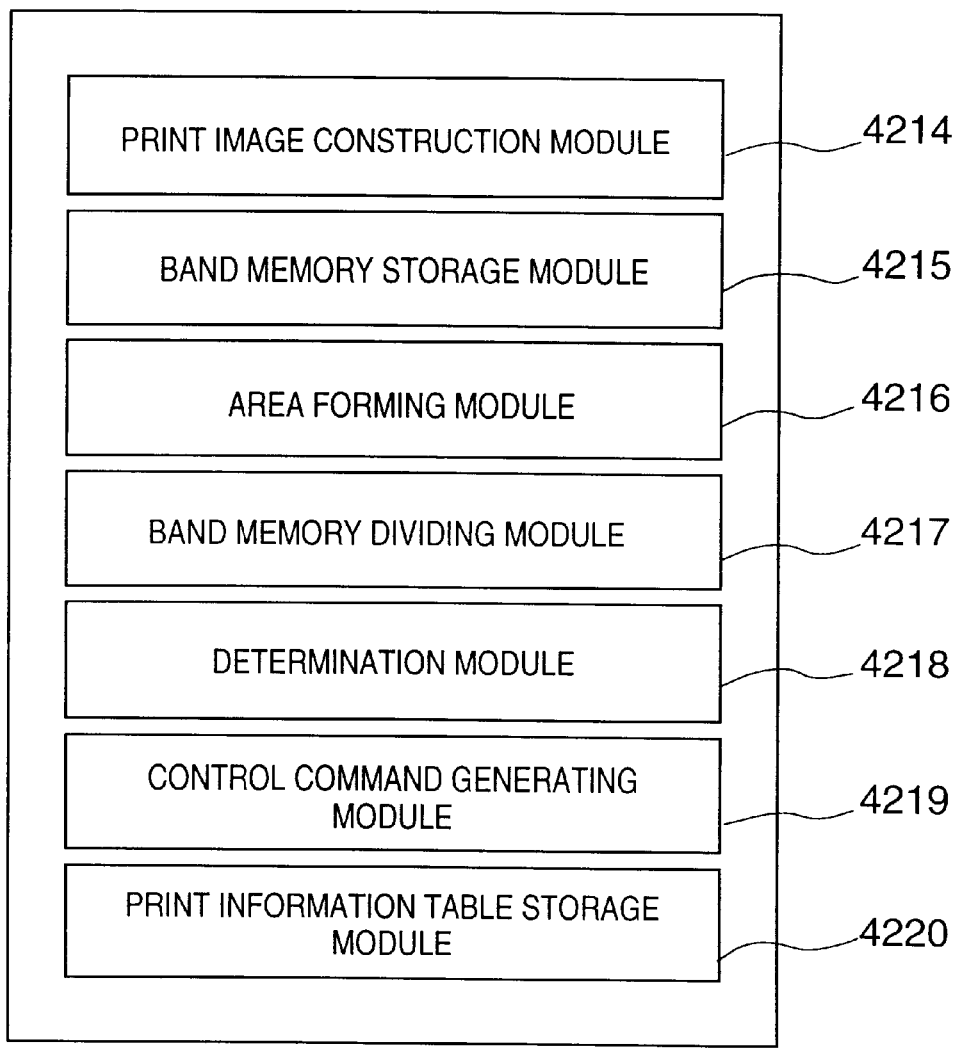
FIG. 42B is a view showing a memory map in the 15th embodiment.

When the present invention is applied to the above storage medium, program codes corresponding to the flow charts described above are stored in the storage medium. In brief, the respective modules in the memory maps shown in FIGS. 42A and 42B are stored in the storage medium.

More specifically, it suffices if at least the program codes of the following modules are stored in the storage medium: a print information reception module 4201, a print mode setting module 4202, a print mode determination module 4203, a print mode update module 4204, a read module 4205, a print data generating module 4206, a page print mode setting module 4207, a page print mode determination module 4208, a page print mode update module 4209, a storage module 4210, a physical page print module generating module 4211, a sorting module 4212, a print determination module 4213, a print image construction module 4214, a band memory storage module 4215, a area forming module 4216, a band memory dividing module 4217, a determination module 4218, a control command generating module 4219, and a print information table storage module 4220.

[Other Embodiments]

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying, to the system or apparatus, a storage medium on which a program code of software that can realize the functions of the above embodiments is recorded, and making the computer (CPU or MPU) in the system or apparatus read out the program code from the storage medium and execute it.

In this case, since the program code itself, read out from the storage medium, realizes the functions of the above embodiments, the storage medium storing the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The present invention includes not only a case wherein the functions of the above embodiments are realized by making the computer execute the readout program code but also a case wherein the functions of the above embodiments are realized by making an OS (operating system) running on the computer execute some or all of actual processing operations on the basis of the instructions of the program code.

Furthermore, the present invention includes a case wherein the program code read out from the storage medium is stored in a memory in a function extension board inserted in the computer or a function extension unit connected to the computer, and some or all of actual processing operations are executed by a CPU or the like arranged in the function extension board or function extension unit on the basis of the instructions of the program code, thereby realizing the functions of the above embodiments.

As has been described above, according to the present invention, in accordance with a preset condition, the optimal print mode for the condition can be selected to increase the print throughput of the printer. In addition, proper print results can be obtained.

In accordance with a preset condition, the optimal printer control command generating method for the condition can be selected to increase the print throughput of the printer. In addition, proper print results can be obtained.

Since the condition can be acquired from the printer driver, the versatility of the condition can be improved.

When a printer control command is to be generated in a selected print mode, a print instruction is received in a form suited to the selected print mode, and a printer control command can be generated.

When the printer control command generating method of the present invention is used, printer control command generation corresponding to each non-printed area in a band area can be reduced or eliminated, the processing time associated with the printer driver can be shortened. In addition, the size of print data to be generated by the printer driver can be reduced.

In addition, if the present invention is applied to a case wherein the conventional printer driver checks all the processing target areas in a band memory one by one to omit printer control command generation corresponding to non-printed areas in each band area, processing that is irrelevant to printing can be omitted more efficiently. This can shorten the processing time associated with the printer driver.

Furthermore, when a print request is received from application software, printed area information is stored, and printer control command generation can be optimized on the basis of the area information. This can improve the printing performance. In addition, since printer control commands that are irrelevant to print results can be reduced or eliminated, the size of data to be transmitted to the printer can be reduced.

The present invention is not limited to the above embodiments and various changes and modifications can be made within the spirit and scope of the present invention. Therefore, to appraise the public of the scope of the present invention, the following claims are made.

What is claimed is:

1. An information processing apparatus as a host computer for generating print data to be printed by a printer, comprising:

a first acquisition means for acquiring a pre-registered specific function according to receipt of a printing instruction;

a second acquisition means for acquiring a designated function designated via a user interface;

selection means for selecting a print mode for processing the print data in accordance with the specific function acquired by the first acquisition means and the designated function acquired by the second acquisition means; and control means for causing a printer driver to generate print data in the print mode, selected by said selection means, in accordance with a print instruction generated by a graphics engine.

2. The apparatus according to claim 1, wherein the specific function for selecting the print mode is acquired from a printer driver unique to said printer.

3. The apparatus according to claim 1, wherein said apparatus further comprises:

spool means for converting the print instruction into an intermediate code and temporarily storing the intermediate code; and de-spool means for causing said graphics engine to regenerate the print instruction on the basis of the intermediate code stored in said spool means, and said control means causes said printer driver to generate the print data in accordance with the print instruction regenerated by said graphics engine.

4. The apparatus according to claim 3, wherein when said graphics engine is caused to regenerate the print instruction, said graphics engine is notified of an ability of said printer driver in the print mode selected by said selection means, and is caused to generate the print instruction in accordance with the ability.

5. The apparatus according to claim 1, wherein said apparatus further comprises print mode storage means for storing print modes selected by said selection means in units of pages, and said control means changes the print mode in units of pages in accordance with the print mode stored in said print mode storage means.

6. The apparatus according to claim 3, wherein said apparatus further comprises print mode storage means for storing print modes selected by said selection means in units of pages, said spool means generates an intermediate code for performing layout printing on a single paper sheet from a print instruction for a plurality of pages when said printer is to perform layout printing of the plurality of pages on the single paper sheet, and said control means causes said printer driver to generate the print data to be printed on the single paper sheet in the print modes stored in said print mode storage meansin units of pages on the basis of the intermediate code.

7. The apparatus according to claim 3, wherein said apparatus further comprises print mode storage means for storing the print modes, in units of pages, which are selected by said selection means in units of pages, said spool means comprises print mode rearranging means for converting the print instruction into an intermediate code and rearranging the print modes in said print mode storage means in accordance with a rearranged order of pages to be actually printed by said printer, and said control means changes the print modes in units of pages in accordance with the order changed by said print mode rearranging means, and causes said printer driver to generate the print data.

8. The apparatus according to claim 1, wherein the print modes include a raster graphics print mode of converting the print data into raster data, and a vector graphics print mode of converting the print data into vector data.

9. An information processing method of processing print information generated by an information processing apparatus as a host computer, the method comprising:

a first acquisition step of acquiring a pre-registered specific function according to receipt of a printing instruction;

a second acquisition step of acquiring a designated function designated via a user interface of the information processing apparatus;

a selection step of selecting a print mode for processing the print data in accordance with the specific function acquired in the first acquisition step and the designated function acquired in the second acquisition step; and a control step of causing a printer driver to generate print data in the print mode, selected in the selection step, in accordance with a print instruction generated by a graphics engine.

10. The method according to claim 9, wherein the specific function for selecting the print mode is acquired from a printer driver unique to said printer.

11. The method according to claim 9, wherein the method further comprises:

a spool step of converting the print instruction into an intermediate code and temporarily storing the intermediate code; and a de-spool step of causing said graphics engine to regenerate the print instruction on the basis of the intermediate code stored in the spool step, and a control step includes causing said printer driver to generate the print data in accordance with the print instruction regenerated by said graphics engine.

12. The method according to claim 11, further comprising the step of, when said graphics engine is caused to regenerate the print instruction, notifying said graphics engine of an ability of said printer driver in the print mode selected in the selection step, and causing said graphics engine to generate the print instruction in accordance with the ability.

13. The method according to claim 9, wherein the method further comprises the print mode storage step of storing print modes selected in the selection step in units of pages, and the control step includes changing the print mode in units of pages in accordance with the print mode stored in the print mode storage step.

14. The method according to claim 11, wherein the method further comprises the print mode storage step of storing print modes selected in the selection step in units of pages, the spool step includes generating an intermediate code for performing layout printing on a single paper sheet from a print instruction for a plurality of pages when said printer is to perform layout printing of the plurality of pages on the single paper sheet, and the control step includes causing said printer driver to generate the print data to be printed on the single paper sheet in the print modes in the print mode storage step in units of pages on the basis of the intermediate code.

15. The method according to claim 11, wherein the method further comprises the print mode storage step of storing the print modes, in units of pages, which are selected in the selection step in units of pages, a spool step includes the print mode rearranging step of converting the print instruction into an intermediate code and rearranging the print modes in the print mode storage step in accordance with a rearranged order of pages to be actually printed by said printer, and a control step includes changing the print modes in units of pages in accordance with the order changed in the print mode rearranging step, and causing said printer driver to generate the print data.

16. The method according to claim 9, wherein the print modes include a raster graphics print mode of converting the print data into raster data, and a vector graphics print mode of converting the print data into vector data.

17. A storage medium storing an information processing program for processing print information generated by an information processing apparatus as a host computer, the program comprising:

a code for the first acquisition step of acquiring a pre-registered specific function according to receipt of a printing instruction;

a code for the second acquisition step of acquiring a designated function designated via a user interface of the information processing apparatus;

a code for the selection step of selecting a print mode for processing the print data in accordance with the specific function acquired by the code for the first acquisition step and the designated function acquired by the code for the second acquisition step; and a code for the control step of causing a printer driver to generate print data in the print mode, selected in the selection step, in accordance with a print instruction generated by a graphics engine.

18. A storage medium storing an information processing program for processing print information generated by an information processing apparatus as a host computer, the program comprising:

a code for the first acquisition step of acquiring a pre-registered specific function according to receipt of a printing instruction;

a code for the second acquisition step of acquiring a designated function designated via a user interface of the information processing apparatus;

a code for the selection step of selecting a print mode for processing the print data in accordance with the specific function acquired by the code for the first acquisition step and the designated function acquired by the code for the second acquisition step; and a code for the generating step of generating print data in the print mode, selected in the selection step, in accordance with a print instruction generated by a graphics engine.

* * * * *

UNITED STATES PATENT AND TRADEMARK OFFICE
CERTIFICATE OF CORRECTION

PATENT NO. : 6,734,986 B1
DATED : May 11, 2004
INVENTOR(S) : Kuroi et al.

It is certified that error appears in the above-identified patent and that said Letters Patent is hereby corrected as shown below:

Column 5,
Lines 36, 49 and 58, "preferred" should read -- preferred aspect --.

Column 6,
Lines 47, 52 and 66, "preferred" should read -- preferred aspect --.

Column 9,
Line 28, "changedin" should read -- changed in --.

Column 10,
Line 22, "server" should read -- serve --.

Column 15,
Line 19, "an" should read -- and --.

Column 17,
Line 44, "and" should read -- then --.

Column 21,
Line 1, "step S103" should read -- step S1103 --.

Column 23,
Line 22, "assume" should read -- assumed --; and
Line 62, "It" should read -- If it --.

Column 25,
Line 21, "designed," should read -- designated, --.

Column 26,
Line 6, "step 1402" should read -- step S1402 --.

Column 29,
Line 59, "out them" should read -- them out --.

Column 30,
Line 49, "four" should read -- fourth --.

UNITED STATES PATENT AND TRADEMARK OFFICE
CERTIFICATE OF CORRECTION

PATENT NO. : 6,734,986 B1
DATED : May 11, 2004
INVENTOR(S) : Kuroi et al.

It is certified that error appears in the above-identified patent and that said Letters Patent is hereby corrected as shown below:

Column 35,
Line 40, "the all" should read -- all --; and
Line 65, "It" should read -- If it --.

Column 36,
Line 63, "a area" should read -- an area --.

Column 38,
Line 12, "appraise" should read -- apprise --.

Column 39,
Line 4, "meansin" should read -- means in --.

Signed and Sealed this

Thirty-first Day of August, 2004

JON W. DUDAS
*Director of the United States Patent and Trademark Office*